United States Patent
Mo et al.

(10) Patent No.: US 8,599,284 B2
(45) Date of Patent: Dec. 3, 2013

(54) HIGH DYNAMIC RANGE SUB-SAMPLING ARCHITECTURE

(75) Inventors: Yaowu Mo, San Ramon, CA (US); Chen Xu, San Jose, CA (US); Min Qu, Sunnyvale, CA (US); Xiaodong Luo, Saratoga, CA (US); Donghui Wu, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 197 days.

(21) Appl. No.: 13/365,766

(22) Filed: Feb. 3, 2012

(65) Prior Publication Data

US 2013/0088624 A1 Apr. 11, 2013

Related U.S. Application Data

(60) Provisional application No. 61/545,993, filed on Oct. 11, 2011.

(51) Int. Cl.
*H04N 5/235* (2006.01)
*H04N 5/225* (2006.01)
*H04N 5/335* (2011.01)

(52) U.S. Cl.
USPC .................. 348/230.1; 348/218.1; 348/302

(58) Field of Classification Search
USPC ............. 348/229.1, 230.1, 216.1, 302, 308
See application file for complete search history.

(56) References Cited

U.S. PATENT DOCUMENTS

| | | | |
|---|---|---|---|
| 6,873,363 B1 * | 3/2005 | Barna et al. ................... | 348/308 |
| 7,430,011 B2 | 9/2008 | Xu et al. | |
| 7,554,588 B2 * | 6/2009 | Yaffe .......................... | 348/297 |
| 7,636,115 B2 * | 12/2009 | Hong et al. ................... | 348/294 |
| 7,830,435 B2 * | 11/2010 | Guidash ....................... | 348/297 |
| 7,911,518 B2 * | 3/2011 | Yosefin ........................ | 348/273 |
| 8,018,516 B2 * | 9/2011 | Hirai et al. .................... | 348/308 |
| 8,098,311 B2 * | 1/2012 | Mabuchi ....................... | 348/294 |
| 8,102,435 B2 * | 1/2012 | Castorina et al. .......... | 348/222.1 |

(Continued)

FOREIGN PATENT DOCUMENTS

JP 2006253876 A * 9/2006

OTHER PUBLICATIONS

Orly Yadid-pecht, et al., "In-pixel autoexposure CMOS APS", IEEE Journal of Solid-State Circuits, vol. 38, No. 8, pp. 1425-1428, Aug. 2003.

(Continued)

*Primary Examiner* — John Villecco
(74) *Attorney, Agent, or Firm* — Blakely Sokoloff Taylor & Zafman LLP

(57) ABSTRACT

A method of implementing high dynamic range bin algorithm in an image sensor including a pixel array with a first super row having a first integration time and a second super row having a second integration time is described. The method starts by reading out image data from the first super row into a counter. Image data from the first super row is multiplied by a factor to obtain multiplied data. The factor is a ratio between the first and the second integration times. The multiplied data is then compared with a predetermined data. The image data from the second super row is readout into the counter. If the multiplied data is larger than the predetermined data, the multiplied data from the first super row is stored in the counter. If not, the image data from the second super row is stored. Other embodiments are also described.

28 Claims, 40 Drawing Sheets

(56) References Cited

U.S. PATENT DOCUMENTS

| | | | |
|---|---|---|---|
| 8,274,588 B2* | 9/2012 | Mabuchi | 348/297 |
| 8,390,690 B2* | 3/2013 | Lim | 348/216.1 |
| 8,502,895 B2* | 8/2013 | Yosefin | 348/273 |
| 2005/0151866 A1* | 7/2005 | Ando et al. | 348/297 |
| 2006/0245014 A1* | 11/2006 | Haneda | 358/512 |
| 2008/0198251 A1* | 8/2008 | Xu | 348/297 |
| 2009/0251556 A1* | 10/2009 | Mabuchi | 348/222.1 |
| 2010/0253799 A1* | 10/2010 | Mabuchi | 348/222.1 |
| 2010/0309333 A1* | 12/2010 | Smith et al. | 348/230.1 |
| 2011/0019040 A1* | 1/2011 | Guidash | 348/273 |
| 2011/0199522 A1* | 8/2011 | Xu | 348/300 |
| 2012/0195502 A1* | 8/2012 | Wang et al. | 382/167 |
| 2012/0307118 A1* | 12/2012 | Mabuchi | 348/294 |
| 2013/0087683 A1* | 4/2013 | Mo et al. | 250/208.1 |
| 2013/0089175 A1* | 4/2013 | Mo et al. | 377/49 |

OTHER PUBLICATIONS

Yoshihara, S., et al., "A 1/1.8 inch 6.4 Mpixel 60 frames/s CMOS image sensor with seamless mode change", IEEE J. of Solid State Circuit, vol. 41, No. 2, pp. 2998-3006, Dec. 2006.

* cited by examiner

FIG. 21 *(prior art)*

HIGH DYNAMIC RANGE SUB-SAMPLING ARCHITECTURE

CROSS-REFERENCE TO RELATED APPLICATIONS

This application claims the benefit pursuant to 35 U.S.C. 119(e) of U.S. Provisional Application No. 61/545,993, filed Oct. 11, 2011, which application is specifically incorporated herein, in its entirety, by reference.

FIELD

An embodiment of the invention relate generally to a system, method and apparatus implementing a multiple-row concurrent readout scheme for high-speed CMOS image sensor with backside illumination. Another embodiment of the invention relates generally to a system, method and apparatus implementing a high dynamic range sub-sampling architecture. Yet another embodiment of the invention relates generally to a system, method and apparatus implementing an arithmetic counter circuit for high performance CMOS image sensors.

BACKGROUND

High speed image sensors have been widely used in many applications in different fields including the automotive field, the machine vision field, and the field of professional video photography. The development of high speed image sensors is further driven by the consumer market's continued demand for high speed slow motion video and normal high-definition (HD) video that have a reduced rolling shutter effect.

Complementary metal-oxide semiconductor ("CMOS") image sensor with backside illumination is dominant in the high-end CMOS sensor market because it can combine high performance with the mature CMOS image sensor process for high volume production. The CMOS image sensor with backside illumination provides the unique advantage of higher sensitivity for better low light performance at high speed (i.e., 16.7 ms for 60 FPS). This advantage makes the CMOS image sensor with backside illumination desirable for video applications that do not include the flash or strobe light that are available in photo applications. The CMOS image sensor with backside illumination also provides more flexibility in the routing on the front-side of the pixel array and a more complex routing can be implemented for better performance.

Current high speed architecture on CMOS image sensors implement a multiple channels, column parallel architecture, in which the frame rate is limited by the row time which is defined as the time it takes for the sensor to readout one row of pixel in the array. This row time limitation creates the bottleneck of high speed image sensor design.

Further, many applications require a high dynamic range (HDR) to capture the scene illuminations ranges from $10^{-1}$ for night vision to $10^5$ lux for bright sunlight or direct headlights light condition. This high dynamic range corresponds to a dynamic range of at least 100 dB. Current Charge-coupled devices (CCD) and CMOS sensors cannot achieve this range due to the full well limitation and noise floor limitation, which is typically around 60-70 dB. A high dynamic range sensor design is needed to extend the applications of CMOS image sensor into the high dynamic range areas.

Column parallel Analog-to-Digital (ADC) architecture has been widely used for its better performance on speed, power and structural noise reduction compared to the global ADC architecture. The column parallel ADC in combination with more advanced CMOS technology provides better power consumption and area efficiency, while providing more complex image processing possibilities.

SUMMARY

A system, method and apparatus implementing a multiple-row concurrent readout scheme for high-speed CMOS image sensor with backside illumination are described herein. In one embodiment, the method of operating an image sensor starts acquiring image data within a color pixel array and the image data from a first set of multiple rows in the color pixel array is then concurrently readout. In this embodiment, concurrently reading out the image data from the first set of multiple rows includes concurrently selecting a first portion of the image data from the first set by first readout circuitry and a second portion of the image data from the first set by second readout circuitry. In this embodiment, the first and second portions of the image data from the first set are different and the first and second readout circuitries are also different.

A system, method and apparatus implementing a high dynamic range sub-sampling ("HDR bin") architecture are also described herein. In one embodiment, an image sensor including a pixel array including a first super row having a first integration time and a second super row having a second integration time is used. The method of implementing a high dynamic range (HDR) bin algorithm in this image sensor starts by reading out an image data from the first super row into a counter. The first super row is a first set of multiple rows of the pixel array. The image data from the first super row may then be multiplied by a factor to obtain a multiplied data. The factor is a ratio between the first integration time and the second integration time. The multiplied data is then compared with a predetermined data. In this embodiment, the image data from the second super row is readout into the counter. The second super row is a second set of multiple rows of the pixel array. If the multiplied data is larger than the predetermined data, the multiplied data from the first super row is stored in the counter. However, if the multiplied data is smaller than the predetermined data, the image data from the second super row is stored in the counter.

A system and apparatus implementing an arithmetic counter circuit for high performance CMOS image sensors are also described herein. In one embodiment, the arithmetic counter circuit includes a plurality of flip-flops of a plurality of counter stages and a plurality of multiplexers of the plurality of counter stages being coupled to the plurality of flip-flops. In this embodiment, each of the plurality of multiplexers receive control signals including at least one of a toggle signal, a keep signal, a shift enable signal, and a mode signal. The control signals select the output of each of the plurality of multiplexers. In this embodiment, each of the plurality of flip-flops are in one of a toggle state, a keep state, a reset state and a set state based on inputs received from the plurality of multiplexers.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

The following description is the divided into three parts. Part I describes a multiple-row concurrent readout scheme for high-speed CMOS image sensor with backside illumination. Part II describes a high dynamic range sub-sampling architecture. Part III describes an arithmetic counter circuit, configuration and application for high performance CMOS image sensors.

Part I: A Multiple-Row Concurrent Readout Scheme for High-Speed CMOS Image Sensor with Backside Illumination In order to improve the frame rate of CMOS image sensors with backside illumination, the present invention provides a new readout architecture in which multiple rows of pixels are readout at the same time such that the row time is significantly reduced.

Figure 1:
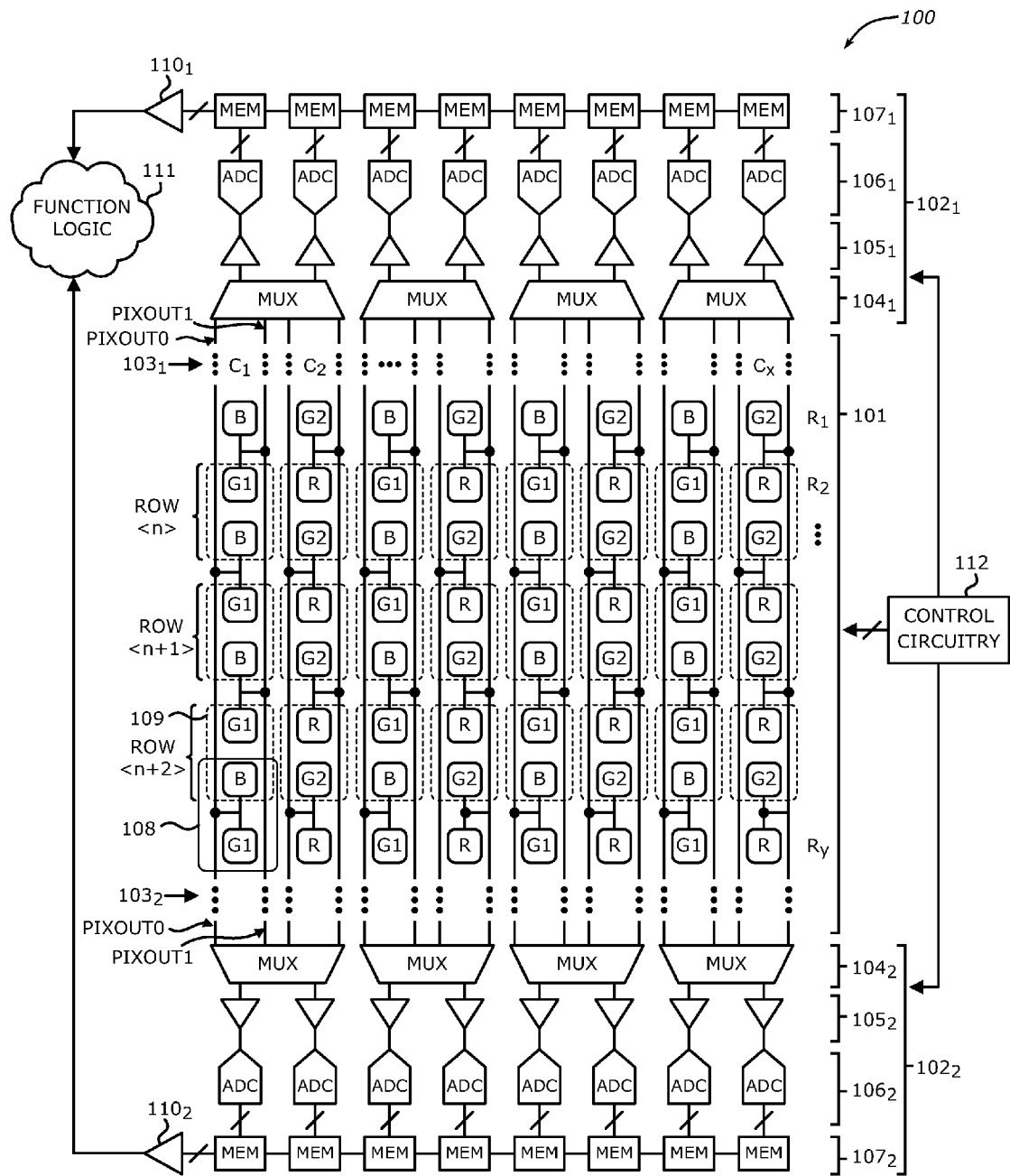
FIG. 1 illustrates one example of a backside illuminated imaging system implementing a multiple row concurrent readout scheme in accordance to one embodiment of the invention.

FIG. 1 illustrates one example a backside illuminated imaging system 100 implementing a multiple row concurrent readout scheme in accordance to one embodiment of the invention. In this embodiment, a two-row concurrent readout scheme is illustrated but it is understood that two or more row concurrent read out schemes may be implemented. In the embodiment illustrated in FIG. 1, the two shared pixel which provides a higher overall performance is used. However, some embodiments of the invention may implement other pixel structures such as, for example, traditional pixel 4T and 3T. Further, FIG. 1 illustrates a column parallel architecture with top and bottom readout architecture. However, in some embodiments, other readout architectures (i.e., column serial readout or multiple channel readout) can be implemented.

As illustrated in FIG. 1, the imaging system 100 includes a color pixel array 101, top read out circuitry $102_1$ and bottom readout circuitry $102_2$, function logic 111, and control circuitry 112. The pixel array 101 is a two-dimensional ("2D") array of imaging pixels (e.g., pixels P1, P2, . . . , Pn) having X number of pixel columns and Y number of pixel rows. In one embodiment, each pixel is a complementary metal-oxide semiconductor ("CMOS") imaging pixel. Pixel array 101 may be implemented as a backside illuminated image pixel array. As illustrated, each pixel is arranged into a row (e.g., rows R1 to Ry) and a column (e.g., column C1 to Cx) to acquire image data of a person, place, or object, which can then be used to render a 2D image of the person, place or object.

Color pixel array 101 may also be referred to as a color filter array ("CFA"). The CFA may capture color image data using a number of techniques including additive filters and subtractive filters. For example, color pixel array 101 may be implemented as a Bayer pattern or mosaic of red, green, and blue additive filters (e.g., RGB, RGBG or GRGB) or a color filter pattern of cyan, magenta, yellow, and key (black) subtractive filters (e.g., CMYK). Other CFAs may also be used, such as a mosaic of red, green, blue, and emerald filters (e.g., RGBE), a color filter pattern of cyan, yellow, green, and magenta filters (e.g., CYGM), a color filter pattern of cyan, magenta, yellow, and white filters (e.g., CMYW), a color filter pattern of red, green, blue, and white filters (e.g., RGBW), a combination of these, or otherwise.

After each pixel has acquired its image data or image charge, the image data is readout by the top and bottom readout circuitry $102_1$ and $102_2$ via the readout columns $103_1$ and $103_2$, respectively. The top and bottom readout circuitries $102_1$ and $102_2$ respectively include: multiplexer ("MUX") circuitry $104_1$ and $104_2$, amplification circuitry $105_1$ and $105_2$ including a plurality of amplifiers, Analog-to-Digital converters ("ADCs") $106_1$ and $106_2$, memories cells $107_1$ and $107_2$, and global amplifiers $110_1$ and $110_2$. Both amplification circuitries $105_1$ and $105_2$ are coupled to the readout columns of color pixel array 110 to readout the image data on each column via MUX circuitry $104_1$ and $104_2$, respectively. In one embodiment, the image data is readout as an analog voltage level on each readout column. The readout image data is then sequentially provided to ADCs $106_1$ and $106_2$, memories $107_1$ and $107_2$, and to global amplifiers $110_1$ and $110_2$ for amplification. After amplification, the readout image data is transferred to the function logic 111, which may store the image data or may manipulate the image data by applying post image effects (e.g., crop, rotate remove red eye, adjust brightness, adjust contrast or otherwise).

Embodiments of the present invention use MUX circuitry $104_1$ and $104_2$ to direct the column readout lines (e.g., pixout0 and pixout1 in FIG. 1) to the amplification circuitry $105_1$ and $105_2$. As shown in FIG. 1, the column readout lines from two adjacent columns are inputted to two separate MUXs: one from the top MUX circuitry $104_1$ and one from the bottom MUX circuitry $104_2$. From a functional perspective, MUX circuitry $104_1$ and $104_2$ may also be considered to include the column readout lines. In the illustrated embodiment, each of the amplifiers in amplification circuitry $105_1$ and $105_2$ reads out the image data associated with one column of pixels (and all rows of pixels in the associated column). As discussed below, in MUX circuitry $104_1$ and $104_2$, the top and bottom MUXes associated with a given column may concurrently select alternate readout lines for the same row address (e.g., Row <n>). (See FIG. 5).

Control circuitry 112 is coupled to the pixel array 101 and the MUX circuitry $104_1$ and $104_2$ to control operational characteristics of the pixel array 101 and the MUX circuitry $104_1$ and $104_2$. For example, control circuitry 112 may operate as a decoder for configuring MUX circuitry $104_1$ and $104_2$ and a row selector for color pixel array 101. Control circuitry 112 may execute logic for determining which rows/columns are selected and which amplification circuitry $105_1$ and $105_2$ are coupled via MUX circuitry $104_1$ and $104_2$ at a given time. The logic executed may represent executable code (e.g., software or firmware), hardware logic, or a combination of both. Other functionality included within control circuitry 112 may include generation of reset signals and shutter signals for controlling image acquisition. In an embodiment, the shutter signal is a rolling shutter signal whereby a set of multiple rows is sequentially enabled during consecutive acquisition windows.

In one embodiment, a unit cell 108 includes two shared pixels, which are placed vertically in FIG. 1. The two shared pixels share the same pixel output (i.e., illustrated with a horizontal line in FIG. 1) that may be connected to one of the two bitlines for each column of pixels. These two bitlines may also be referred to herein as the column readout lines which are illustrated as pixout0 and pixout1 in FIG. 1. In this embodiment, one unit cell 108 interchangeably connects to a different bitline than an adjacent unit cell. During the pixel readout, the logic unit cell 109, which is circled with the dotted line, is defined and shifts one pixel from the physical unit cell 108. This avoids that two pixels share the same floating diffusion readout at the same time. Thus, a concurrent readout will not be interrupted since the two pixels within one logical unit cell 109 have different floating diffusion. Accordingly, two rows of pixels (e.g., Row <n> in FIG. 1) within the same logical unit cell 109 are able to be readout at the same time.

As illustrated in FIG. 1, to process the data of two rows concurrently (also referred to as a super row, e.g., Row <n> in FIG. 1), each output of one 4-in-2-out MUX included in the MUX circuitry $104_1$ and $104_2$ is inputted into a column amplification stage being amplification circuitry $105_1$ and $105_2$, a column ADC being an ADC $106_1$ and $106_2$, and a memory cell $107_1$ and $107_2$. In other words, the column amplification gain stage, column ADC and memory cell is in a pitch of one column to process the data of two rows concurrently. Other column circuitry such as a bitline bias may also be placed in the two-per-pixel pitch. As shown in FIG. 1, each 4-in-2-out analog MUX is placed at the end of the column at the top and the bottom of the pixel array in the top and bottom readout circuitry $102_1$ and $102_2$. The function of the MUX is to select the right color pixel signal for the top and bottom readout. For example, G1/G2 may be directed to top readout and B/R may be directed to bottom readout. Both top and bottom data are readout to the global readout bus and can further be merged and processed in the digital block or function logic 111.

This embodiment of the invention provides a high speed advantage because, at one row address pointer to the super row (e.g., Row <n>), there are two rows of pixels read out at the same time. Accordingly, with regards to the row readout time, the total number of rows in the arrays is halved. Thus, if the row readout time dominates the entire row time, then the frame rate improvement may be doubled. Another advantage of this embodiment is the support of true seamless mode transition between full resolution and 2×2 binning. In other words, there will be no resulting bad frames during the transition. Furthermore, the requirement for mode change is kept at minimum with no change on the row readout and shutter timing being required. Yet another advantage of this embodiment is that the color data output sequence may easily be rearranged by the digital block because the two-row readout is in a unit of Bayer pattern. As a result, no row digital memory is required.

As discussed above, although the embodiment in FIG. 1 is based on the two-row concurrent readout, the embodiment may be expanded include a higher number of multiple row concurrent readout. In an embodiment that includes a higher number of multiple row concurrent readout, more pixout buses (e.g., column readout lines) are included. For example, for a four-row concurrent readout, 4 pixout bus per pixel is needed and for an eight-row concurrent readout, 8 pixout bus per pixel is needed, etc. . . . With front side illumination (FSI) technology, it becomes difficult to have a large number of pixout buses per pixel. With backside illumination (BSI) technology, more complex routing is allowed at front side without sacrificing the pixel performance, making the multiple row concurrent readout a viable implementation.

Pixel Implementation, Row Driver and Timing

Figure 2:
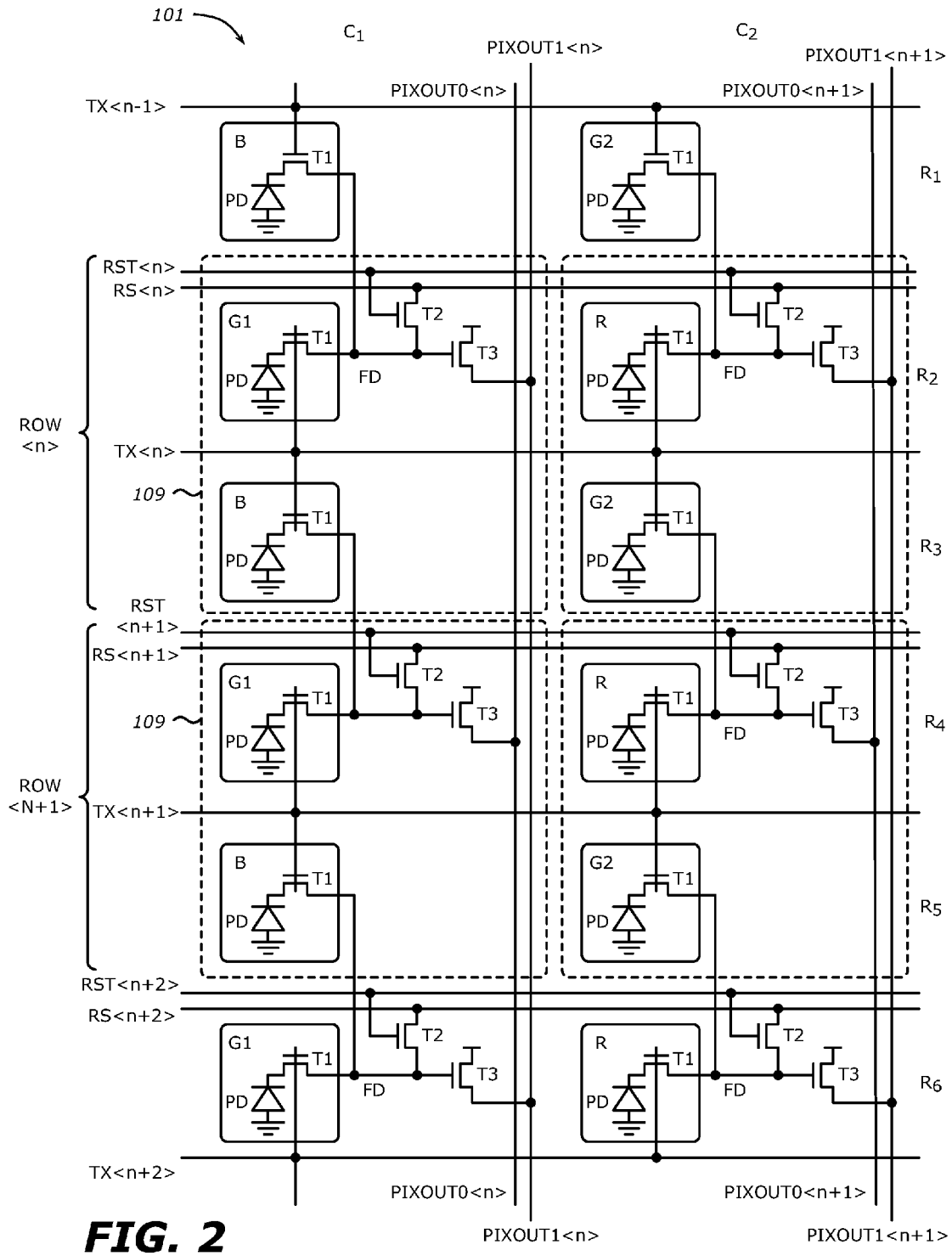
FIG. 2 illustrates the pixel array configuration in a multiple row concurrent readout scheme in accordance to one embodiment of the invention.

FIG. 2 illustrates one embodiment of the pixel array in a multiple row concurrent readout scheme in accordance to one embodiment of the invention. In the embodiment in FIG. 2, two shared no-row select pixel is used as an example. In another embodiment, other pixel structures and variations may be used. One logical unit cell 109 (circled in a dotted line) includes two pixels that have the same row decoder address (e.g., Row <n>) and share the same row driver signal, the same transfer (TX) line as well as the same reset (RST) and set (RS) signals.

In FIG. 2, pixels are arranged in two columns (e.g., columns C1 and C2) and six rows (e.g., rows R1, R2 . . . R6). The illustrated embodiment of each pixel circuitry includes a photodiode PD, a transfer transistor T1, a reset transistor T2, and a select transistor T3. During operation, transfer transistor T1 receives a transfer signal TX, which transfers the charge accumulated in photodiode PD to a floating diffusion node FD. In one embodiment, floating diffusion node FD may be coupled to a storage capacitor for temporarily storing image charges. In the two-row concurrent readout embodiment, it takes one readout cycle per two rows of pixels to readout the entire two rows of data.

As illustrated in FIG. 2, the transfer transistors T1 in the two shared pixels in logic cell 109 both receive the same transfer signal TX (e.g. TX<n>). Reset transistor T2 is coupled between a set signal RS and the floating diffusion node FD to reset the pixel (e.g., discharge or charge the FD and the PD) under control of a reset signal RST and the set signal RS. The floating diffusion node FD is coupled to control the gate of select transistor T3. Select transistor T3 is coupled between the power rail VDD and the readout column line. Based on the FD at the control gate of the select transistor T3, select transistor T3 selectively couples the output of pixel circuitry to the readout column line.

Figure 3:
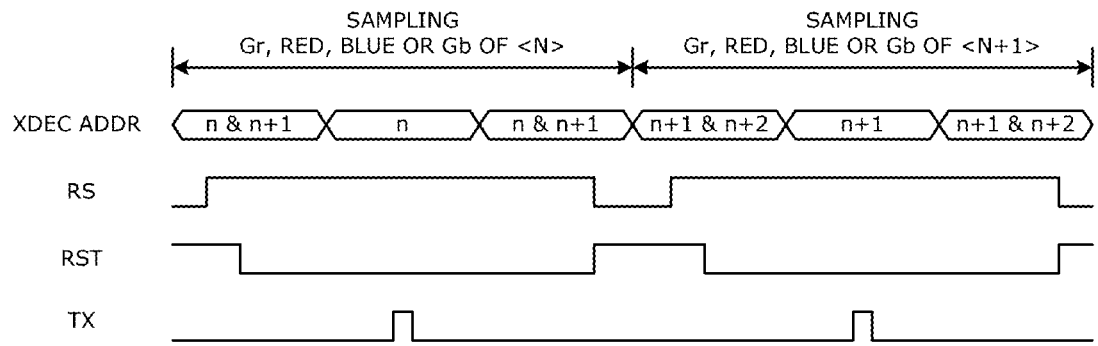
FIG. 3 illustrates a row control timing implementation in accordance to one embodiment of the invention.

In one embodiment, the TX signal, the RST signal, and the RS signal are generated by control circuitry 112. FIG. 3 illustrates a row control timing diagram according to one embodiment of the invention. Specifically, the row control timing diagram in FIG. 3 is a sample row timing for the embodiment of the pixel array 101 including the no-row select pixel as illustrated in FIG. 2. For other type of pixels, the timing diagram may be different. As illustrated in FIG. 2, in one logic unit cell 109, the RST and RS transistors (T2 and T3) are different but the pixels in the logic unit cell 109 share the same TX line. Accordingly, referring to FIG. 3, Row <n> and Row <n+1> are selected and pulsed at the same time for RS and RST signals but only row<n> is selected for TX signal.

Figure 4:
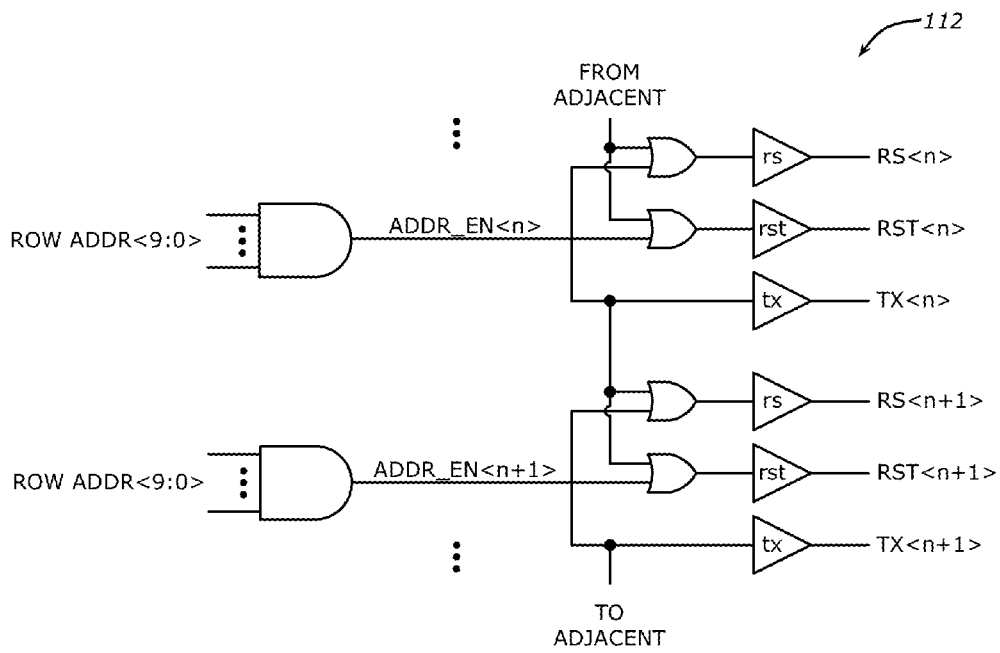
FIG. 4 illustrates a row driver configuration in accordance to one embodiment of the invention.

FIG. 4 illustrates a row driver configuration in accordance to one embodiment of the invention. The control logic 112 from FIG. 1 may include the row driver as illustrated in FIG. 4. The row driver may include a plurality of AND gates, OR gates and amplifiers to output the RS, RST and TX signals to the pixel array 101. The row driver illustrated in FIG. 4 has the control timing as illustrated in FIG. 3.

Column Implementation

Figure 5:
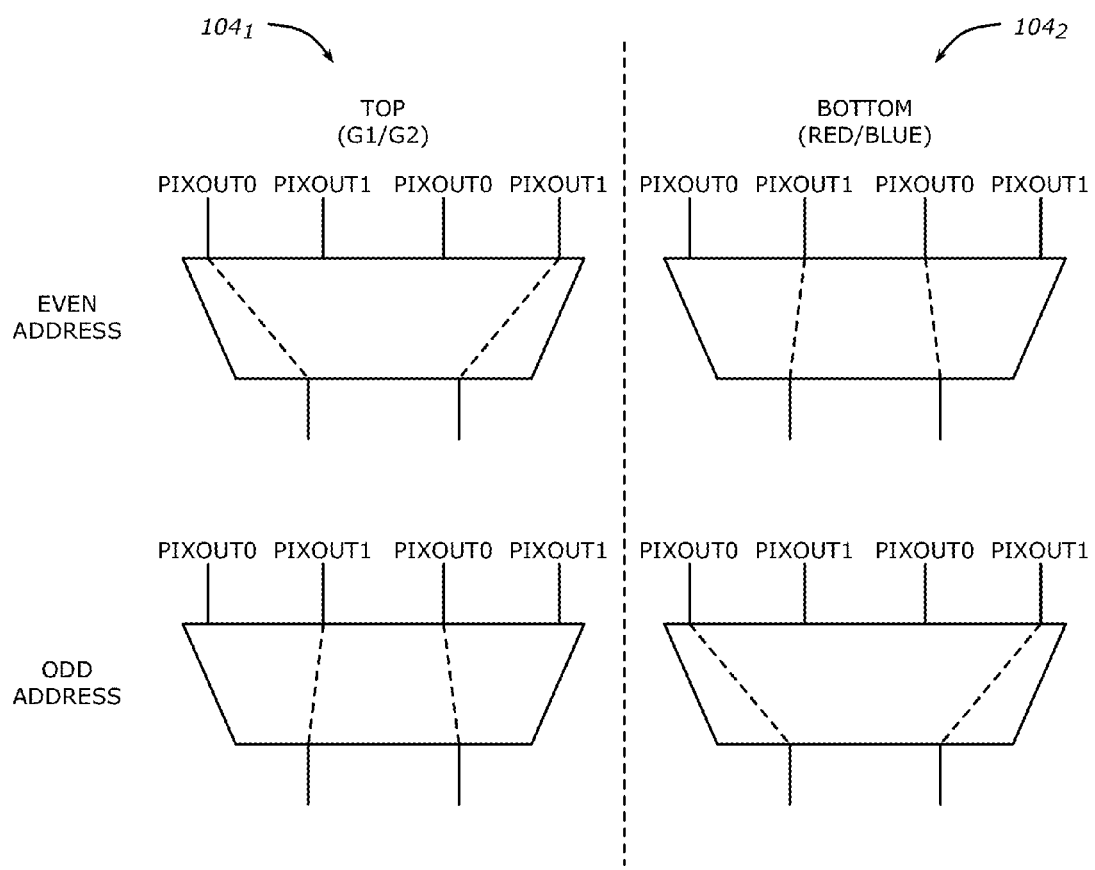
FIG. 5 illustrates a column multiplexer configuration in accordance to one embodiment of the invention.

FIG. 5 illustrates a column multiplexer configuration in accordance to one embodiment of the invention. As shown in FIG. 1, one analog 4-in-2-out MUX $104_1$ is needed per two columns to select the correct color pixels to be readout for the top channel and one analog 4-in-2-out MUX $104_2$ is needed per two columns to select the correct color pixels to be readout for the bottom channel. For example, green pixels (G1 and G2) may go to the top channel while the blue (B) and red (R) go to the bottom channel. In some embodiments, the last bit of the row address may be used to generate the correction control logic in order to distinguish the even and odd row addresses. As discussed above, other column circuitry, such as bitline bias, colamp amplifier (amplification circuitry) $105_1$ and $105_2$, column ADC $106_1$ and $106_2$ and memory cell $106_1$ and $106_2$ need to be placed in a two-per-pixel pitch. Further, the interlaced layout for amplifier and inter-digitized layout for capacitors may be needed to reduce the green pixels (G1/G2) mismatch.

True Seamless 2×2 Binning

Figure 6A:
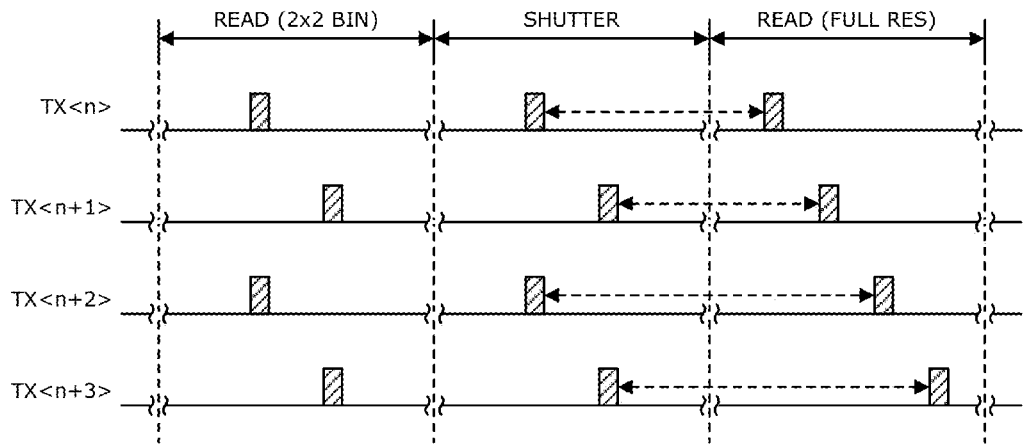
FIG. 6A illustrates a timing sequence mode change from 2×2 bin to full resolution for a conventional sensor.
Figure 6B:
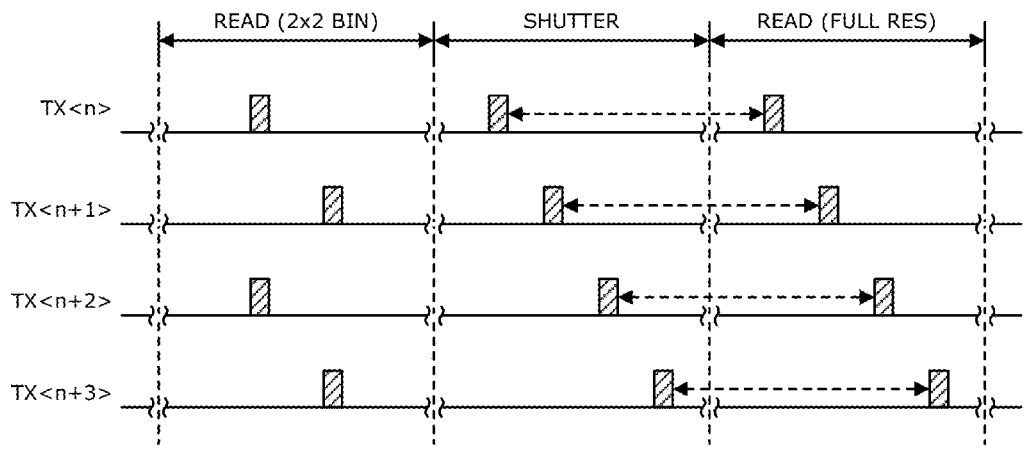
FIG. 6B illustrates a timing sequence mode change from 2×2 bin to full resolution for a sensor with a column A/D architecture.
Figure 6C:
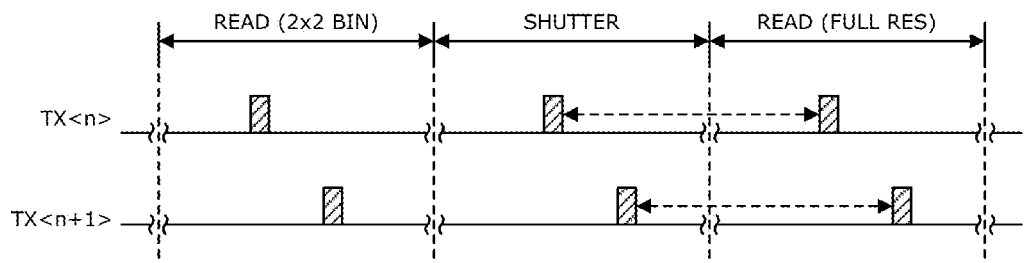
FIG. 6C illustrates a timing sequence mode change from 2×2 bin to full resolution for one embodiment of the invention.

FIG. 6A-C illustrates timing sequences for a mode change from 2×2 bin to full resolution for a conventional sensor (FIG. 6A), for a sensor with a column ADC architecture (FIG. 6B) and for one embodiment of the invention (FIG. 6C).

A seamless 2×2 binning means that there is no difference in the integration time when switching between full resolution mode and 2×2 binning mode and vice versa. As shown in the timing sequence in FIG. 6A for the conventional sensor, after changing mode from 2×2 bin to full resolution, the integration time for four consecutive rows t1, t2, t3 and t4 are different. As a result, the conventional sensor generates a bad frame that needs to be discarded. Accordingly, the transition for conventional sensors is not seamless. Regarding the sensor with a column ADC architecture, t1, t2, t3 and t4 may be the same, but three key requirements are needed in order to realize this seamless mode change: (1) the order of vertical rows is to be changed at the shutter timing just after the readout timing, (2) shutter pulses and readout pulses are to be controlled independently, and (3) the two modes are to be switched by setting the serial communication one frame prior to the actual mode change. These requirements add complexity and constraints to the sensor with the column ADC architecture and as such this sensor does not achieve a perfect seamless mode change implementation.

As shown in FIG. 6C, in one embodiment of the two-row concurrent readout architecture, since two rows of pixels are readout at the same time and the two rows share the same TX, there is no difference in the timing sequence for both readout phase and shutter phase. As shown in FIG. 6C, TX sequence is the same throughout the entire transition period. Thus, t1 equals t2 and there is no any additional timing control or sequence is required to achieve this equality in integration time. Accordingly, as opposed to the sensor having the timing sequence shown in FIG. 6B, this embodiment of the present invention achieves a perfect seamless mode change.

Frame Rate Calculation

Referring to Table 1 and Table 2 below, the frame rate is calculated for different sized pixel arrays. Table 1 presents the frame rate for the conventional readout at full resolution and Table 2 presents the frame rate for two row readout according to one embodiment of the invention.

TABLE 1 frame rate calculator for traditional readout at full resolution

| | Array Size | | | | |
|---|---|---|---|---|---|
| | 3 Mpix | 5 Mpix | 8 Mpix | 12 Mpix | 16 Mpix |
| Format | 4/3 | 4/3 | 4/3 | 4/3 | 4/3 |
| Output cols | 2000 | 2580 | 3270 | 4000 | 4620 |
| Output rows | 1500 | 1940 | 2450 | 3000 | 3460 |
| ADC data (bit) | 10 | 10 | 10 | 12 | 12 |
| Ramp freq (MHz) | 200 | 200 | 200 | 200 | 200 |
| Memory freq (MHz) | 80 | 80 | 80 | 80 | 80 |
| Channel # (top + btm) | 4 | 4 | 4 | 8 | 8 |
| Row readout time (us) | 12.54 | 12.54 | 12.54 | 33.66 | 33.66 |
| Mem readout time (us) | 6.75 | 8.56 | 10.72 | 6.75 | 7.72 |
| Row time (us) | 12.54 | 12.54 | 12.54 | 33.66 | 33.66 |
| Frame rate (fps) | 53.16 | 41.11 | 32.55 | 9.9 | 8.59 |

TABLE 2

Frame rate calculator for the proposed 2 row concurrent readout at full resolution

| | Array Size | | | | |
|---|---|---|---|---|---|
| | 3 Mpix | 5 Mpix | 8 Mpix | 12 Mpix | 16 Mpix |
| Format | 4/3 | 4/3 | 4/3 | 4/3 | 4/3 |
| Output cols | 2000 | 2580 | 3270 | 4000 | 4620 |
| Output rows | 1500 | 1940 | 2450 | 3000 | 3460 |
| ADC data (bit) | 10 | 10 | 10 | 12 | 12 |
| Ramp freq (MHz) | 200 | 200 | 200 | 200 | 200 |
| Memory freq (MHz) | 80 | 80 | 80 | 80 | 80 |
| Data path # | 4 | 4 | 4 | 8 | 8 |
| Row readout time (us) | 12.54 | 12.54 | 12.54 | 33.66 | 33.66 |

TABLE 2-continued

Frame rate calculator for the proposed 2 row concurrent readout at full resolution

| | Array Size | | | | |
|---|---|---|---|---|---|
| | 3 Mpix | 5 Mpix | 8 Mpix | 12 Mpix | 16 Mpix |
| Mem readout time (us) | 13.5 | 17.13 | 21.44 | 13.5 | 15.44 |
| Row time (us) | 13.5 | 17.13 | 21.44 | 33.66 | 33.66 |
| Frame rate (fps) | 98.77 | 60.2 | 38.08 | 19.81 | 17.17 |
| Improvement % | 85.78% | 46.45% | 16.99% | 100.00% | 100.00% |

As shown in the Tables 1 and 2, the improvement of the frame rate varies according to the digital data path readout speed and bit resolution at full resolution mode. Further, the embodiment of the present invention tends to have a higher digital readout speed if the row readout time dominates to the entire row time. Moreover, this speed advantage becomes more noticeable when using more advanced technology in the road-map since digital logic gets more performance boost from the advanced technology in terms of increasing processing power and speed compared to the analog part, making row readout time more dominant.

Therefore, according to some embodiment of the invention, having two rows or multiple rows concurrent readout scheme breaks the bottleneck of high speed image sensor design. Further, this embodiment takes the advantage of backside illumination technology to provide higher sensitivity at low light and more routing flexibility at front-side of the sensor. A true seamless 2×2 bin is also achieved using this architecture. Finally, the frame rate advantage of the multiple row concurrent readout over conventional readout is shown and further, the multiple row concurrent readout scheme may further gain more speed advantage with increasing the digital readout speed using more advanced technologies.

Operation of the Image Sensor

Figure 7:
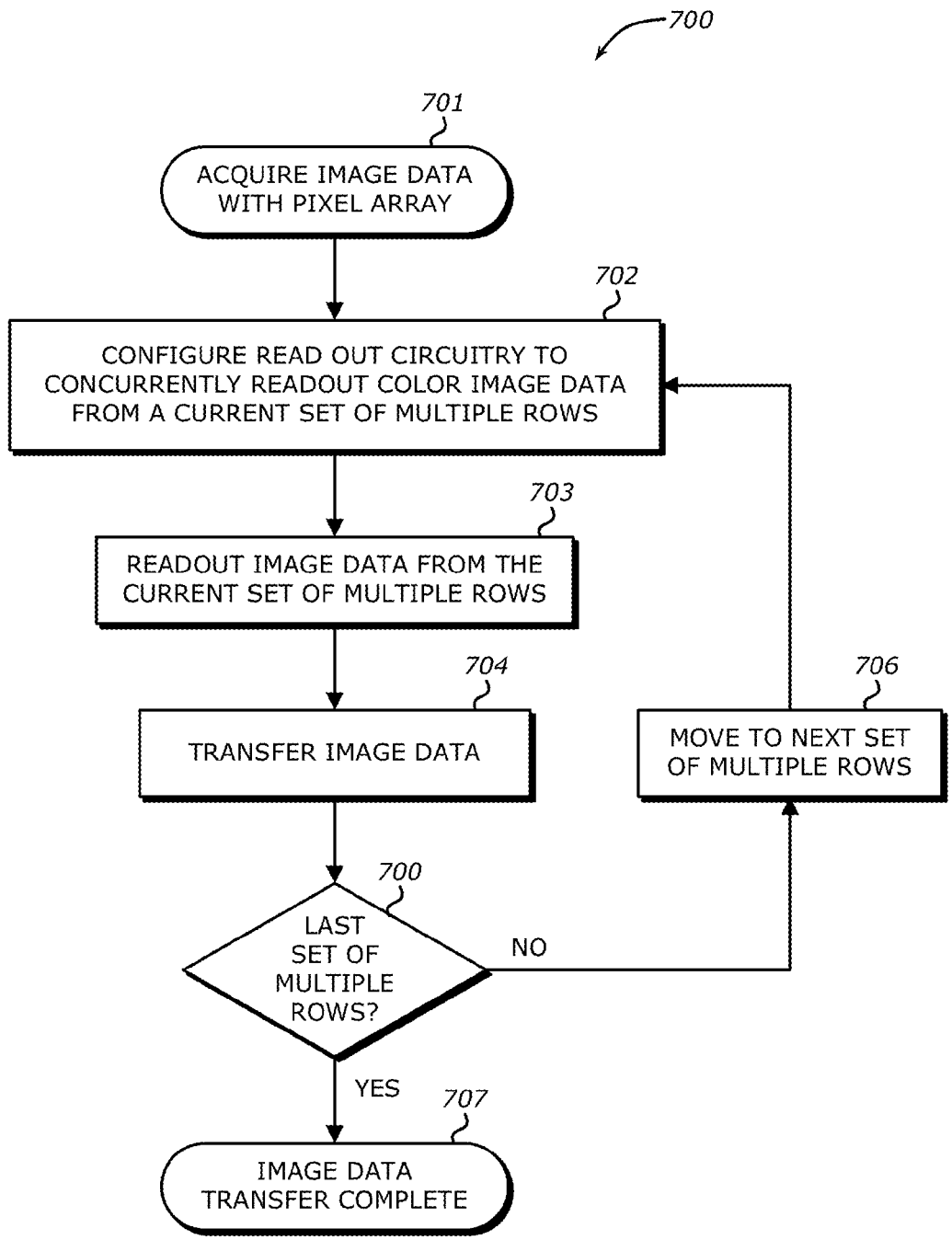
FIG. 7 illustrates a flowchart illustrating a process for operation of an image sensor in accordance with one embodiment of the invention.

FIG. 7 is a flow chart illustrating a process 700 for operation of image sensor 100, in accordance with an embodiment of the invention. The order in which some or all of the process blocks appear in process 700 should not be deemed limiting. Rather, one of ordinary skill in the art having the benefit of the present disclosure will understand that some of the process blocks may be executed in a variety of orders not illustrated.

In a process block 701, image data is acquired by color pixel array 101. Prior to readout, this image data is stored internal to each pixel as an image charge, until each pixel is selected to output its image voltage on its associated readout column. In a process block 702, control circuitry 112 configures the read out circuitry $102_1$ and $102_2$ to concurrently read out color image data from a current sent of multiple rows. The control circuitry 112 may select which rows of pixels to read out by configuring MUX circuitry $104_1$ and $104_2$ and selecting the appropriate pixel row (via the RS, RST and TX signals in FIG. 2). In order to output multiple rows at a time, control circuitry 220 configures the top and bottom MUX circuitry $104_1$ and $104_2$, to respectively select alternate column readout lines. Accordingly, image data associated with pixels within two rows of pixels may be readout of the color pixel array 110 concurrently. For instance, as discussed above, in the RGBG Bayer color pixel array 101 in FIG. 1, if Row<n> is the currently selected row, then one of two groups of color pixels (e.g., green pixels) can be selected by top MUX circuitry $104_1$ and the other group of color pixels (e.g., blue and red pixels) can be selected by bottom MUX circuitry $104_2$ at the same time.

In a process block 703, the image data from the current set of multiple rows is readout on the column lines into amplification circuitry 105₁ and 105₂. As shown in FIG. 1, the image data is then serially provided from amplification circuitry 105₁ and 105₂ to ADCs 106₁ and 106₂, memories 107₁ and 107₂, and to global amplifiers 110₁ and 110₂ for amplification. Finally, in a process block 704, the image data is transferred to the function logic 111.

Process 700 then determines whether the current set of multiple rows is the last set of multiple rows in the pixel array 101 at Block 705. If other sets of multiple rows remain to be readout, the process 700 moves to the next set of multiple rows at Block 706 and repeats process blocks 701-704 for the next set of multiple rows. In the case of the pixel array 101 illustrated in FIG. 1, image data is readout from Row<n> which includes two rows of pixels concurrently. Process 700 repeats itself until all Rows (e.g., Row<n+1>, Row<n+2>, etc. . . . ) in the pixel array 101 have been readout. Once no other sets of multiple rows remain to be readout at Block 705, the image data has been entirely transferred to the function circuitry 111 (Block 707).

Part II: A High Dynamic Range Sub-Sampling Architecture

As discussed above, the column parallel ADC in combination with more advanced CMOS technology provides better power consumption and area efficiency, while providing more complex image processing possibilities. For example, more complex arithmetic processing (i.e., addition, subtraction, multiplication and division) can be implemented in the counter level, which provides the opportunity to implement the HDR at the column ADC level.

Two-Integration Time: T0 and T1

Figure 8:
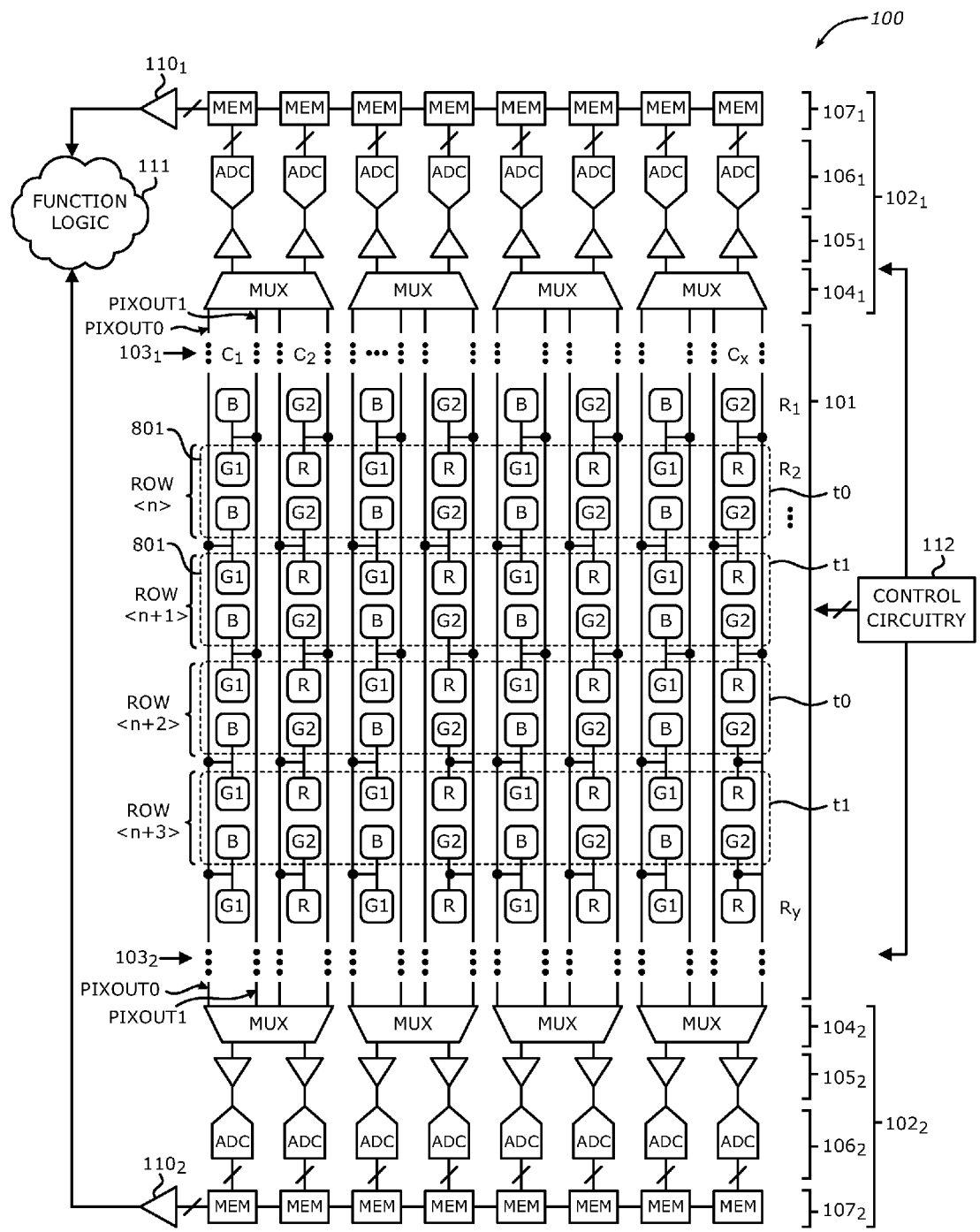
FIG. 8 illustrates a diagram of an imaging system implementing an HDR bin array configuration in accordance to one embodiment of the invention.

FIG. 8 illustrates a diagram of an imaging system implementing an HDR sub-sampling ("HDR bin") array configuration in accordance to one embodiment of the invention. The HDR sub-sampling ("HDR bin") array in FIG. 8 is based on the two-row concurrent readout architecture described above. As illustrated in FIG. 8, two rows of pixels, containing a Bayer pattern, are readout at the same time to the column parallel ADC. Compared to the conventional readout method, the two-row concurrent readout architecture provides the advantage of doubling the readout speed and may achieve a true seamless mode change between binning and full resolution mode. As shown in FIG. 8, the HDR bin can be easily built on the two-row concurrent readout architecture without adding much of circuitry complexity as further delineated in FIG. 10.

Figure 9:
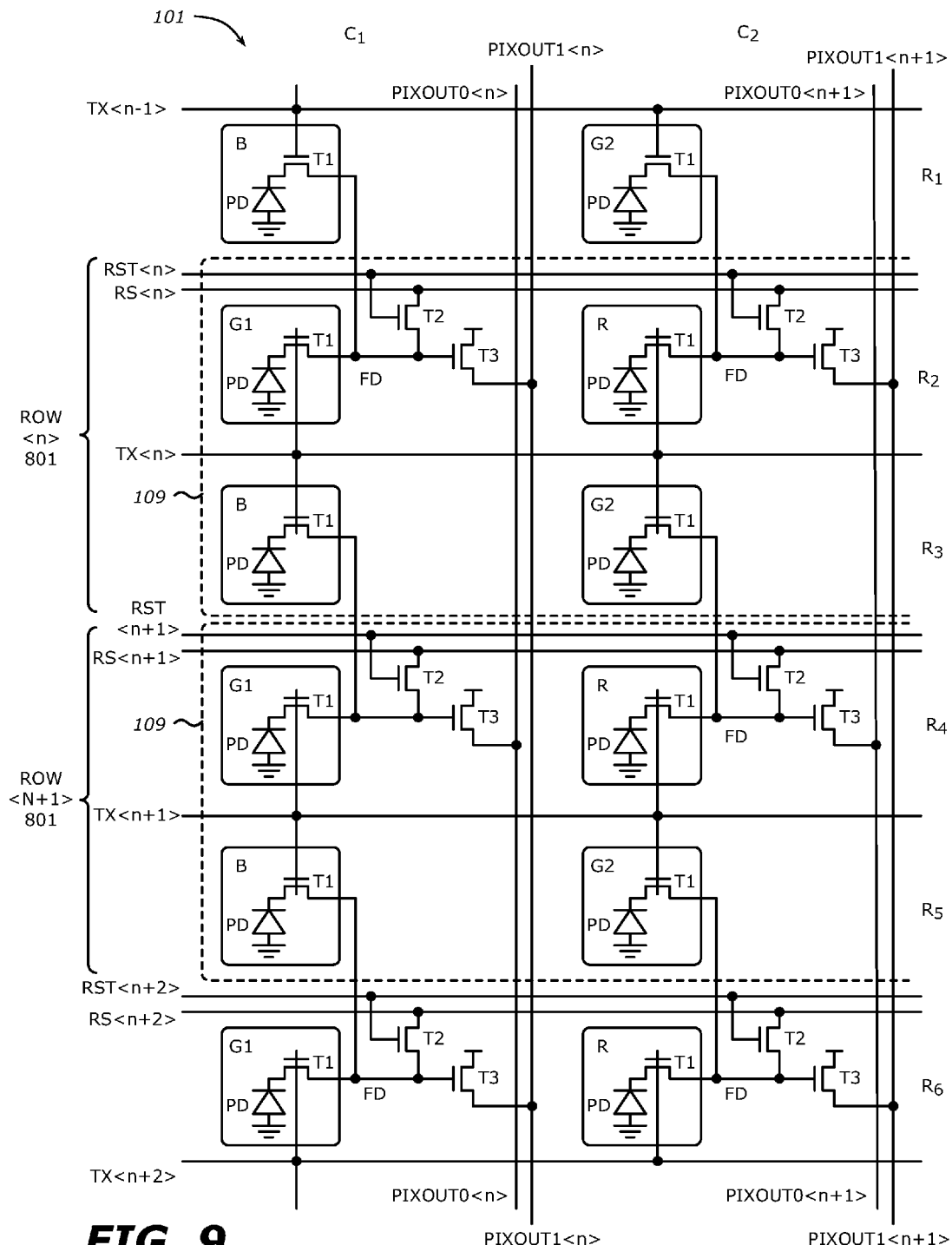
FIG. 9 illustrates a pixel configuration of the HDR bin array in FIG. 8 in accordance to one embodiment of the invention.

FIG. 9 illustrates a pixel configuration of the HDR bin array in FIG. 8 in accordance to one embodiment of the invention. As above, in the embodiment in FIG. 8, the two shared pixel is used. However, some embodiments of the invention may implement other pixel structures such as, for example, traditional pixel 4T and 3T. Further, FIG. 8 illustrates a column parallel architecture with top and bottom readout architecture which provides for high speed readout. However, in some embodiments, other readout architectures can be used to implement the HDR bin.

Similar to FIG. 2, in FIG. 9, pixels are arranged in two columns (e.g., rows C1 and C2) and six rows (e.g., rows R1, R2 . . . R6). The illustrated embodiment of each pixel circuitry includes a photodiode PD, a transfer transistor T1, a reset transistor T2, and a select transistor T3. During operation, transfer transistor T1 receives a transfer signal TX, which transfers the charge accumulated in photodiode PD to a floating diffusion node FD.

As illustrated in FIG. 8, the transfer transistors T1 in the two shared pixels in logic cell 109 both receive the same transfer signal TX (e.g. TX<n>). Reset transistor T2 is coupled between a set signal RS and the floating diffusion node FD to reset the pixel (e.g., discharge or charge the FD and the PD) under control of a reset signal RST and the set signal RS. The floating diffusion node FD is coupled to control the gate of select transistor T3. Select transistor T3 is coupled between the power rail VDD and the readout column line. Based on the FD at the control gate of the select transistor T3, select transistor T3 selectively couples the output of pixel circuitry to the readout column line.

Two adjacent rows of pixels (or also referred to as one super row 801, e.g., Row<n>) are circled in dashed line in FIGS. 8-9. The one super row 801 contains Bayer pattern pixels and shares the same integration time (e.g., t0 or t1). As shown in FIG. 8, the two sets of integration time (t0 and t1) are interlaced throughout the entire pixel array 101. In this embodiment, two adjacent super rows 801 (e.g., Row <n> and Row<n+1>) have different integration times. In some embodiments, the ratio between t0 and t1 are set as multiples of 2 (i.e., 2, 4 or 8 etc.). Given the binning operation with two rows readout at two different row times being performed, this two-integration time configuration only requires one shutter pointer (or pre-charge) in the row driver included in the control logic 112. The image data from the two super rows 801 will subsequently be combined to perform the HDR operation in the column parallel ADC level.

Figure 10:
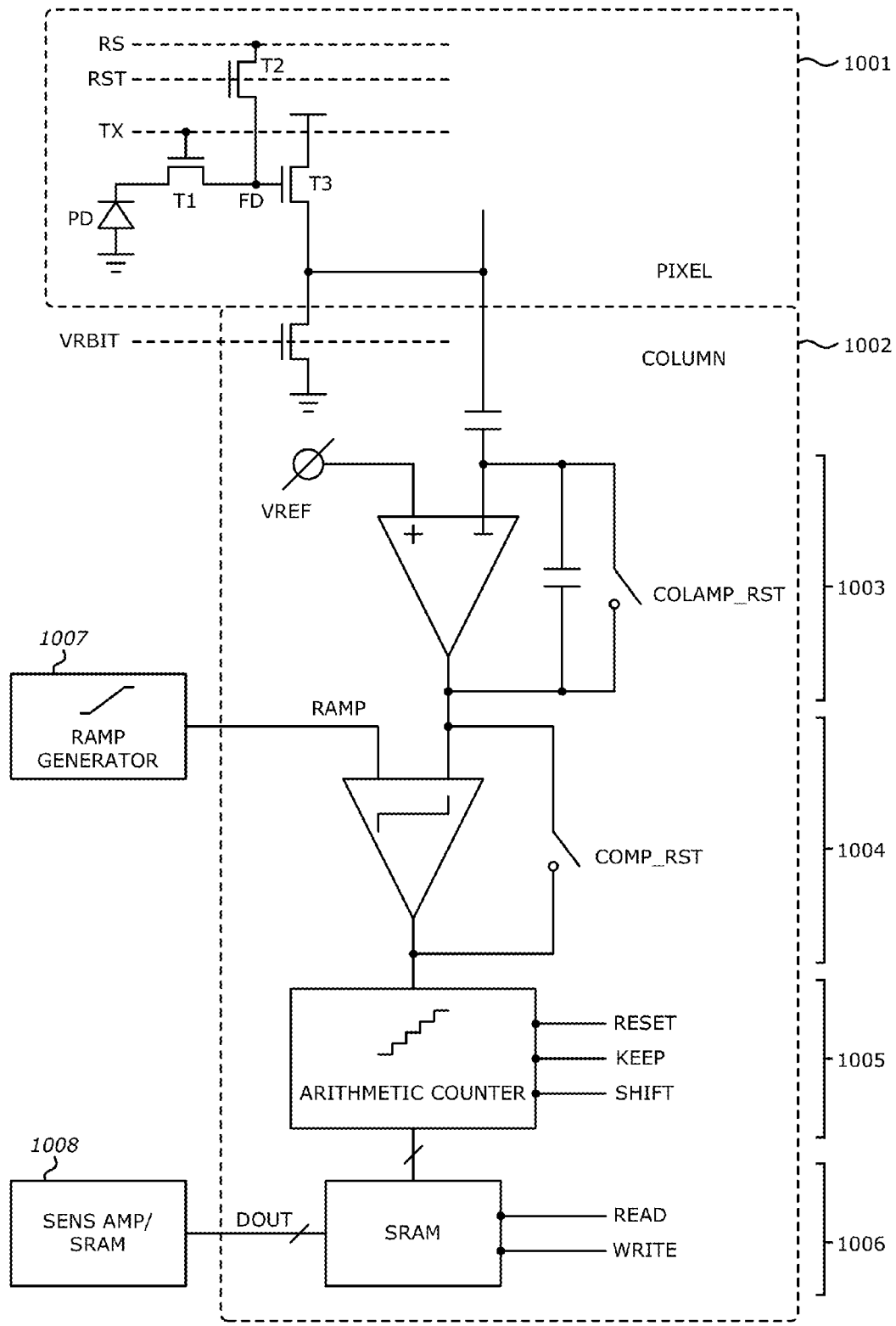
FIG. 10 illustrates a diagram of pixel circuitry coupled to column parallel ADC architecture with top and bottom readout architecture for the high speed readout in accordance to one embodiment of the invention.

FIG. 10 illustrates a diagram 1000 of pixel circuitry coupled to column parallel ADC architecture with top and bottom readout architecture for the high speed readout in accordance to one embodiment of the invention. In order to remain concise, the readout circuitry in FIG. 10 is described as bottom readout circuitry. However, it is understood that the top readout circuitry may also implement the following features. In this embodiment, the column parallel ADC 1002 is a single slope counter type ADC. However, the other types of column ADC (i.e., SAR, cyclic, etc) may also be used in other embodiments. It is also understood that the column parallel ADC architecture may be similar for each column of the pixel array. As illustrated in FIG. 10, the readout circuitry with HDR is greatly simplified when compared to the original two-row concurrent readout without HDR in FIG. 8.

In FIG. 10, the column parallel ADC 1002 includes amplification circuitry 1003, a comparator 1004, a counter 1005 and a memory cell 1006. The amplification circuitry 1003 includes a column amplifier with offset cancellation that is used to provide coarse gain for low noise purpose. The column amplifier may have a resent switch to cancel the offset. The comparator 1004 may receive as inputs a ramp signal from a ramp generator 1007 and the output of the column amplifier 1003. The output of the comparator 1004 is received by the counter 1005. As shown in FIG. 10, the comparator 1004 may also include a reset switch to cancel its offset. Combined, the offset cancellation of the column amplifier 1003 and the offset cancellation of the comparator 1004 may achieve the double Correlated Double Sampling (CDS) function. The counter 1005 may also be referred to as an "arithmetic counter" is further described below in Part 3. The output data from the counter 1005 may be stored in the memory cell 1006 which may be an SRAM. The data stored in the memory cell 1006 may then be read out to the global SRAM 1008.

Figure 11:
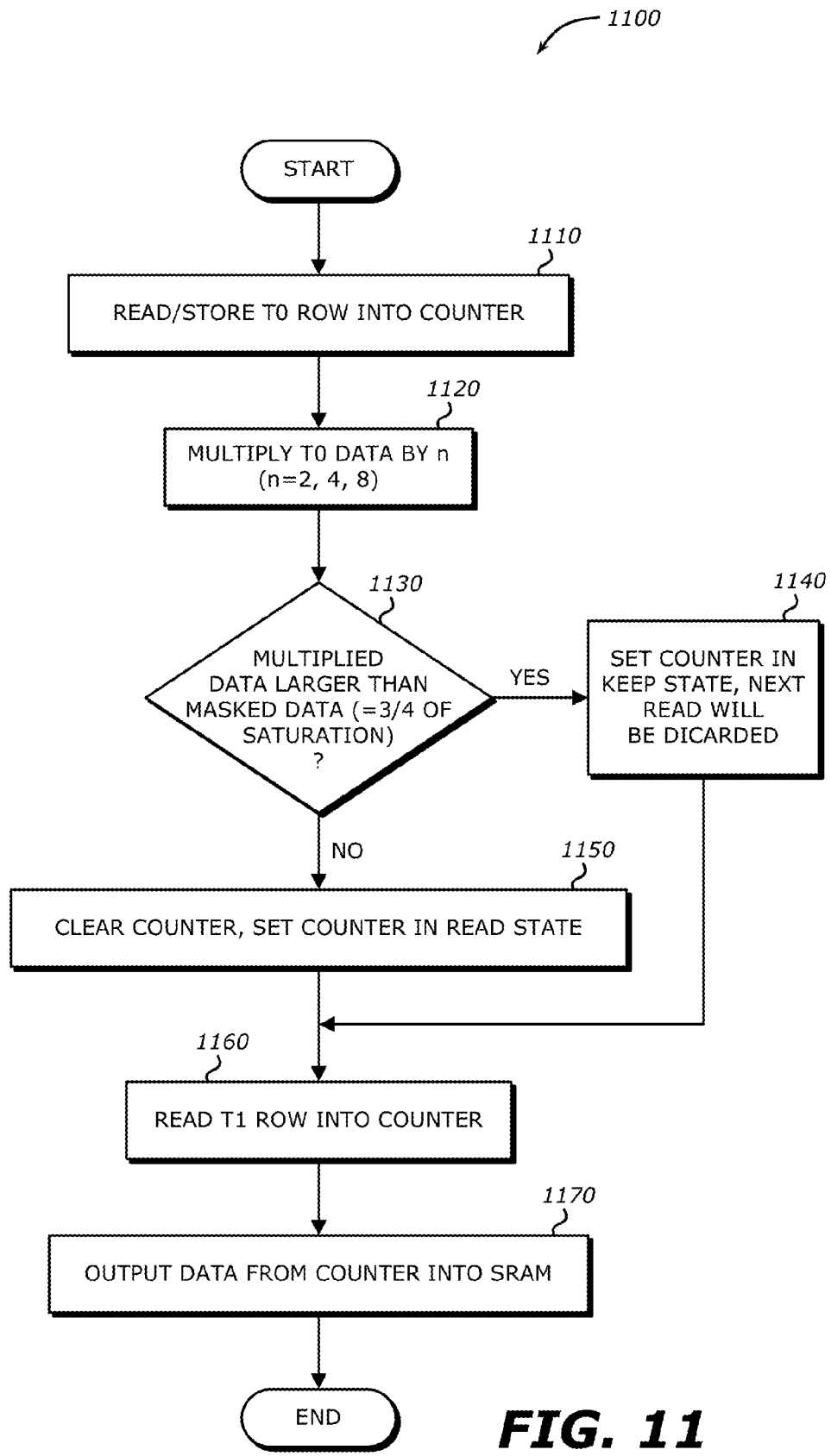
FIG. 11 illustrates a flowchart of an HDR bin algorithm on two-integration time configuration in accordance to one embodiment of the invention.

In some embodiments of the invention, HDR bin algorithms may be implemented using the column parallel ADC 1002 configuration illustrated in FIG. 10. FIG. 11 illustrates a flowchart of an HDR bin algorithm (or method 1100) with two-integration time (t0 and t1) configuration in accordance to one embodiment of the invention. Method 1100 starts with image data from a first super row 801 (e.g., Row<n>) being readout and stored in the arithmetic counter included in the column parallel ADC 1002 (Block 1110). The first super row 801 may be a row having an integration time of t0. At Block 1020, the image data stored in arithmetic counter then multiplied by the ratio n between integration times t0 and t1 (n=2, 4, 8 . . . ). The multiplication can be performed by the arithmetic counter by using a shift function. At Block 1130, the multiplied data is then compared with the masked data. The masked data may be ¾ of the saturation level. If the multiplied data is larger than the masked data, the method continues to Block 1140 where the arithmetic counter is set in keep state. In the keep state, the arithmetic counter discards the image data obtained in the next read operation. If the multiplied data is smaller than the masked data at Block 1130, then the method 1100 continues to Block 1150 where the arithmetic counter is cleared, and set to a read state. In the read state, the arithmetic counter is prepared to store the data obtained in the next read operation. At Block 1160, the image data from a second super row 801 (e.g., Row<n+1>) is readout into the counter. The second super row 801 may be a row having an integration time of t1. If the arithmetic counter is set in the keep state at Block 1140, then the image data from the second super row 801 is discarded and the image data from the first super row is stored in the arithmetic counter. If the arithmetic counter is set in the read state at Block 1150, the arithmetic counter has been cleared at Block 1150 and the image data from the second super row 801 is stored in the arithmetic counter. At Block 1170, the data stored in the arithmetic counter is output to the memory cell which may be an SRAM.

As illustrated in Method 1100, the HDR bin process requires two row readout times to perform one HDR operation and requires the same timing to perform in the row binning mode. Further, the circuit with HDR is greatly simplified when compared to the original two-row concurrent readout without HDR.

There are many non-ideal factors could affect the uniformity when sensor reaches to its saturation level, such as full well variations, channel mismatch, etc. If the saturation level is chosen as the decision point, a very high pixel-wise fixed pattern noise (FPN) could be resulted at the knee point between the super rows 801 (e.g., Row<n> and Row<n+1>). Accordingly, choosing the masked data to be ¾ of the saturation level avoids the issue of the saturation variation. It is understood that any fraction factor (being less than one) can also be chosen.

Some other advantages of this embodiment of the HDR bin architecture includes: (1) an easy switch back to normal binning mode since no timing change is required compared to normal binning mode, (2) a true seamless mode change can be achieved between full resolution mode and HDR bin mode without generating a bad frames, (3) fast readout speed in conjunction with two row concurrent readout, and (4) different integration time is in a unit of a Bayer pattern, thus saving the digital memory for the color descrambler.

Four-Integration Time: t0, t1, t2, t3

While the above embodiments illustrate the HDR bin with two different integration times (t0 and t1), other embodiments may implement a multiple set of integration time configuration (e.g., four integration time) for better Signal-to-Noise Ratio ("SNR") performance.

Figure 12:
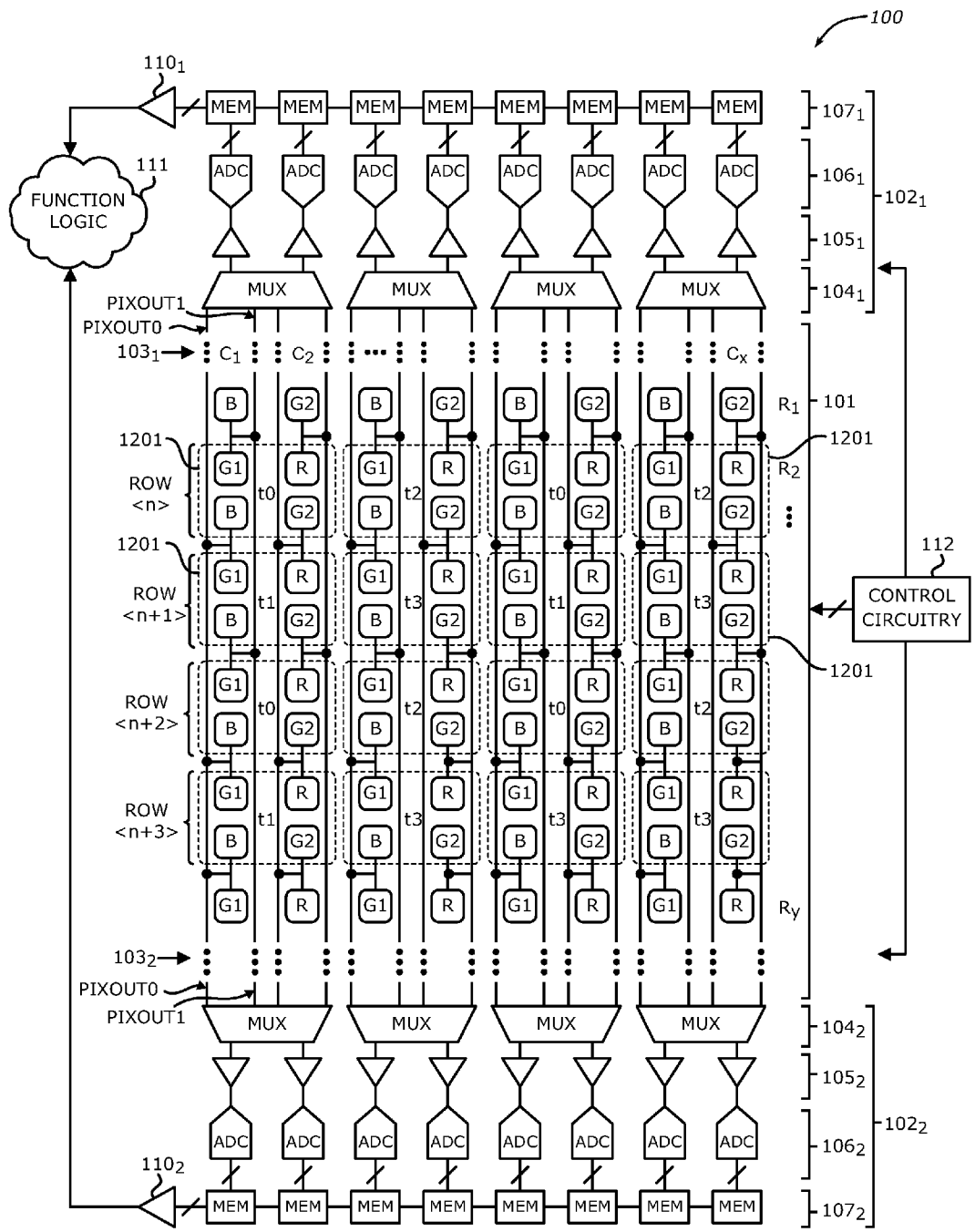
FIG. 12 illustrates a diagram of an imaging system implementing an HDR bin array configuration for four-integration time in accordance to one embodiment of the invention.
Figure 13:
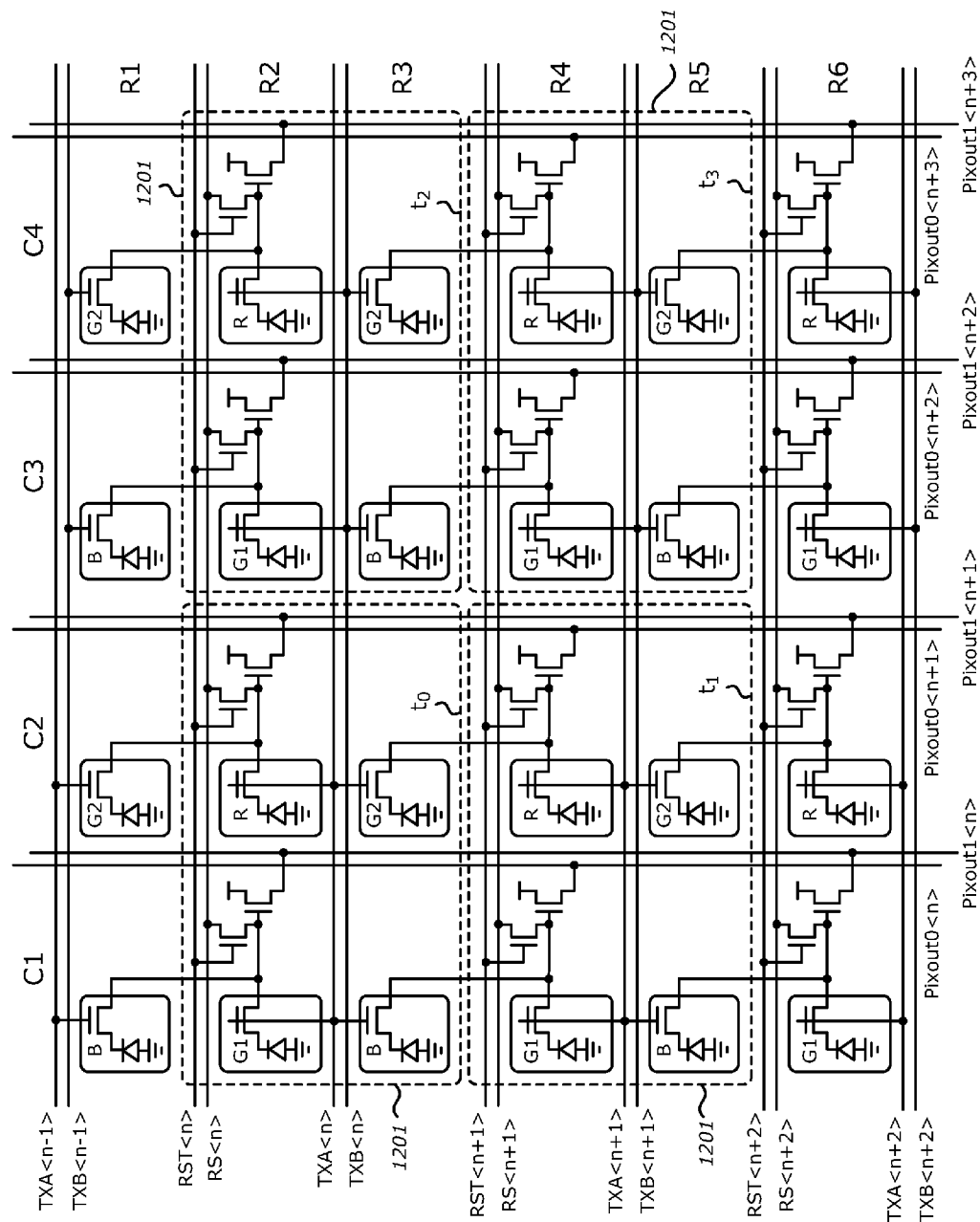
FIG. 13 illustrates a pixel configuration of the HDR bin array in FIG. 12 in accordance to one embodiment of the invention

FIG. 12 illustrates a diagram of an imaging system implementing an HDR bin array configuration for four-integration time in accordance to one embodiment of the invention and FIG. 13 illustrates a pixel configuration of the HDR bin array in FIG. 12 in accordance to one embodiment of the invention.

As shown in FIG. 12 and FIG. 13, a unit cell of including four pixels (referred to as one super pixel 1201) is circled in a dashed line. The super pixel 1201, which is in a Bayer pattern, shares one integration time. As illustrated in FIG. 12, the four sets of integration time (t0, t1, t2 and t3) are interlaced into the entire array. The super pixels 1201 having t0 and t1 integration times are located at a first column that includes two columns of pixels (e.g., C1 and C2) in the pixel array 101. The super pixels 1201 having t2 and t3 integration times are located at a second column that includes two columns of pixels (e.g., C3 and C4). In some embodiments, two adjacent super pixels 1201 may always have different integration times. In some embodiments, the ratio between integration times t0, t1, t2 and t3 are set as a multiple of 2 (i.e., 2, 4 or 8 etc.).

Similar to FIG. 9, in FIG. 13, pixels are arranged in 4 columns (e.g., column C1, C2, C3, and C4) and six rows (e.g., rows R1, R2 . . . R6). The illustrated embodiment of each pixel circuitry includes a photodiode PD, a transfer transistor T1, a reset transistor T2, and a select transistor T3. However, in contrast to the configuration in FIG. 9, two separate transfer (TX) buses (TXA and TXB) in one super row are used in FIG. 13. In this embodiment, the super pixels 1201 having t0 and t1 integration times are connected to the TXA bus while the super pixels 1201 having t2 and t3 integration times are connected to the TXB bus. Taking super pixel 1201 having t0 integration time as an example, during operation, transfer transistor T1 receives a transfer signal TXA, which transfers the charge accumulated in photodiode PD to a floating diffusion node FD. For example, as illustrated in FIG. 13, the transfer transistors T1 in the four pixels included in the super pixel 1201 having t0 integration time all receive the same transfer signal TXA (e.g. TXA<n>). Further, in each pixel in the super pixel 1201, reset transistor T2 is coupled between a set signal RS and the floating diffusion node FD to reset the pixel (e.g., discharge or charge the FD and the PD) under control of a reset signal RST and the set signal RS. The floating diffusion node FD is coupled to control the gate of select transistor T3. Select transistor T3 is coupled between the power rail VDD and the readout column line. Based on the FD at the control gate of the select transistor T3, select transistor T3 selectively couples the output of pixel circuitry to the readout column line.

Since there are two TX buses (e.g., TXA<n> and TXB<n>) in one row address (e.g., Row<n>), the row driver included in the control circuitry 112 is required include two shutter pointers (or pre-charge). These two shutter pointers may be implemented in the current digital platforms. In one embodiment, the image data from the four super pixels 1201 having integration times t0, t1, t2, and t3 will then be combined to perform the HDR operation in the column parallel ADC level 1002 and global SRAM level 1008.

Figure 14:
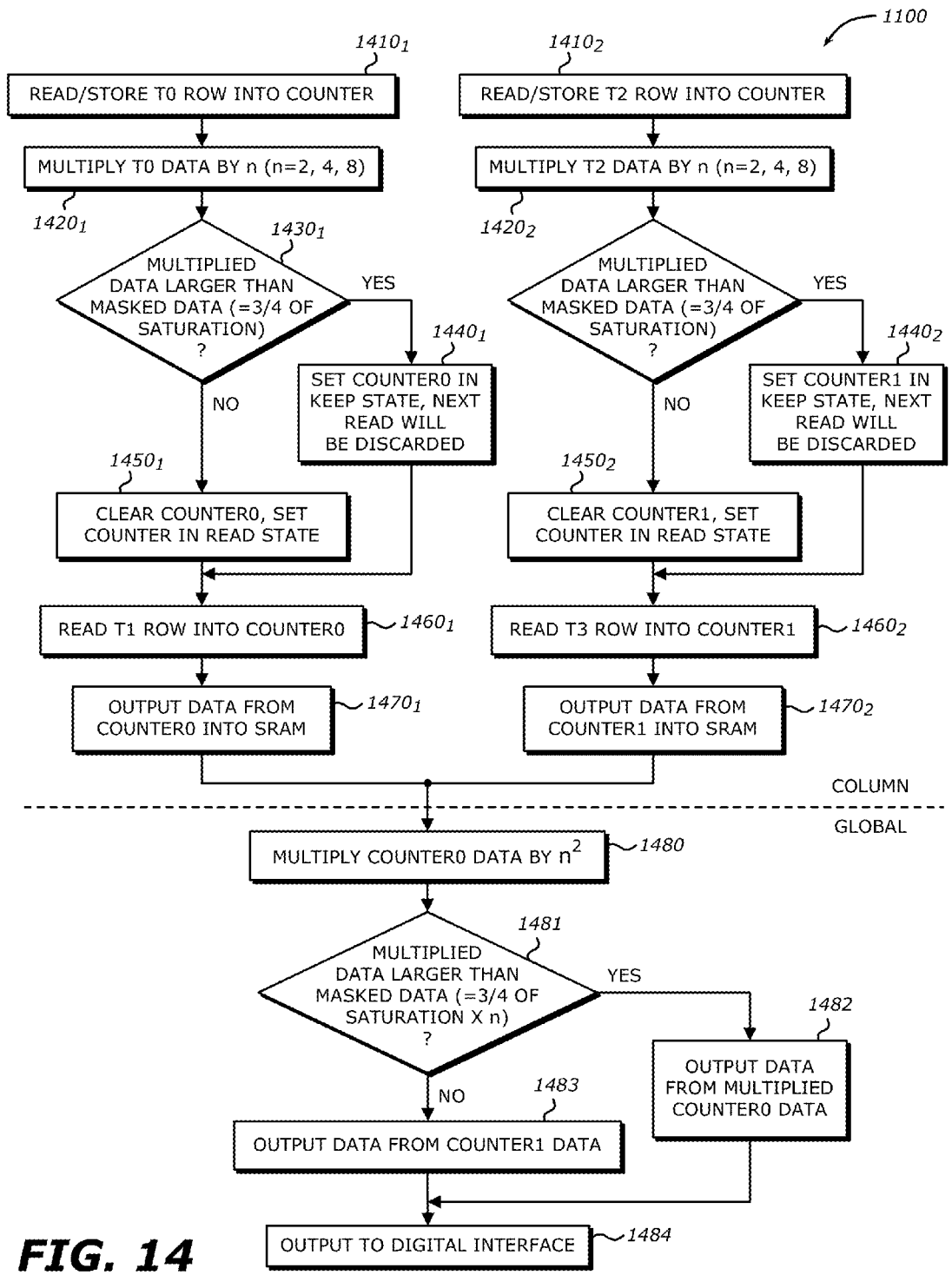
FIG. 14 illustrates a flowchart of an HDR bin algorithm with 4 integration time in accordance to one embodiment of the invention.

FIG. 14 illustrates a flowchart of an HDR bin algorithm (Method 1400) with four-integration time (t0, t1, t2, and t3) in accordance to one embodiment of the invention. In contrast to the flowchart 1100 with two-integration time in FIG. 11, two parallel processes are performed for (i) the image data from the super pixels having t0 and t1 integration time and (ii) the image data from the super pixels having t2 and t3 integration time, respectively, by arithmetic counters and further, additional processes are performed in a global SRAM level (illustrated below the dashed line in FIG. 14). As illustrated in FIG. 13, super pixels having t0 and t1 integration time are located in separate columns from the super pixels having t2 and t3 integration time. Accordingly, a first arithmetic counter in one column parallel ADC may process the image data from the super pixels having t0 and t1 integration time and a second arithmetic counter in another column parallel may process the image data from the super pixels having t2 and t3 integration time.

In FIG. 14, method 1400 starts at Blocks 1410₁ and 1410₂ simultaneously where the image data from a first super pixel 1210 having a t0 integration time is readout and stored in a first arithmetic counter included in a first column parallel ADC (Block 14100 and the image data from a third super pixel 1210 having a t2 integration time is readout and stored in a second arithmetic counter included in the second column ADC (Block 1410₂). At Blocks 1420₁ and 1420₂, the image data stored in the first arithmetic counter and the second arithmetic counter are multiplied by the ratio between integration times, n (n=2, 4, 8 . . . ), respectively. The multiplication can be performed by the arithmetic counters by using a shift function. At Blocks 1430₁ and 1430₂, the multiplied data is then compared with the masked data. The masked data may be ¾ of the saturation level. If the multiplied data is larger than the masked data, the method continues to Blocks 1440₁ and 1440₂ where the first and second arithmetic counters are set in keep state. In the keep state, the first and second arithmetic counters discards the image data obtained in the next read operation. If the multiplied data is smaller than the masked data at Blocks 1430₁ and 1430₂, then the method 1400 continues to Blocks 1450₁ and 1450₂ where the first and second arithmetic counters are cleared, and set to a read state. In the read state, the first and second arithmetic counters are prepared to store the data obtained in the next read operation.

At Block 1460$_k$, the image data from a second super pixel 1210 having a t1 integration time is readout. If the first arithmetic counter is set in the keep state at Block 1440$_k$, then the image data from the second super pixel is discarded and the image data from the first super pixel is stored in the first arithmetic counter. If the first arithmetic counter is set in the read state at Block 1450$_k$, the first arithmetic counter has been cleared at Block 1450₁ and the image data from the second super pixel is stored in the first arithmetic counter.

Similarly, at Block 1460₂, the image data from a fourth super pixel 1210 having a t3 integration time is readout. If the second arithmetic counter is set in the keep state at Block 1440₂, then the image data from the fourth super pixel is discarded and the image data from the third super pixel is stored in the second arithmetic counter. If the second arithmetic counter is set in the read state at Block 1450₂, the second arithmetic counter has been cleared at Block 1450₂ and the image data from the fourth super pixel is stored in the second arithmetic counter.

At Blocks 1470₁ and 1470₂, the data stored in the first and second algorithmic counters are output to a first and second memory cell, respectively. The first and second memory cells may be SRAMs. These two parallel process branches (Blocks 1310 to 1370) are performed at exact the same time. However, it is understood that their comparison results may be different and their following processes may be deviated as well.

The final data stored in the first and second memory cells in the column parallel ADCs are read out to the SRAM in the global level. At Block 1480, the data from the first arithmetic counter (obtained at Block 14700 is multiplied by factor n to the power of 2 (i.e., n²) in the SRAM in the global level. The n value having been set at Block 1420₁. The multiplication may be performed by using a bit shifting function.

At Block 1481, the multiplied data from the first arithmetic counter is compared to the masked value. In some embodiments, the masked value is ¾ of saturation level at integration time t2 multiplied by n. If the multiplied data from the first arithmetic counter is larger than the masked value, the method 1400 proceeds to Block 1482 and the data from first arithmetic counter is selected. Otherwise, the method proceeds to Block 1483 and the data from the second arithmetic counter is selected. At Block 1484, the data that is selected is output to the digital interface.

It is noted that the four integration time embodiment illustrated in FIGS. 12-14 may easily be modified to obtain the two integration time embodiment illustrated in FIGS. 8-9 by simply tying transfer buses TXA and TXB together. Further, the two and four integration time HDR bin embodiments are described above may also be expanded into higher multiple integration times as well as altered into different arrangement of super pixels with different integration times. In one example, super pixels having integration times t0, t1, t2 and t3 may be arranged in the same row by adding TXC and TXD control signals. In another example, a 3×3 super pixel arrangement including three rows (e.g., R1, R2, and R3) and three columns (e.g., C1, C2, and C3) may be implemented with a total nine different integration times (i.e., t0 to t8).

HDR Response and SNR Discussion

In the following examples, the final output response curve before (FIG. 15) and after the HDR bin operation (FIG. 16) are based on exemplary pixel data obtained from a 1.4 um pixel and a four integration time embodiment. As discussed above, the ratio factor n is multiple of 2 (i.e. n=2, 4, 8, etc.) which depends on the desired the dynamic range. A higher ratio factor n results in a higher dynamic range. The ratio of integration times t0, t1, t2 and t3 used in this example is 2 for simplicity. Accordingly, the ratios of t0, t1, t2, and t3 are as follows:

$T0:T1:T2:T3=1:2:4:8$

Other pixel facts used in this example are listed in the following table:

| | |
|---|---|
| Sensitivity | 800 mV/lux * s |
| Integration time t0 | 5 ms |
| Integration time t1 | 10 ms |
| Integration time t2 | 20 ms |
| Integration time t3 | 40 ms |
| Full well | 8000 e |
| CG | 200 μV/e |
| Saturation output | 1.6 V |
| ¾ saturation output | 1.2 V |

Figure 15:
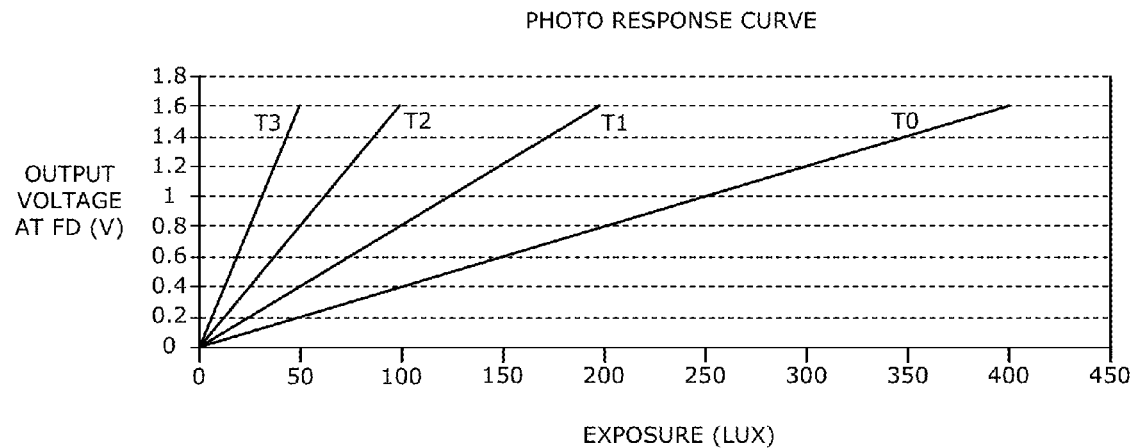
FIG. 15 illustrates a graph of the output response of individual integration times, t0, t1, t2, and t3, before applying the HDR bin algorithm in accordance to one embodiment of the invention.
Figure 16:
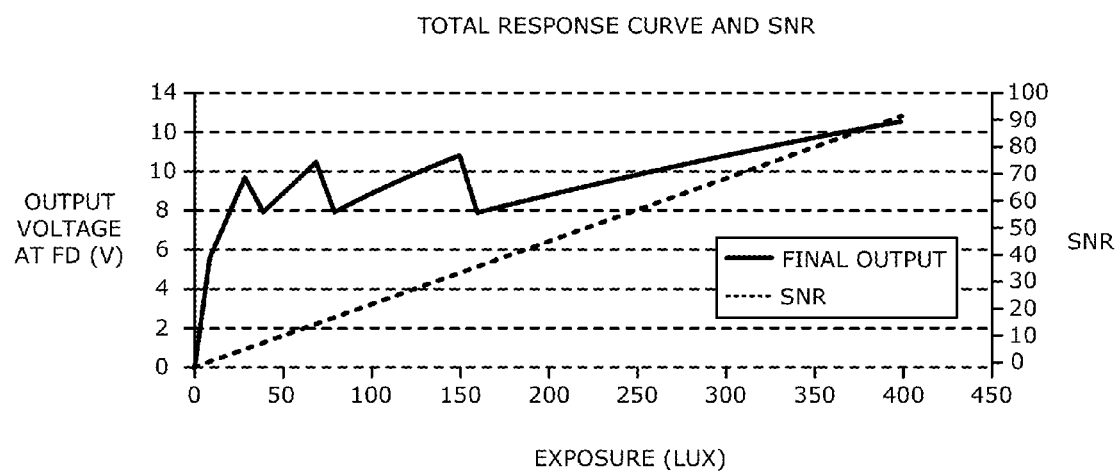
FIG. 16 illustrates a final response curve after applying the HDR bin algorithm and the corresponding Signal-to-Noise Ratio (SNR) in accordance to one embodiment of the invention.

FIG. 15 illustrates a graph of the output response of individual integration times, t0, t1, t2, and t3, before applying the HDR bin algorithm in accordance to one embodiment of the invention. FIG. 16 illustrates a final response curve after applying the HDR bin algorithm and the corresponding Signal-to-Noise Ratio (SNR) in accordance to one embodiment of the invention. As shown in FIG. 15, shorter integration time results in a response curve's slope being lower. Although the shortest integration time also gives us the widest light response spectrum, FIG. 16 shows the Signal-to-Noise Ratio (SNR) at the low light end to be very poor. Accordingly, a longer integration time in this HDR bin algorithm at the low light end is desired to maximize its SNR performance. Further, as shown in FIG. 16, the final response curve is a straight line response, which facilitates digital processing such as Back-Light Compensation (BLC) and color demosaicing. Additionally, the final equivalent full well is increased from 1.6V (at floating diffusion node) to 12.8V, which is an 8× improvement. That corresponds to a dynamic range improvement of 20 log(12.8/1.6)=18 dB. Equivalently, the output bit resolution is increased by 3 bit (for example, from 12 bit to 15 bit). This improvement is especially significant for the smaller pixel size having a full well capacity that keeps reducing. This embodiment of the HDR bin provides a way to boost the full well capacity with little cost added to the counter and SRAM.

Figure 17:
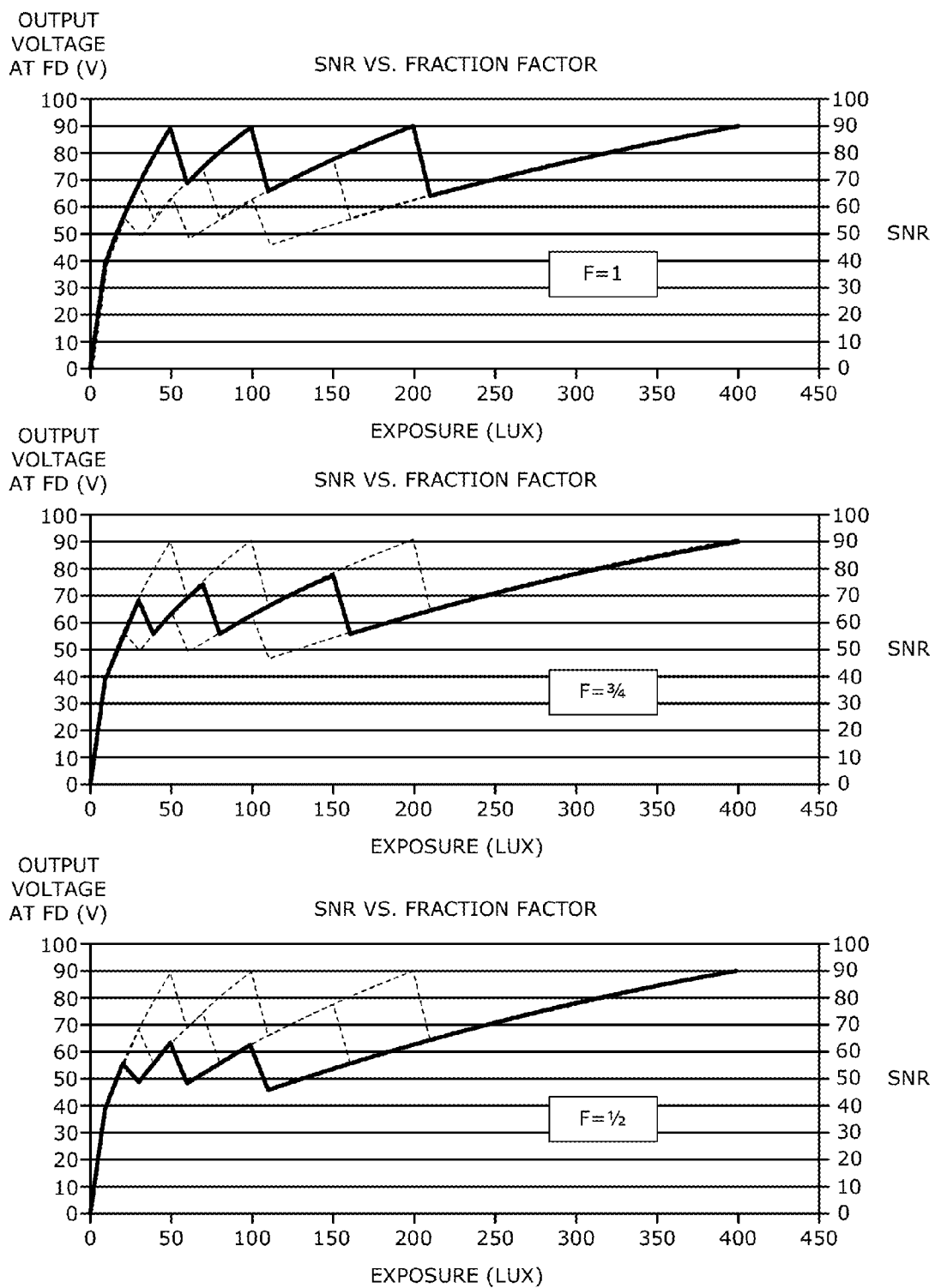
FIG. 17 illustrates final SNR curves for different fraction factors in accordance to one embodiment of the invention.

In FIG. 16, the SNR curve is zigzagged along the edge of the switching point or knee point. Digital processing to smooth the edge of this knee point may be performed to reduce the noise at this point. As discussed above, the fraction factor used as an example is ¾ in order to avoid saturation non-uniformity. FIG. 17 illustrates final SNR curves for different fraction factors in accordance to one embodiment of the invention. As mentioned earlier, the different values used for the fraction factors will affect the final SNR curve. FIG. 17 provides a comparison between the SNR curves wherein the fraction factors is 1, ¾ and ½. The higher fraction factor tends to result a higher SNR response. The choice of fraction factor is affected by the need to avoid saturation non-uniformity and circuit complexity to implement desired fraction factor.

Part III: An Arithmetic Counter Circuit, Configuration and Application for High Performance CMOS Image Sensors Among different approaches of column ADC architecture, single slope ADC is gaining more popularity because of its simple structure that provides more advantages on power consumption and area efficiency. However, the speed obtained when using a single slope ADC is slower than the speed obtained when using other types of ADC (e.g., SAR and cyclic, flash). This speed difference is especially noticeable in higher bit resolution cases. Nonetheless, the speed in the single slope ADC is sufficient for most of the mainstream imaging still capture or video applications.

Figure 18:
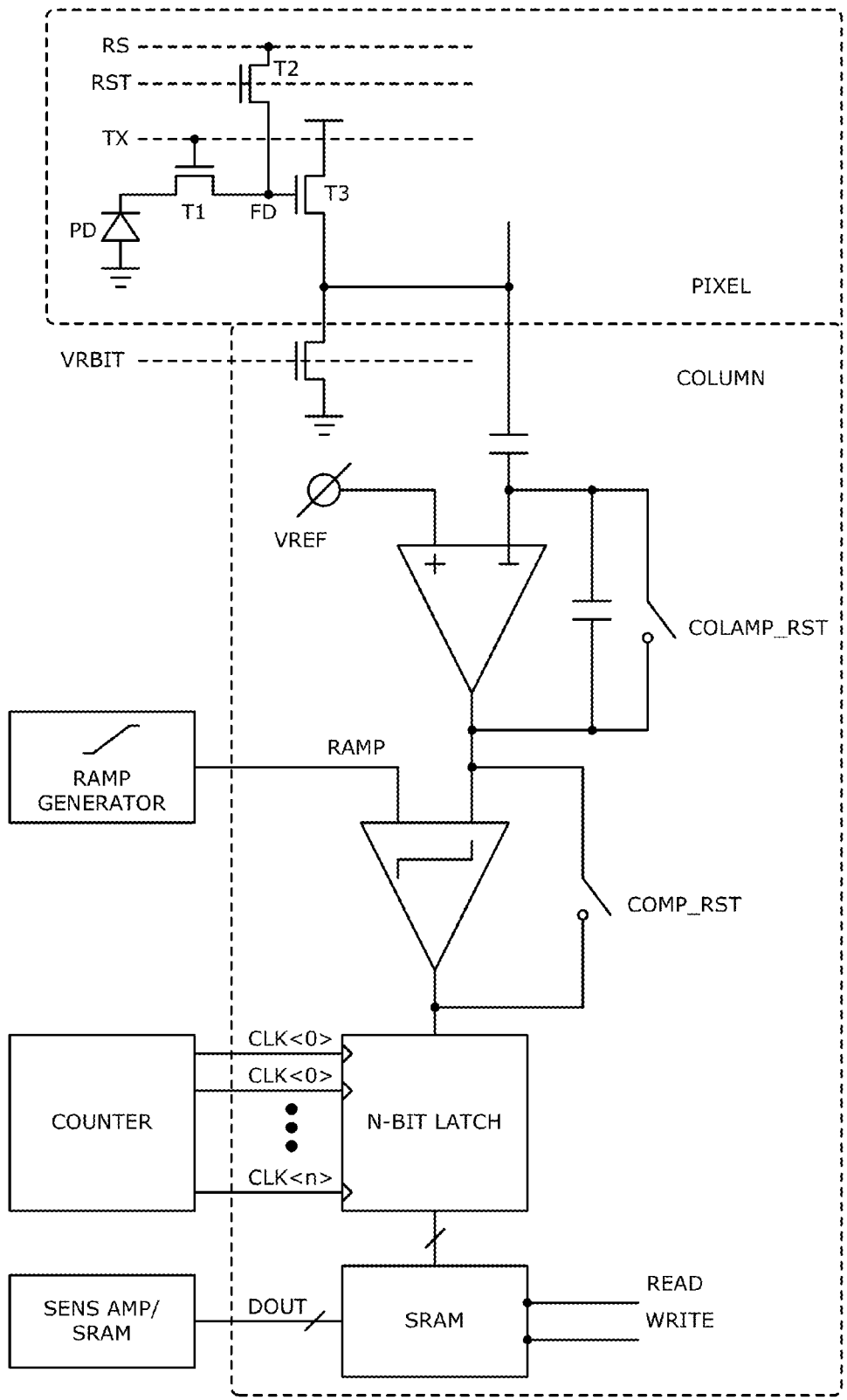
FIG. 18 illustrates a first conventional single slope ADC architecture.

FIG. 18 illustrates a first conventional single slope ADC architecture. In this first conventional single slope ADC, a comparator reset switch (comp_rst) is included to perform the auto-zero operation which cancels the offset of pixel black level as well as the comparator offset. Since this operation is performed in the analog domain, it is often referred to as analog Correlated Double Sampling (CDS). The output of the comparator is connected to an N bit latch, where N denotes the bit resolution of the ADC. In FIG. 18, a total number of N clock signals are input from global counter driver. Finally, the latch data is output to SRAM and further to the global sense amplifier and SRAM.

There are several drawbacks to the first conventional single slope ADC from FIG. 18. For instance, while the first conventional single slope ADC uses analog CDS to cancel the offset of pixel and comparator, the delay error of the comparator cannot be canceled. The delay error of the comparator is defined as the time delay from the crossing point of the input signal to the switching point of the digital output. The delay error on the output of the comparator (comp_out) can directly affect the digitized output code. Since the delay error is determined by the group delay of each comparator stages, the delay error varies from column to column and thus, a big column fixed pattern noise (FPN) may result. Further, a total number of N counter clock signals (i.e., clk<0>, clk<1>, ... clk<n>) which travel the entire column of the pixel array are needed. Thus, the design of the first conventional signal slope ADC that includes the N counter clock signals in combination with the distributed clock driver requires a significant amount of silicon area. Moreover, another drawback of the first conventional single slope ADC is the switching noise coupling to other signals.

Figure 19:
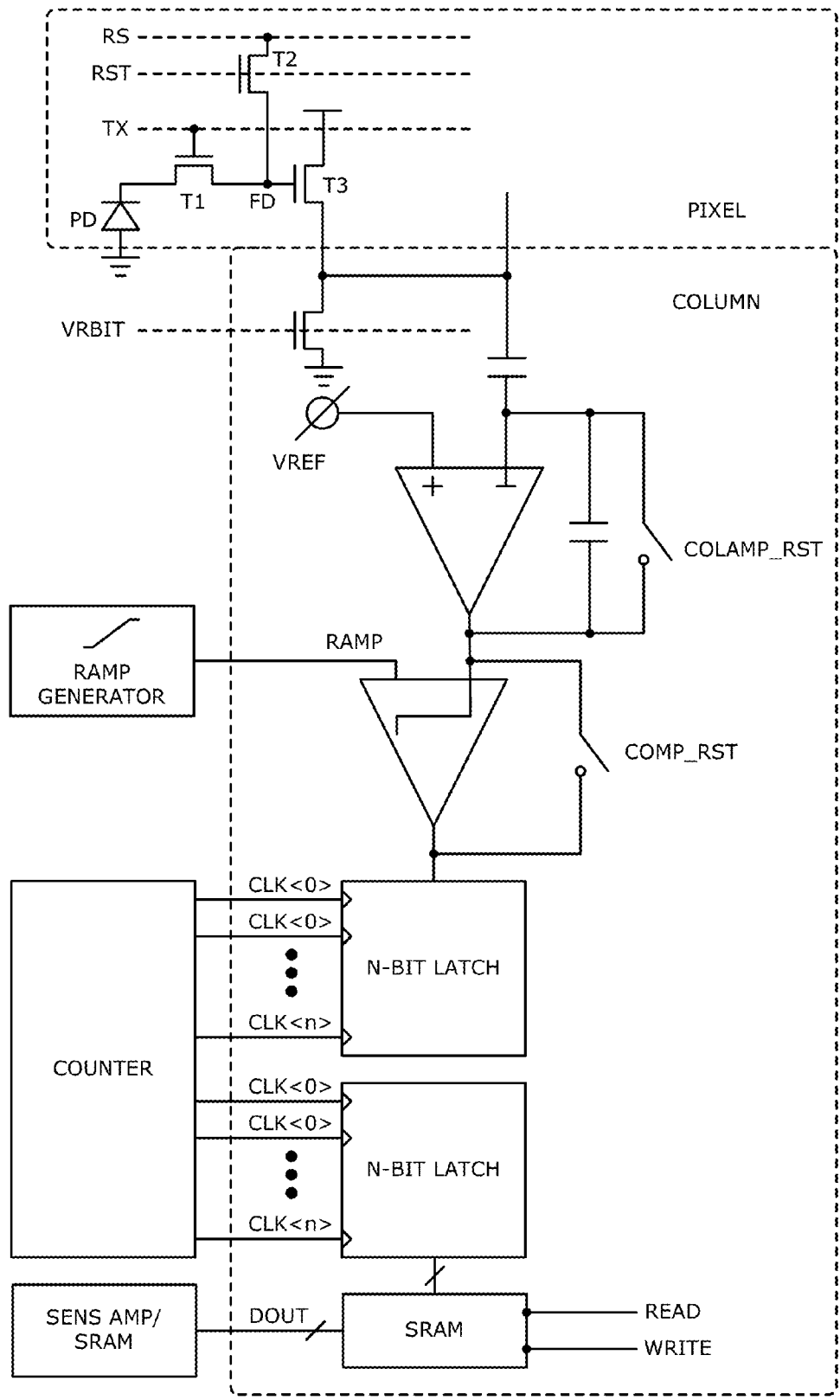
FIG. 19 illustrates a second conventional single slope ADC architecture.

FIG. 19 illustrates a second conventional single slope ADC architecture. In this second conventional single slope ADC architecture, a second N bit latch is added to the architecture of FIG. 18. The two individual N bit latches are used to store the output data from the reset and the output data from the signal, respectively. In this architecture, two steps of ramp signal from the ramp generator are needed to finish the conversion: one step of the ramp signal for the reset level and another step of the ramp signal for the signal level. Since the comparator delay error is included in both outputs (e.g., reset and signal), the delay error can be canceled after a subtraction is performed between the two outputs. In the second conventional single slope ADC architecture, the noise issue of the counter clock can be elevated by using a gray code topology on the counter clock.

Although second conventional single slope ADC illustrated in FIG. 19 has improvements over the first conventional single slope ADC in FIG. 18, there remains several drawbacks. For instance, (i) the two latches double the required column height, (ii) the counter clocks and their distributed drivers consume a significant amount of silicon area, (iii) in order for the two sets of N bit data, reset, and signal, of one row of the pixel array to be readout within one row time, the readout speed must be doubled which further increases the consumption of power, and (iv) a subtraction unit as well as a gray-to-binary converter are required to reconstruct the final signal, thus the silicon area and power consumption required are further increased.

Figure 20:
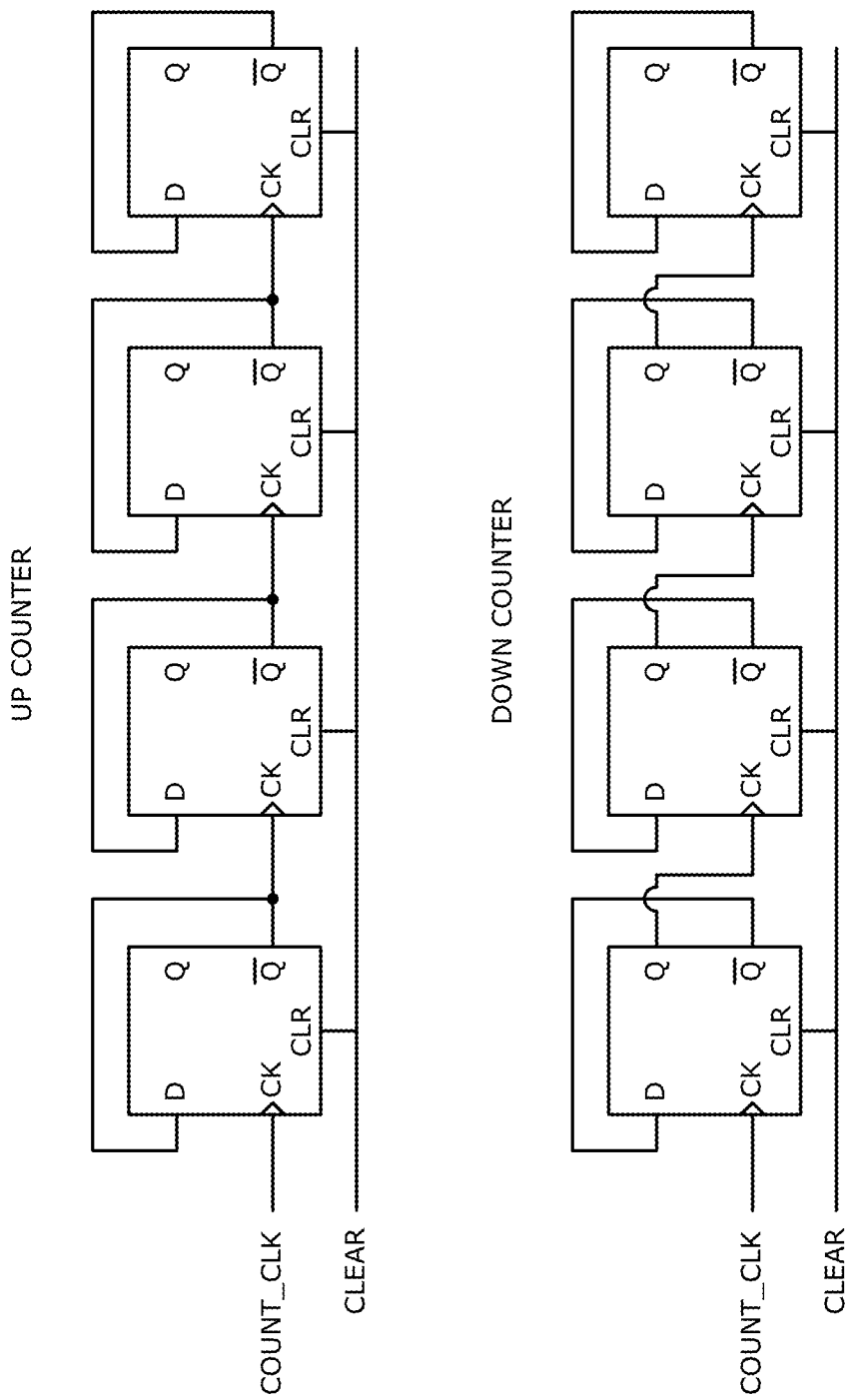
FIG. 20 illustrates a first conventional counter configuration with up and down counting.

FIG. 20 illustrates a first conventional counter configuration with up and down counting. An asynchronous counter is used as a central unit for the conventional single slope ADC used in CMOS image sensors. Traditional asynchronous counters use the cascade configuration of a plurality of T flip-flops stages as shown in FIG. 20. As illustrated in FIG. 20, each T flip-flop is implemented using a D flip-flop with QB tied to D input. The stage output toggles when it sees a negative (or positive) edge of the output signal from the previous stage. There is always a divide by two operations along the counter stages such that a counting operation can be performed. The counter can either perform an up or down counting with QB or Q connected to its following consecutive stage clock input, respectively. Further, a clear signal connects to each D flip-flop in the counters to reset the D flip-flop outputs to zero at the same time.

Figure 21:
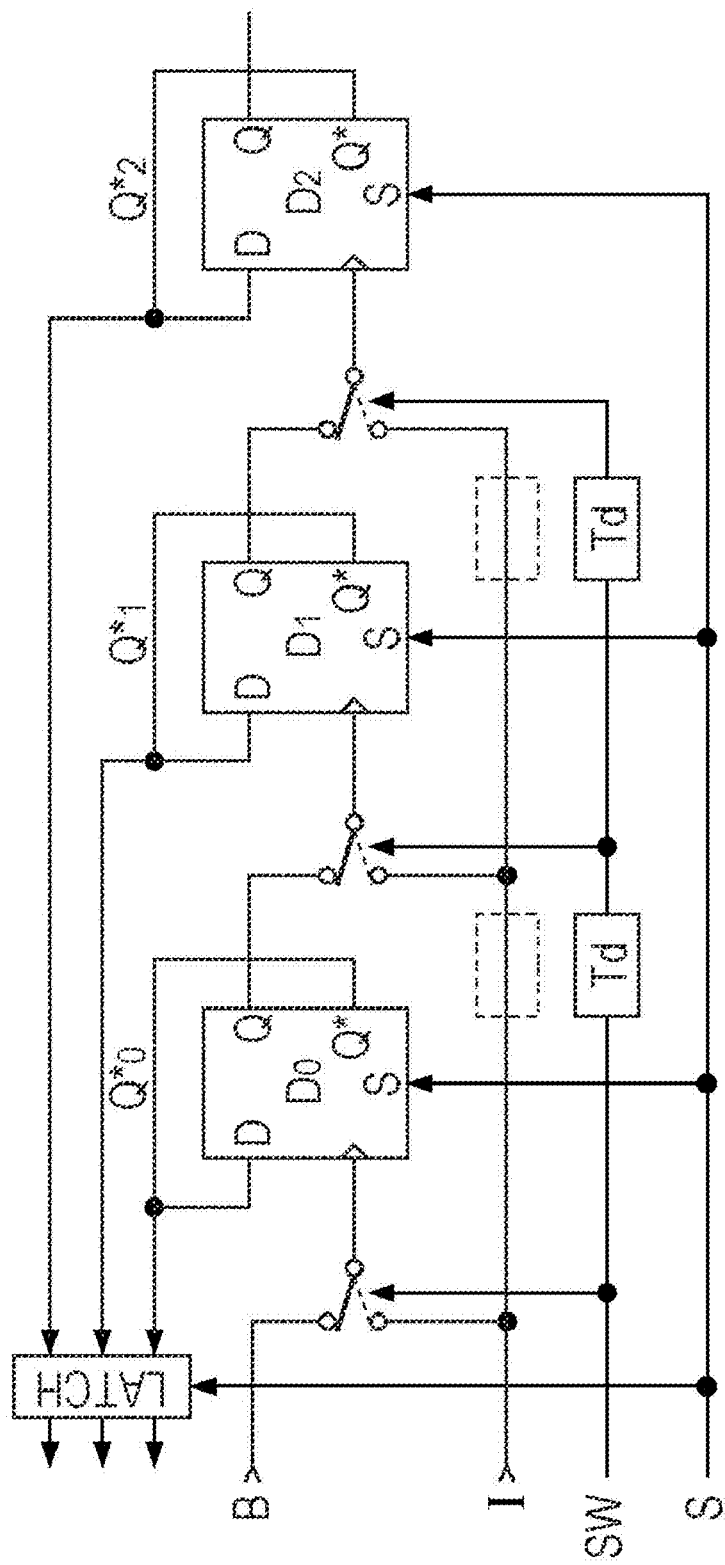
FIG. 21 illustrates a second conventional counter configuration.
Figure 22:
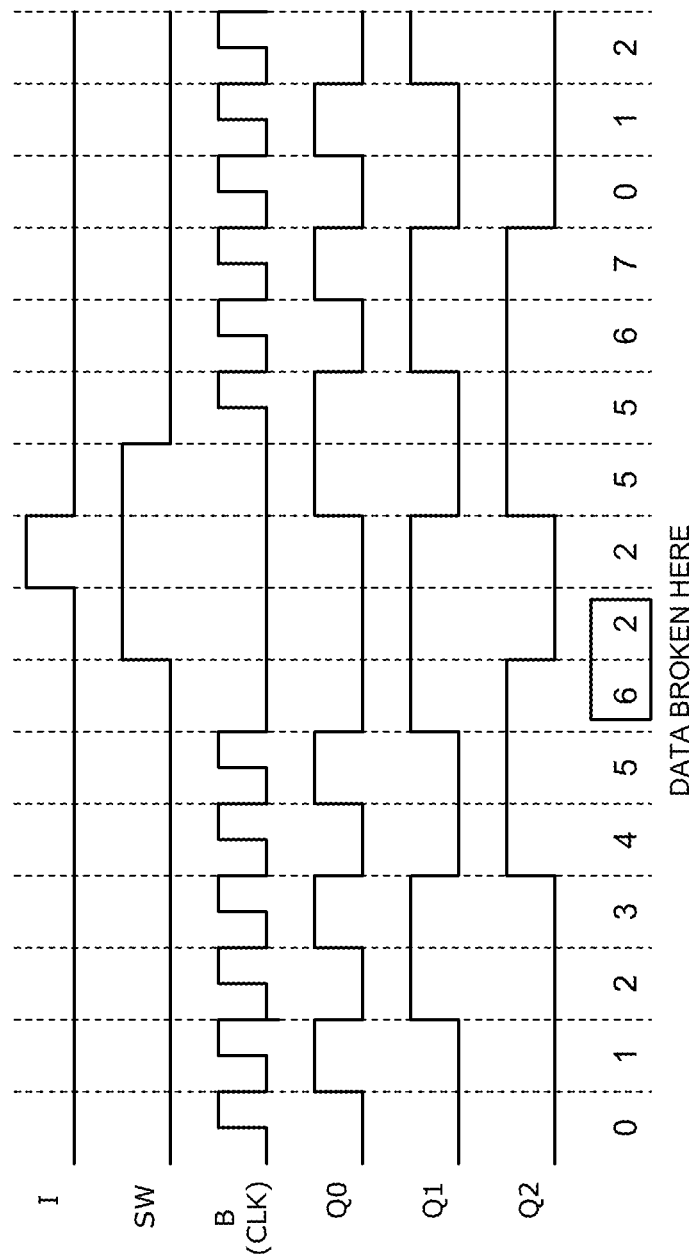
FIG. 22 illustrates a timing diagram showing the holding issue that arises in the second conventional counter configuration from FIG. 21.

FIG. 21 illustrates a second conventional counter configuration. In this counter configuration, a switch controlled by a switch signal (SW) is added between stages to switch the counter between counting mode and inversion mode. In counting mode, the switch connects the B signal to first stage flip-flop and the Q signal output to the next stage flip-flop. In inversion mode, all the outputs of the counter stages are inverted. The inversion is obtained by cutting the connection between stages and connecting the clock input from a global control signal (I). When all counter stages see the rising edge of the control signal, their output toggles from its original value all at the same time, making the final output code an inversion of its original one. However, without modification, this counter cannot be used in the CMOS image sensor, because the output cannot hold the data stored therein when changing between counter mode and inversion mode. FIG. 22 illustrates a timing diagram showing the holding issue that arises in the second conventional counter configuration from FIG. 21. When the SW signal is high to select the inversion mode, the counter cannot hold the data stored therein (i.e., 6). This issue limits the second conventional counter configuration's application in many systems that require a continuous operation.

Figure 23:
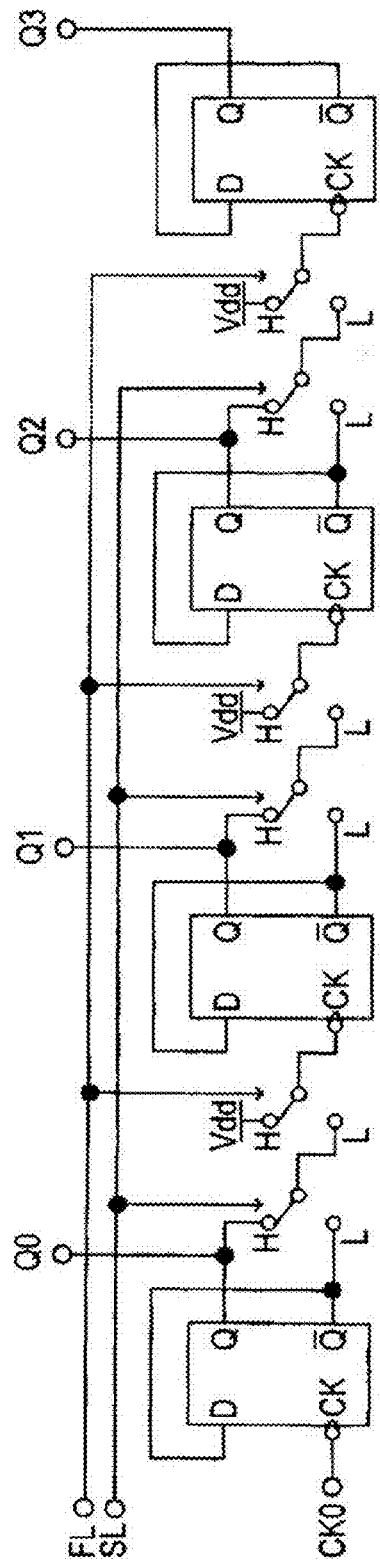
FIG. 23 illustrates a third conventional counter configuration.
Figure 24:
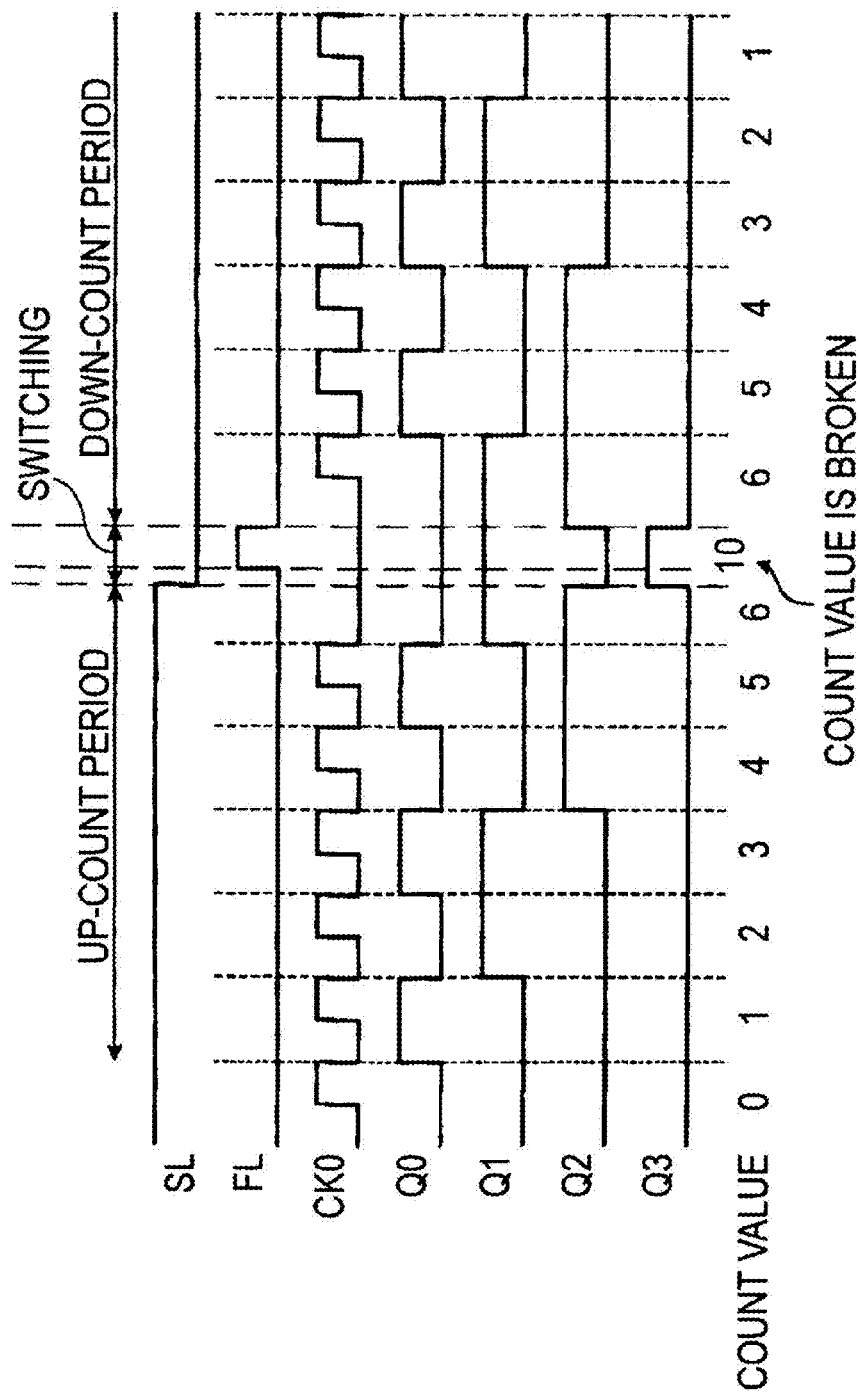
FIG. 24 illustrates a timing diagram showing data recovering after data is broken in the third conventional counter configuration from FIG. 23.

FIG. 23 illustrates a third conventional counter configuration. This third conventional counter configuration addresses a code holding issue that arises when changing the counter mode between up-counting and down-counting. FIG. 24 illustrates a timing diagram showing data recovering after data is broken in the third conventional counter configuration from FIG. 23. The third conventional counter configuration uses a 2-in-1-out MUX placed after the up/down switch for each stage and switches between previous switch output and a power connection, Vdd. The purpose of this MUX is to recover and correct the error caused by the mode switching. However, this third conventional counter configuration does not address other operation modes of the counter such as multiplication, division and other functionalities.

Accordingly, some embodiments of the present invention implements a new column parallel conversion architecture using an arithmetic counter, in which arithmetic operations (i.e., addition, subtraction, multiplication and division) can be performed.

Counter Circuit

Figure 25:
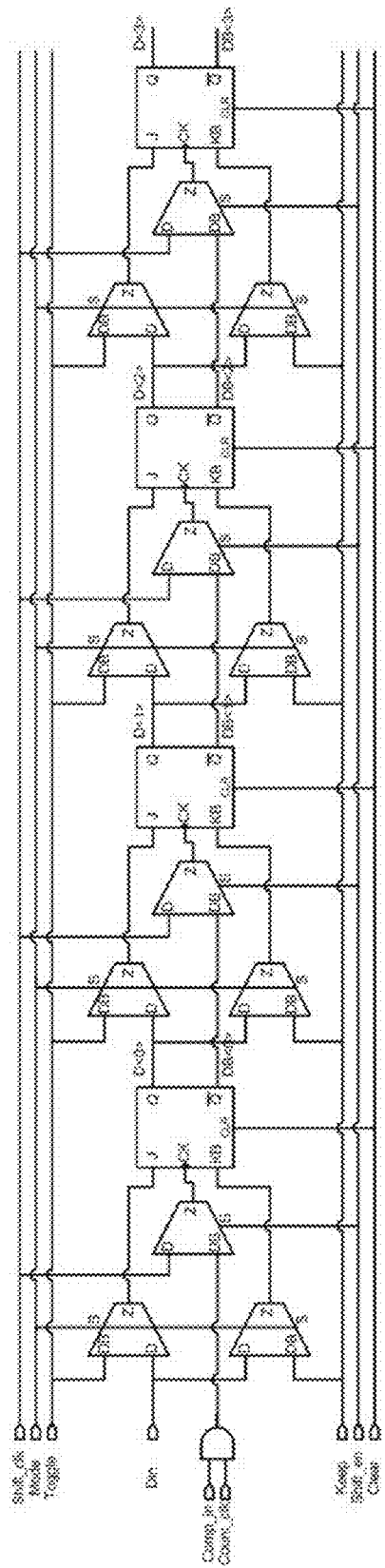
FIG. 25 illustrates a diagram of the arithmetic counter according to one embodiment of the invention.

FIG. 25 illustrates a diagram of the arithmetic counter according to one embodiment of the invention. In this embodiment, a plurality of J-K flip-flops and a plurality of MUX are used. The J-K flip-flop has the capability of switching between Toggle and Keep state. As shown in the truth table (Table 1) below, using the J-K flop-flop as a latch, all input combination may be used to obtain functions such as Keep, Reset, Set, and Toggle.

TABLE 1

Truth Table

| J | K | Q (n − 1) | Q (n) | Function |
|---|---|---|---|---|
| 0 | 0 | 0 | 0 | Keep |
| 0 | 0 | 1 | 1 | |
| 0 | 1 | 0 | 0 | Reset |
| 0 | 1 | 1 | 0 | |
| 1 | 0 | 0 | 1 | Set |
| 1 | 0 | 1 | 1 | |
| 1 | 1 | 0 | 1 | Toggle |
| 1 | 1 | 1 | 0 | |

The logic expression of a J-K flip-flop is:

$$Q(n)=J*QB(n-1)+KB*Q(n-1)$$

For example, when inputs J=0 and KB=1, then the J-K flip-flop will hold its previous data: $Q(n)=Q(n-1)$. When inputs J=1 and KB=0, then the flip-flop will toggle from its previous state: $Q(n)=QB(n-1)$.

The J-K flip-flops are used as the basic building unit of the arithmetic counter in the embodiment illustrated in FIG. 25. As an example and for simplicity, four bit counter units are used in this embodiment. It is understood that other sized counter units may be used.

In contrast to the first conventional counter as illustrated in FIG. 20, in this embodiment, three digital multiplexers (MUX) are added in each counter stage. These MUX are used to control the connectivity and thus achieving different functions of the arithmetic counter. Four control signals (i.e., toggle, keep, shift_en, mode) are used to control which inputs are connected to the output in the three digital MUX. In this embodiment, toggle and keep signals may be two complementary signals and may be treated like one in the timing control diagram. The MUX can be implemented using a transmission gate or a AOI (Z=A*X+B*Y) gate configurations. Count_clk signal provides a clock signal. A shift_clk signal, which may be different from the count_clk, may also be used to provide a separate clock control when used in a shift or inversion mode. Comp_in signal is the output from the comparator. Din signal is the digital input to the first stage during the shift mode.

Figure 26:
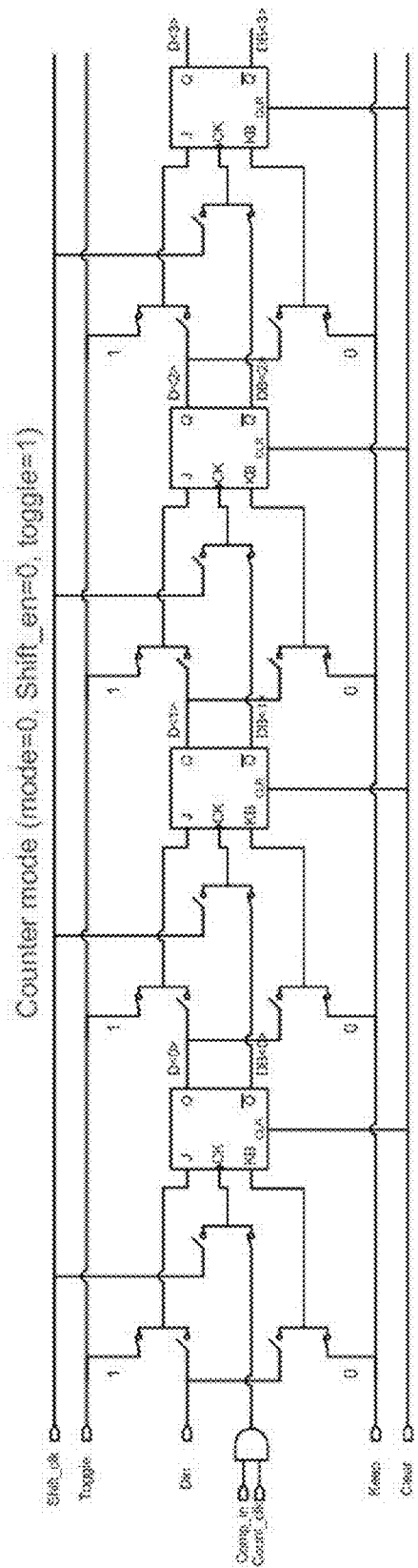
FIG. 26 illustrates a diagram of the arithmetic counter in counter mode according to one embodiment of the invention.
Figure 27:
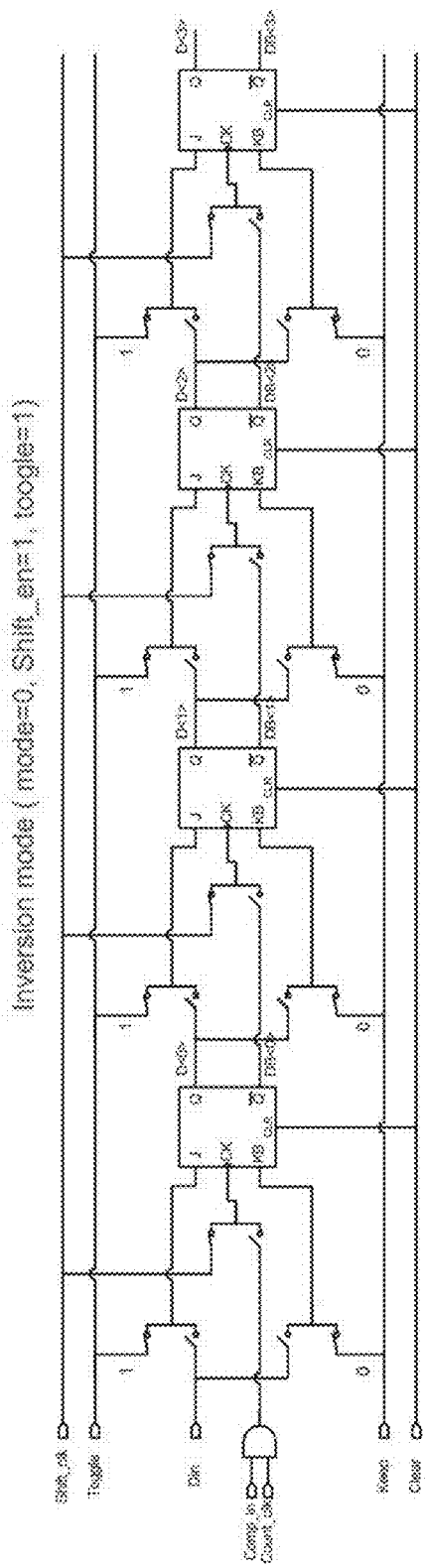
FIG. 27 illustrates a diagram of the arithmetic counter in inversion mode according to one embodiment of the invention.

In some embodiments, the counter from FIG. 25 can be configured into three different modes: counter mode, inversion mode and shift mode. FIG. 26 illustrates a diagram of the arithmetic counter in counter mode according to one embodiment of the invention. In FIG. 26, the digital MUX is replaced with a two-switch symbol to clearly demonstrate the connectivity. Counter mode is set when mode=0, shift_en=0, and toggle=1. In this configuration, J is connected to "1", KB is connected to "0" such that, using the logic expression of a J-K flip-flop above, $Q(n)=QB(n-1)$. Thus, a toggle configuration is obtained. Additionally, each stage's clock input is obtained from the previous stage QB output. Referring to FIG. 26, the counter configuration is set in an up counting mode but it can be set in a down counting mode by connecting Q to the next stage's clock input. A clear signal is to reset all counter stages' output before the start of a new counting operation FIG. 27 illustrates a diagram of the arithmetic counter in inversion mode according to one embodiment of the invention. Inversion mode is used to invert the output of all stages from its original value. The arithmetic counter in inversion mode is set when mode=0, shift_en=1 and toggle=1. In this configuration, similar to the counter mode, each flip-flop stage is in a toggle configuration. However, each stage's clock input is connected to a common shift_clk signal. There are no connection between consecutive stages such that for each negative edge of shift_clk signal, each flip-flop stage toggles its output once, leading to an inversion operation of the final output code.

Figure 28:
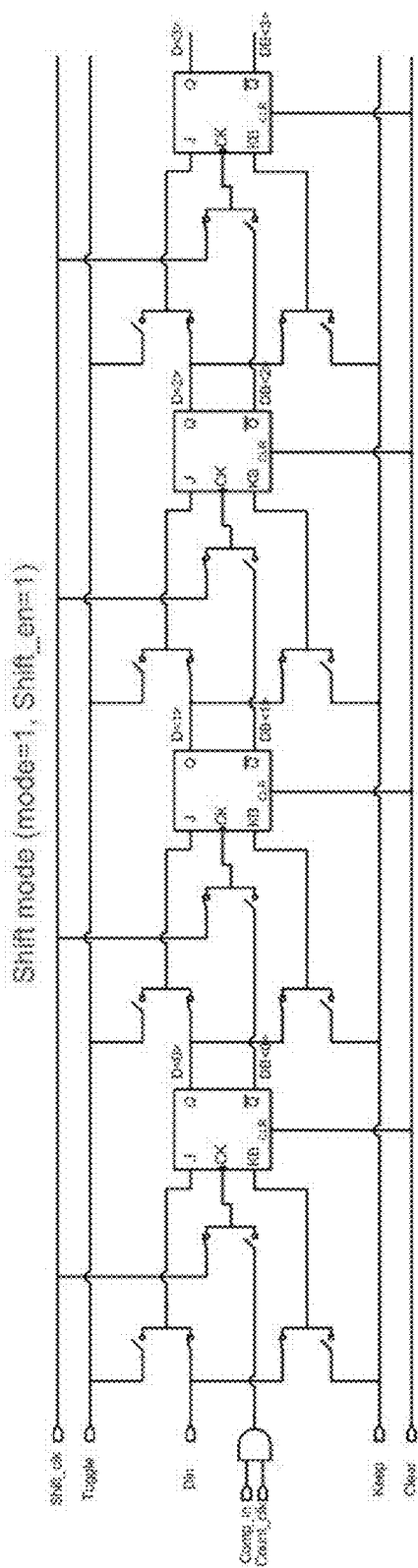
FIG. 28 illustrates a diagram of the arithmetic counter in shift mode according to one embodiment of the invention.

FIG. 28 illustrates a diagram of the arithmetic counter in shift mode according to one embodiment of the invention. The arithmetic counter in shift mode is set when mode=1 and shift_en=1. In this configuration, J and KB are connected together and receive the data output from the previous stage at Q. Thus, in this embodiment, J=KB=D such that, using the logic expression of a J-K flip-flop above, $Q(n)=D$. Accordingly, D flip-flop configuration is obtained with data input connected to the previous stage output. Similar to the inversion mode, each stage's clock input is connected to a common shift_clk signal. In FIG. 28, Din is connected to the first stage data input. As illustrated in FIG. 28, a shift register configuration is obtained wherein for each negative edge of shift_clk, each stage's output is shifted to its successive stage.

Figure 29:
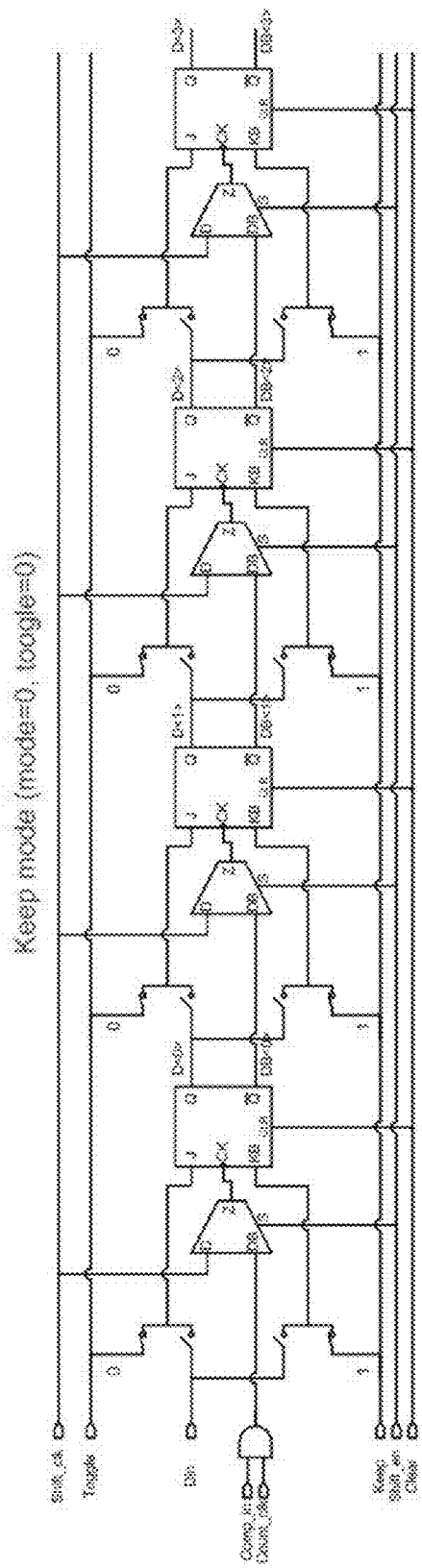
FIG. 29 illustrates a diagram of the arithmetic counter in keep mode according to one embodiment of the invention.

FIG. 29 illustrates a diagram of the arithmetic counter in keep mode according to one embodiment of the invention. The arithmetic counter in keep mode is obtained when mode=0 and toggle=0 regardless of the input of the clock. In this configuration, J=0 and KB=1 such that, using the logic expression of a J-K flip-flop above, $Q(n)=Q(n-1)$. This allows the flip-flop to be set in a keep configuration. Without or with negative edge seen at the clock input, the arithmetic counter in keep mode will hold this data until the keep mode is canceled or a counter reset is received.

Arithmetic Operations

Figure 30:
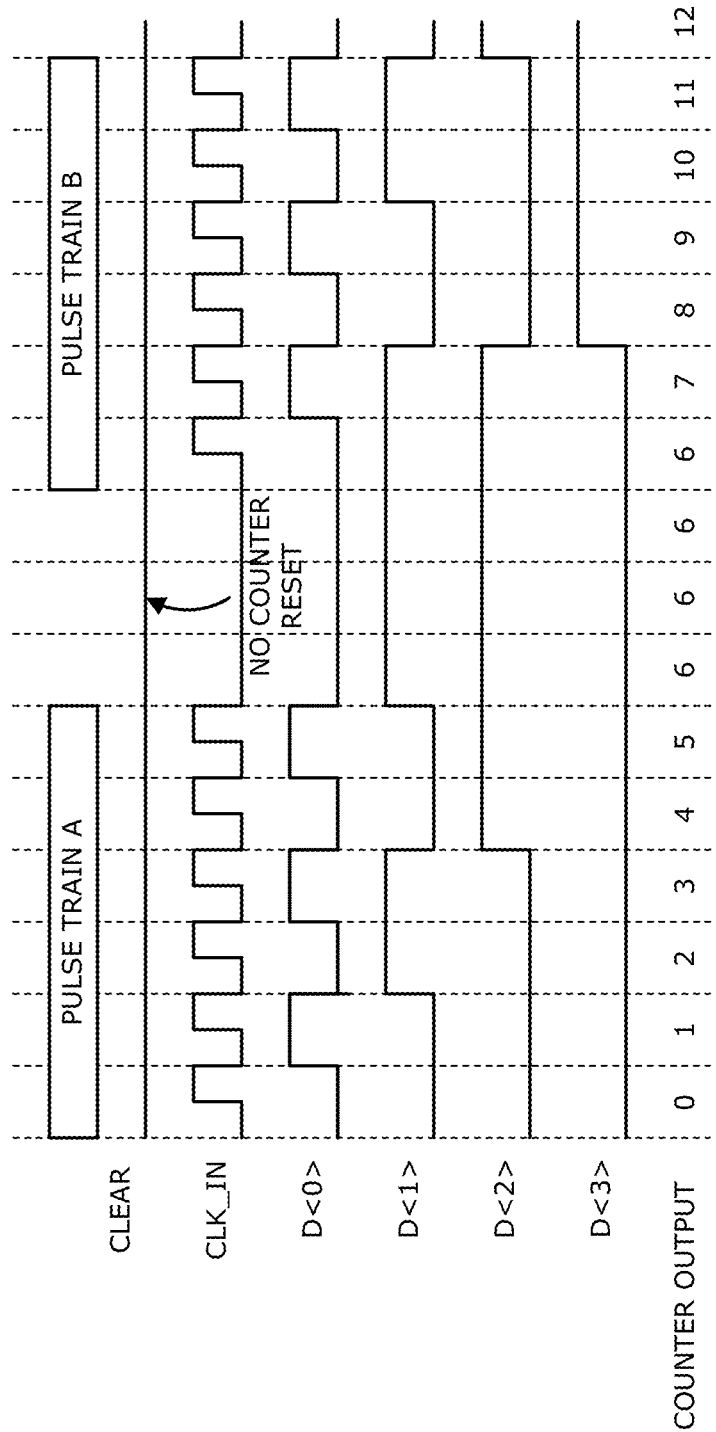
FIG. 30 illustrates a timing diagram of the addition operation according to one embodiment of the invention.

Using the operation modes of the counter described above, all the arithmetic operations can thus be performed using this arithmetic counter. For example, addition operation is used to add two pulse trains together in the counter mode. By not resetting the counter stages when next pulse train occurs, two pulse trains are added at the final counter output. Thus, an A+B operation is performed. FIG. 30 illustrates a timing diagram of the addition operation according to one embodiment of the invention. As shown in FIG. 30, an addition operation of 6+6=12 is performed as an example.

Figure 31:
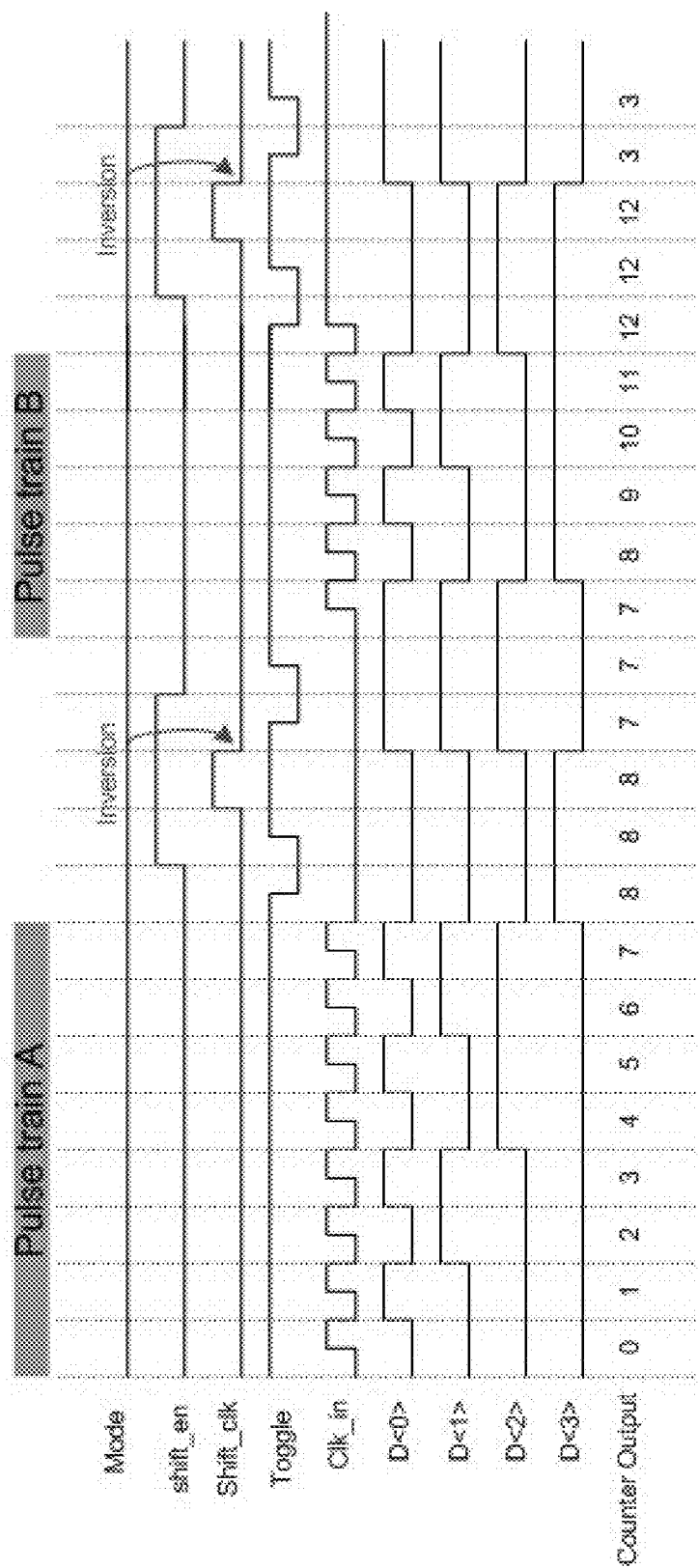
FIG. 31 illustrates a timing diagram of the subtraction operation according to one embodiment of the invention.

A subtraction operation is to subtract counter value of the second pulse train from the first pulse train. The subtraction operation requires two inversion operations and counter operations. For example, the first pulse train is counted as A and an inversion operation is performed to invert all the counters output to obtain (2n−1−A), where n is the number of counter stages. Then, a second pulse train is counted without reset in between, giving an output of ($2^n-1-A+B$). Finally, another inversion operation is performed and the final output thus becomes (A−B). In contrast to the conventional counter illustrated in FIG. 20, the counter keep mode is used to hold the result from previous operation whenever shift_en signal changes its state. FIG. 31 illustrates a timing diagram of the subtraction operation according to one embodiment of the invention. As shown in FIG. 31, during the edge of shift_en signal, toggle signal is always low to set counter in a keep mode. This prevents unwanted state changes during the mode transition. In the example shown in FIG. 31, pulse train A equals to 8 clock pulses, pulse train B equals to 5 clock pulses. After two inversions, the final output is the subtraction result (i.e., 8−5=3).

Figure 32:
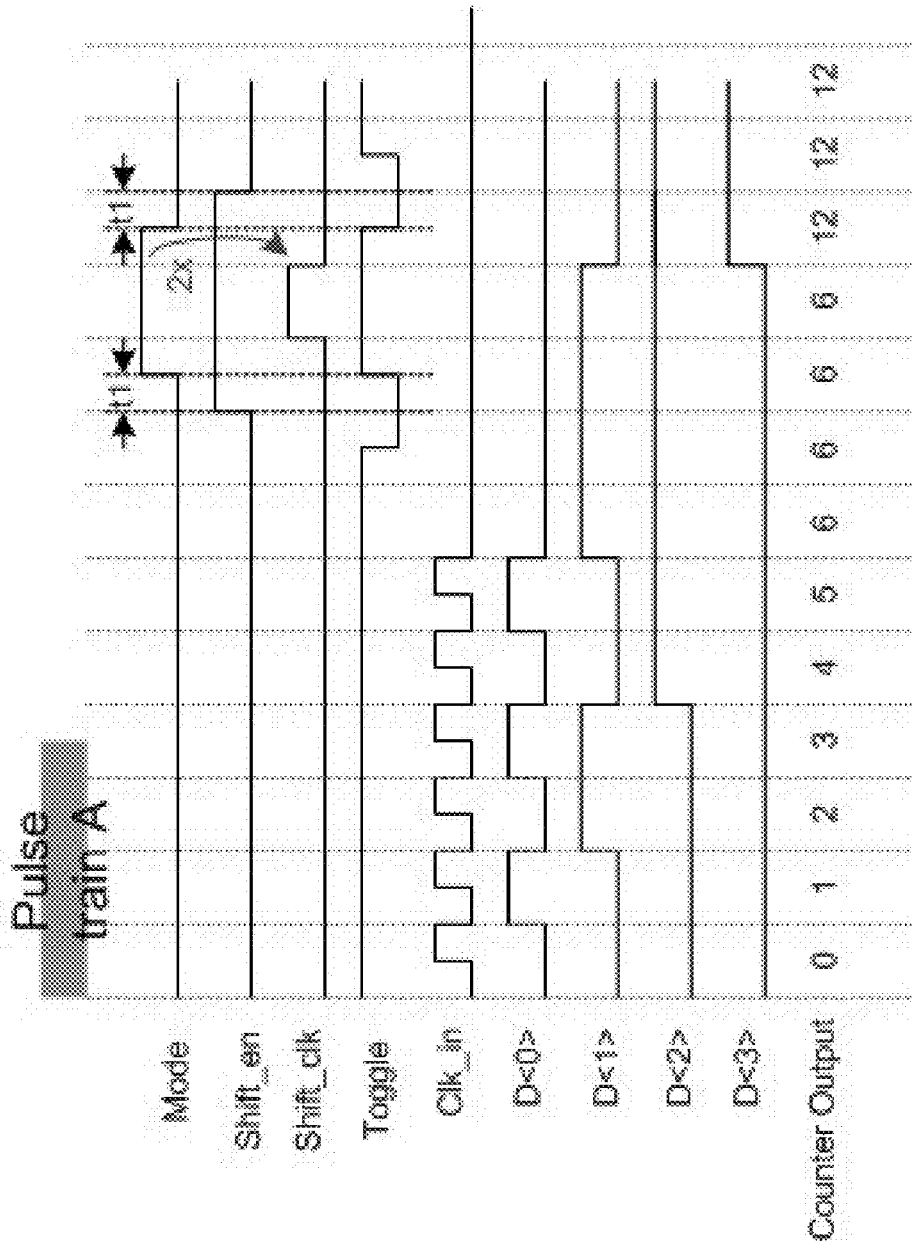
FIG. 32 illustrates a timing diagram of the multiplication operation according to one embodiment of the invention.

The proposed arithmetic counter also supports multiplication operations including multiplications integer values of 2, 4, 8, etc. . . . The multiplication operation by 2 ("2× multiplication") is performed by shifting the counter data from low least significant bit (LSB) stage to high LSB stage. Bits higher than the most significant bit (MSB) data will be discarded and data is inserted to the counter stage° from Din input. In one embodiment, a "0" is used as Din and 2× multiplication operation is performed at the negative edge of the shift_clk. As a result, 2× multiplication is performed with one shift_clk pulse. Further, as illustrated in FIG. 31, multiplication operation by 4 ("4× multiplication") may be obtained with two shift_clk pulses and multiplication operation by 8 ("8× multiplication") may be obtained with three shift_clk pulses, etc. As in the subtraction operation, the counter keep mode is used when switching between counter mode and shift mode, in order to hold the data from the previous operation. FIG. 32 illustrates a timing diagram of the multiplication operation according to one embodiment of the invention. Specifically, FIG. 32 illustrates the timing diagram for a 2× multiplication. As illustrated in FIG. 32, during the edge of shift_en signal, toggle is always low. In addition, an overlap timing t1 is required between mode and shift_en signal to ensure that the counter is set in a keep mode during the mode transition. As an example shown in FIG. 32, the arithmetic counter multiplies 6 by 2 and the final output is 12. Furthermore, to perform a 4× multiplication operation, the two shift clock pulses may be used and may both be enclosed by shift_en signal.

Figure 33:
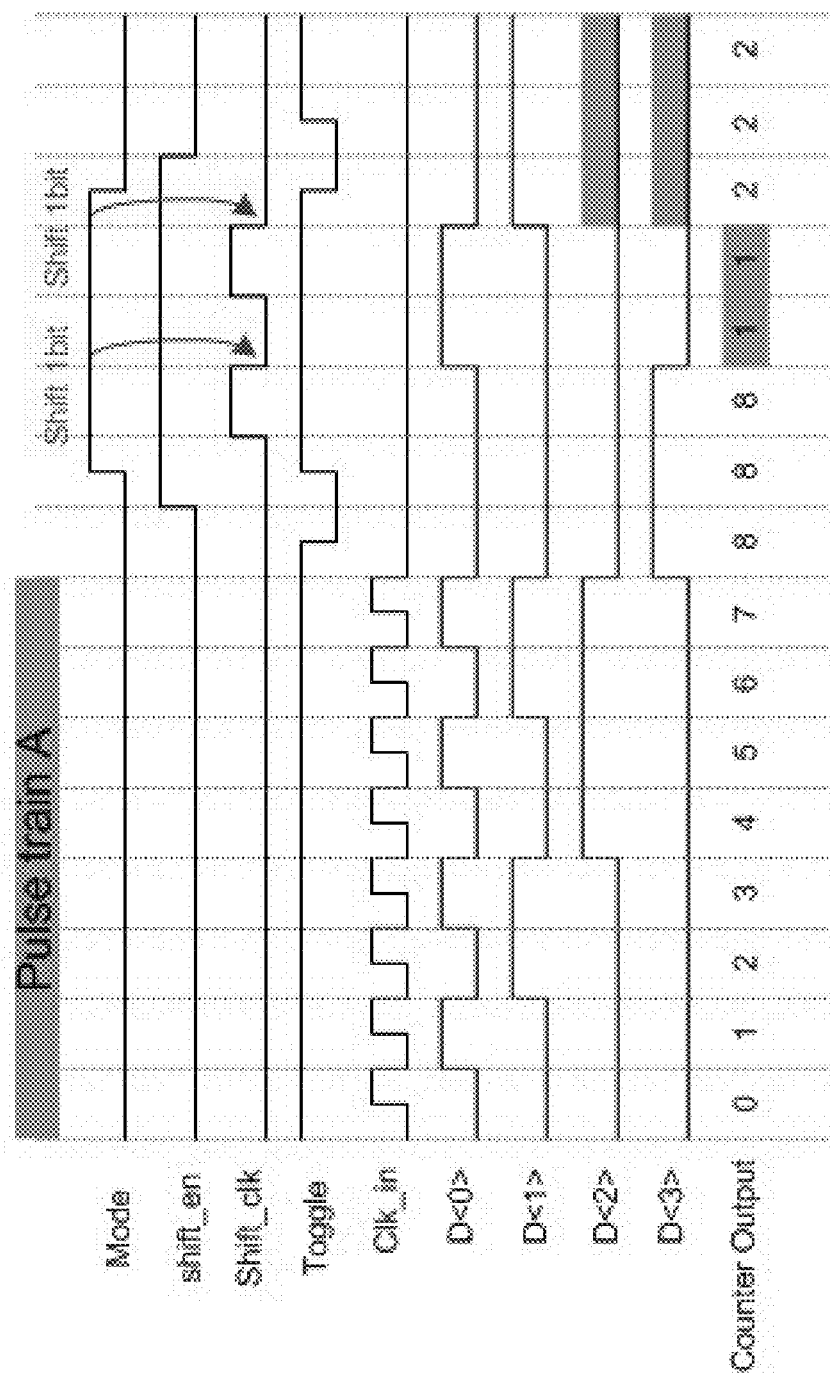
FIG. 33 illustrates a timing diagram of the division operation according to one embodiment of the invention.

Division operations can also be performed using the shift function. Since in the shift register configuration, data cannot shift in backwards, the output of the last stage is connected back to the first stage Din as shown in FIG. 28. Thus, a divide by 2 operation can be performed using a single shift_clk pulse and discarding the last stage's output. Further, where n is the number of counter stages, a divide by $2^i$ can be performed using n−i shift_clk pulses and discarding the last i stage's output (replaced with "0"). FIG. 33 illustrates a timing diagram of the division operation according to one embodiment of the invention. Specifically, the timing of a divide-by-4 operation is shown in FIG. 33 wherein after two shift_clk pulses and discarding the last two bits, a divide-by-4 operation is performed by the arithmetic counter (e.g., 8/4=2).

The arithmetic counter according to some embodiments of the invention may also perform a combination of the operations. To achieve the combination of the operations requires that each of the operations be cascaded in the correct sequence based on the timing of each of the basic arithmetic operation. For example, if we want to calculate 2*(A+B)−4*(C+2D), the correct sequence of operation may be rearranged to 2*(−2*(2*D+C)+A+B). In accordance with some embodiments, the basic rule is to extract the multiplier to the front and move the addition to the end. In this way, all the combination of arithmetic operations can be performed.

Configurations and Application in CMOS Image Sensor

Referring back to FIG. 10, the diagram 1000 of pixel circuitry coupled to column parallel ADC architecture for high performance CMOS image sensor in accordance to one embodiment of the invention is illustrated. In this embodiment, the column parallel ADC 1002 is a single slope counter type ADC architecture which may include the arithmetic counter from FIG. 25 as the counter 1005. This single slope counter type ADC including the arithmetic counter may be built into a CMOS image sensor to achieve a high performance and increased functionalities.

In contrast to the conventional configurations in FIG. 18 and FIG. 19, the amplification circuitry 1003 with close loop and auto-zeroing configuration may be used to provide a pre-gain for the low noise purpose in FIG. 10. According to other embodiments, the column amplification circuitry 1003 can be excluded to save power and column height.

The auto-zeroing operation on amplification circuitry 1003 and comparator 1004 stores the offset for the amplification circuitry 1003 and the comparator 1004 as well as the black level of the pixel for later cancellation. A proper timing sequence on their auto-zeroing is needed to ensure no charge injection error is included from the switching operation.

As shown in FIG. 10, the arithmetic counter 1005 from FIG. 25 is included after the comparator 1004 output. In contrast to the conventional configurations in FIG. 18 and FIG. 19, only one clock signal count_clk is needed which saves routing space and reduces the noise coupling issue.

Figure 34:
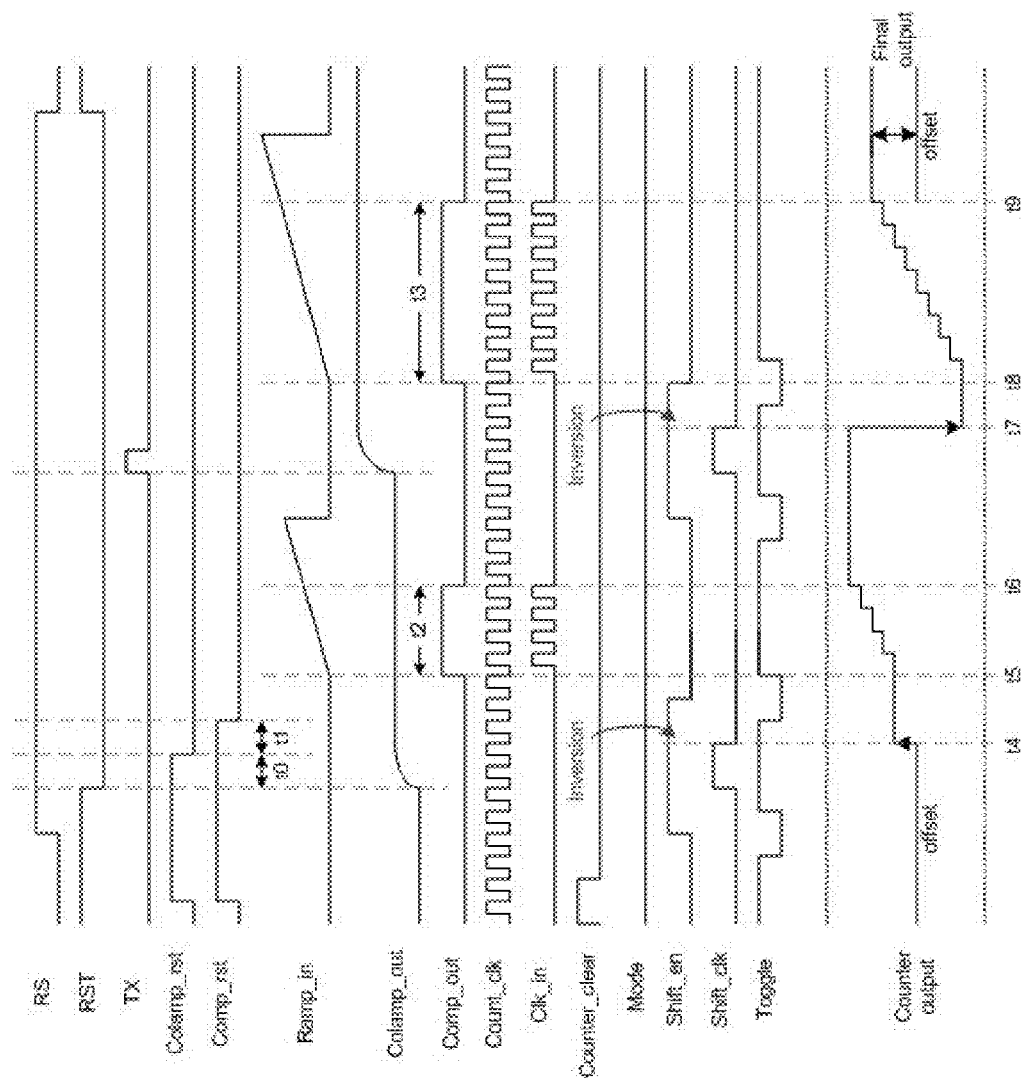
FIG. 34 illustrates a timing diagram for digital Correlated Double Sampling (CDS) with up counting according to one embodiment of the invention.

FIG. 34 illustrates a timing diagram for digital Correlated Double Sampling (CDS) with up counting according to one embodiment of the invention. In order to cancel all the offsets from previous stages as well as to cancel the delay error of the comparator, a digital CDS operation is performed. In some embodiments of the invention, the digital CDS is built into the arithmetic counter. In some embodiments, to perform digital CDS, a subtraction operation of the arithmetic counter is utilized.

The control timing and resulting signals for digital CDS with up counting are shown in FIG. 34. Firstly, the falling edge of the pixel reset, the timing for the reset signal for the column amplification circuitry 1003 (colamp_rst) and the reset signal for the comparator 1004 (comp_rst) are overlapping, the colamp_rst encloses pixel reset and comp_rst encloses colamp_rst. As illustrated in FIG. 34, time t1 and t2 ensures the settling of column amplification circuitry 1003 and comparator 1004, respectively. These times further ensure that no change injection disturbance caused by the previous stages auto-zeroing phase is inputted into the next stage. The signal increases its value at the output of the amplification circuitry 1003 (colamp_out node) when reading out the reset and signal level. As a result, an upward-going ramp is preferred for the comparison operation. After the comparator stage, the reset level and signal level are converted to two pulses, in which their pulse width represents the strength of the signal level. After gated with count_clk, the signal is converted two pulse trains, one represents the signal level and one represents the reset level.

The digital CDS is obtained by performing the subtraction operation between two pulse trains. In order to get the positive number after the CDS (e.g., signal level is higher or not smaller than the reset level) the inversion sequence timing needs to be carefully placed (i) before the reset phase and (ii) between the reset and signal phase as shown in FIG. 34.

The following set of equations can be used to prove the validity the CDS operation:

| Timing | Dout |
|---|---|
| At t4 (first inverse) | Dout = $2^n - 1$ − Doffset |
| At t6 | Dout = $2^n - 1$ − Doffset + Drst |
| At t7 (second inverse) | Dout = 2n − 1 − (2n − 1 − Doffset + Drst) = Doffset − Drst |
| At t9 | Dout = Doffset − Drst + Dsig = (Dsig − Drst) + Doffset |

Doffset is a digital offset inserted after the counter reset. The Doffset adds a data pedestal to prevent output overflow. This digital offset can be canceled after Back Light Compensation (BLC) operation of the sensor such that the final output is Dsig−Drst, which is the correct equation for CDS.

Figure 35:
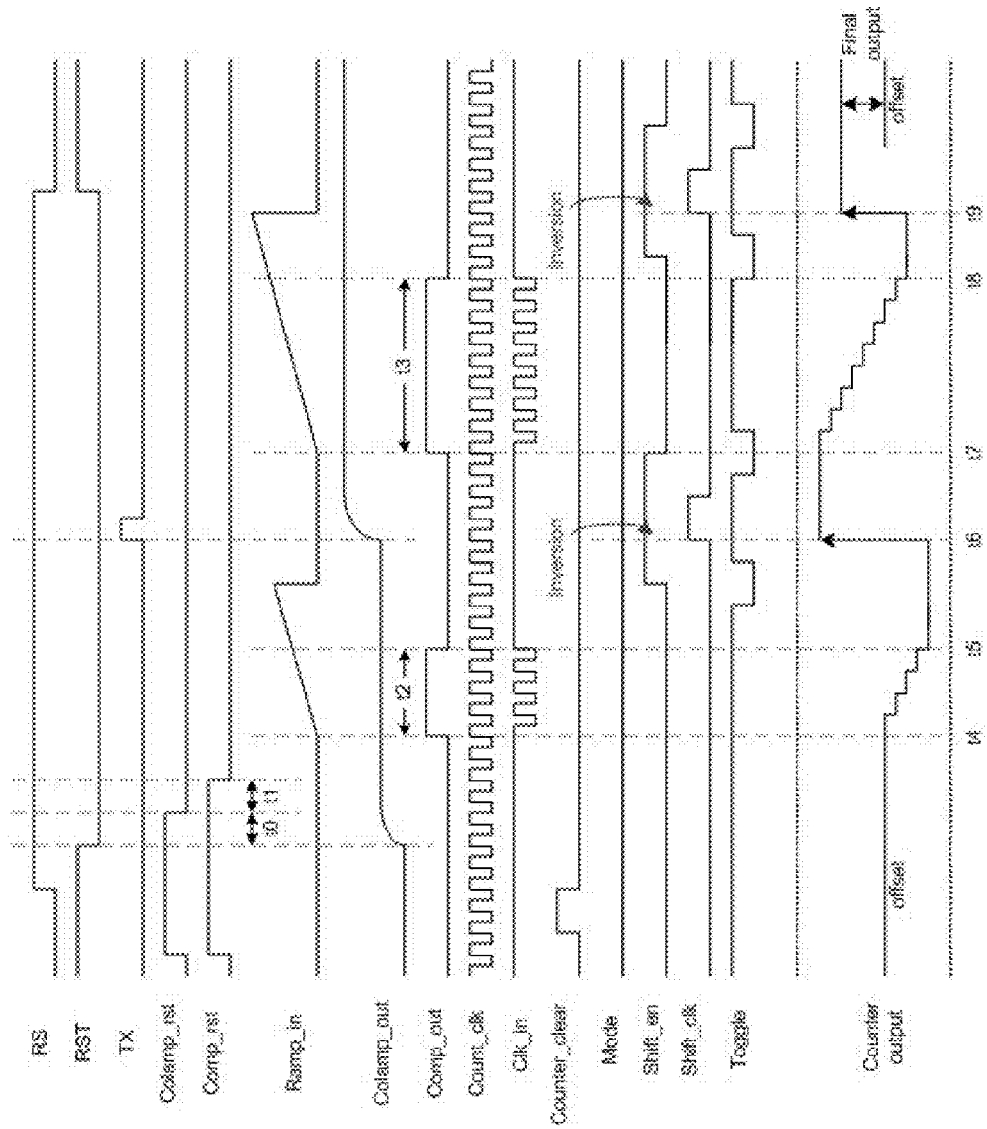
FIG. 35 illustrates a timing diagram for digital Correlated Double Sampling (CDS) with down counting according to one embodiment of the invention.

The above timing and derivation is based on the up-counting configuration. When the counter is set in a down-counting configuration, the timing is different in terms of the sequence of two inversion operations. FIG. 35 illustrates a timing diagram for digital CDS with down counting according to one embodiment of the invention. As shown in FIG. 35, one inversion operation happens after the reset phase. Another inversion operation takes place after the signal phase. The following set of equations can be used to prove the validity the CDS operation illustrated in FIG. 35:

| Timing | Dout |
|---|---|
| At t5 | Dout = Doffset − Drst |
| At t6 (first inverse) | Dout = $2^n - 1$ − Doffset + Drst |
| At t8 | Dout = $2^n - 1$ − Doffset + Drst − Dsig |
| At t9 (second inverse) | Dout = $2^n - 1$ − ($2^n - 1$ − Doffset + Drst − Dsig) = (Dsig − Drst) + Doffset |

As shown above, the final output is in same form as in the up-counting case. As a result, it is proved that the digital CDS is performed at this counter level for both up-counting and down-counting embodiments. Since all the offset of the previous stages (i.e., pixel, column amplification and comparator) as well as comparator delay error are included in both Dsig and Drst, the offsets may all be canceled after a subtraction is performed which leads to a very low noise at the output.

Figure 36:
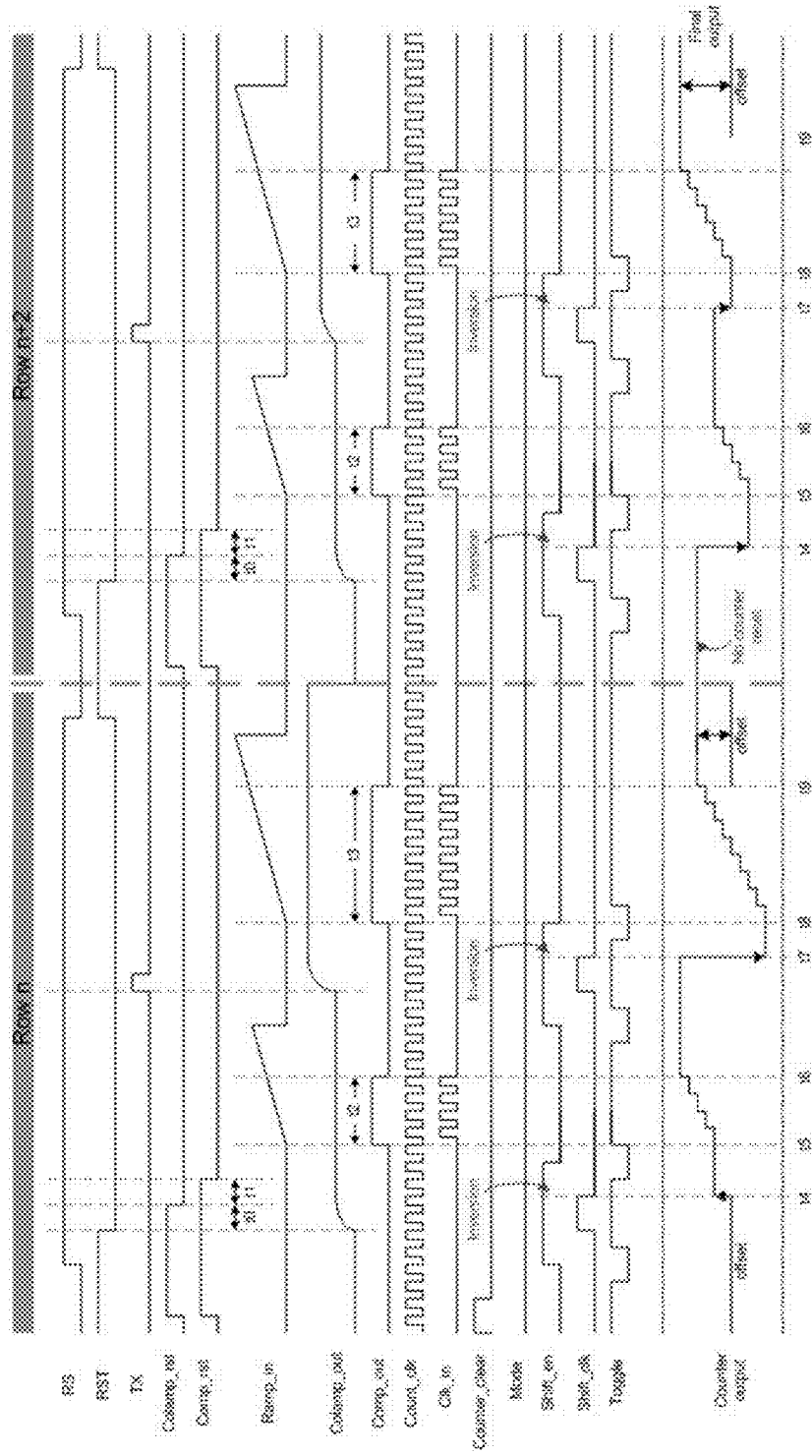
FIG. 36 illustrates a timing diagram for row summing according to one embodiment of the invention.

FIG. 36 illustrates a timing diagram for row summing according to one embodiment of the invention. Row summing operation performs a sum of the pixel output of two rows to increase the SNR and sensitivity. Row summing operation can be achieved by using the arithmetic counter to perform the addition operation. In FIG. 36, row n and row n+2 are the two neighboring same color pixel rows. There is no counter reset between the timing of the two rows (e.g., n and n+2) to ensure that the counter continues to count the output from second row such that it may be added to the first row. As shown in FIG. 36, the final output is the sum of the pixel output of the two rows. While the row summing of two rows is discussed, more than two rows row-summing can also be performed.

HDR bin is an expansion of the function of the traditional row bin which incorporates the HDR algorithm discussed above in FIGS. 8-11. In the method illustrated in FIG. 11, the multiplication operation by 2, 4 or 8 may be implemented using the arithmetic counter illustrated in FIG. 25 and a keep operation may be used to ensure the previous row's data will be maintained after the next row read in. In other embodiments, the arithmetic counter may be expanded into other applications in which an arithmetic operation or an combination of many arithmetic operations are required.

Improvements on Arithmetic Counter

Other embodiments of arithmetic counters that may improve counter performance are (1) programmable counter initial value, (2) latch type first counter stage, and (3) true complementary coding operations.

In the embodiment illustrated in FIG. 25, the reset or set control for counter stages are built into the counter circuit and is used to set the initial value or an digital offset in order to prevent data overflow. However, the initial value cannot be changed after it is programmed at the design phase.

Figure 37:
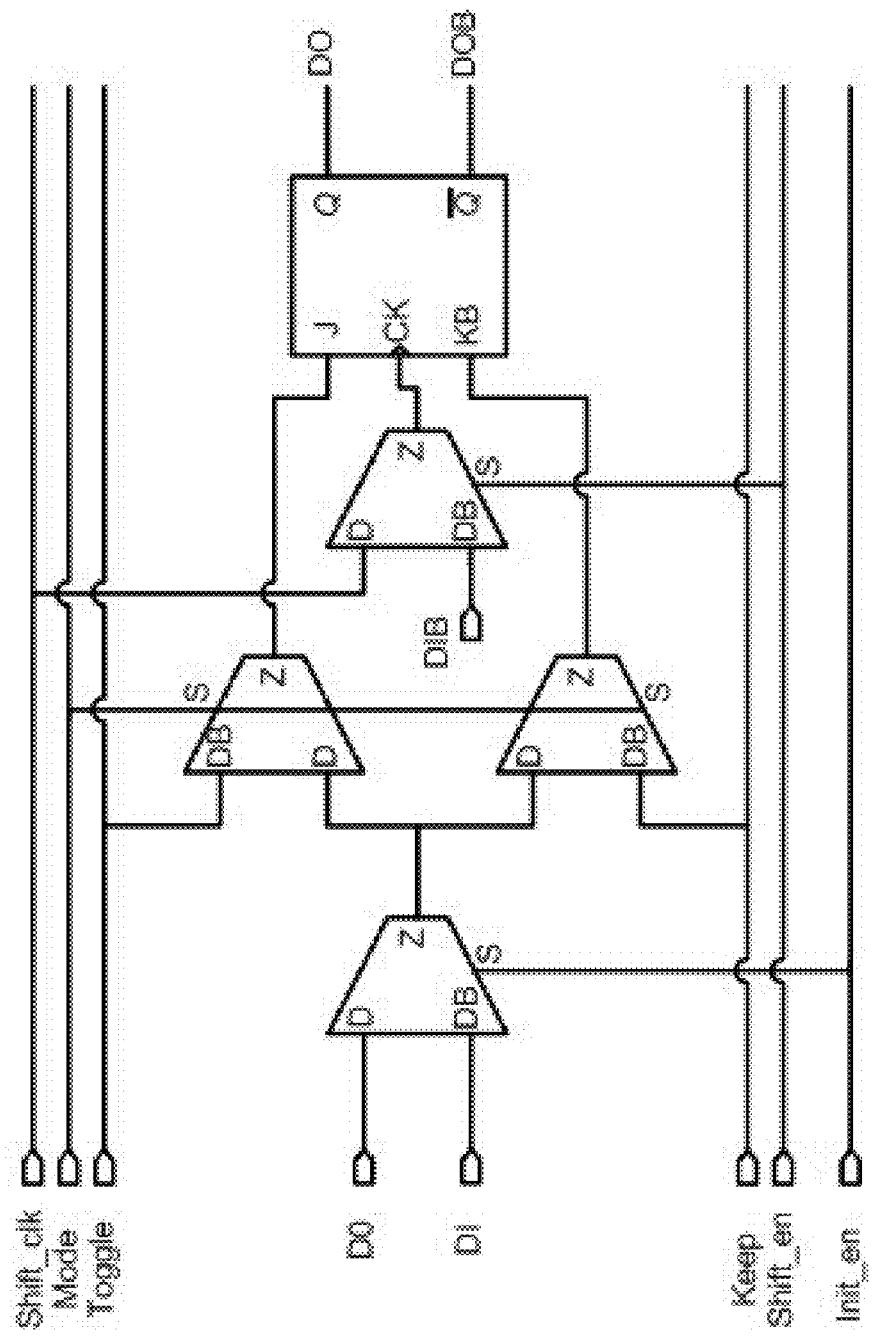
FIG. 37 illustrates a diagram for the arithmetic counter stage with programmable initial value according to one embodiment of the invention.

FIG. 37 illustrates a diagram for the arithmetic counter stage with programmable initial value according to one embodiment of the invention. Flexibility to program the counter initial value may be desired, for example, for counter test purposes. In FIG. 37, the initial value is written into the flip-flops by using shift mode. In the embodiment illustrated in FIG. 37, an additional MUX is added to switch between the initial data or the output from the previous counter stage. Inputs DI and DIB are connected to Q and QB of the previous stage. D0 is used for the initial value input for each of the stages. Since the arithmetic counter's shift mode is used to write in the initial value, the initialization timing is almost the same as the shift mode as in FIG. 32 except that the initial enable (init_en) signal is high during the shift operation. Although an additional digital MUX is added, which may require four more transistors, the additional MUX may be compensated after the reset or set function in the J-K flip-flops is removed. Accordingly, there is no increase in gate count overall.

Figure 38:
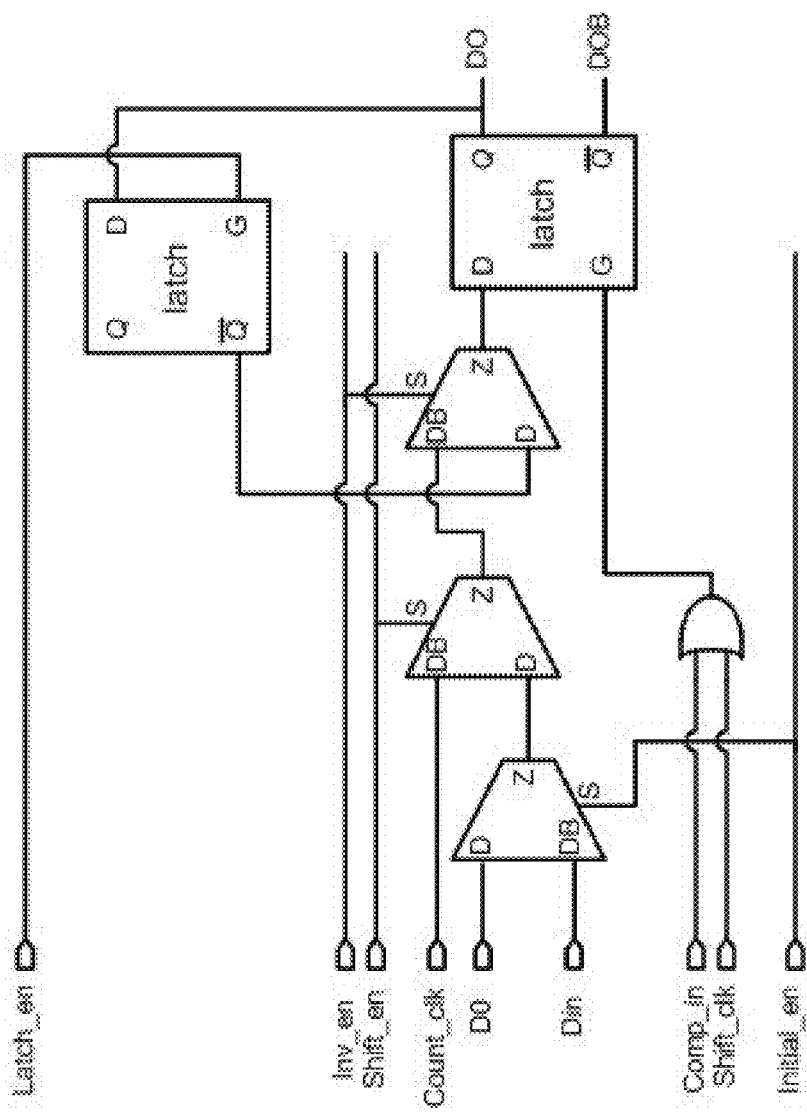
FIG. 38 illustrates a diagram for a latch type first stage schematic according to one embodiment of the invention.

FIG. 38 illustrates a diagram for a latch type first stage schematic according to one embodiment of the invention. In FIG. 38, the J-K flip-flop is replaced by a gated latch. This embodiment allows for the counter clock to be used as the LSB of the final output. Thus, a latch is used to store the data instead of a J-K flip-flop which may double the data frequency. In this embodiment, the latch unit only latches data from the input when gate signal is high. Similarly to the other stages, the shift function as well as the shift for initialize function is built into the first stage. The adding of inverse operation requires an additional latch which will output an inverse code of its previous states, when inversion enable (inv_en) signal is high. The inv_en signal can be derived from mode and shift enable (shift_en) signals.

Figure 39:
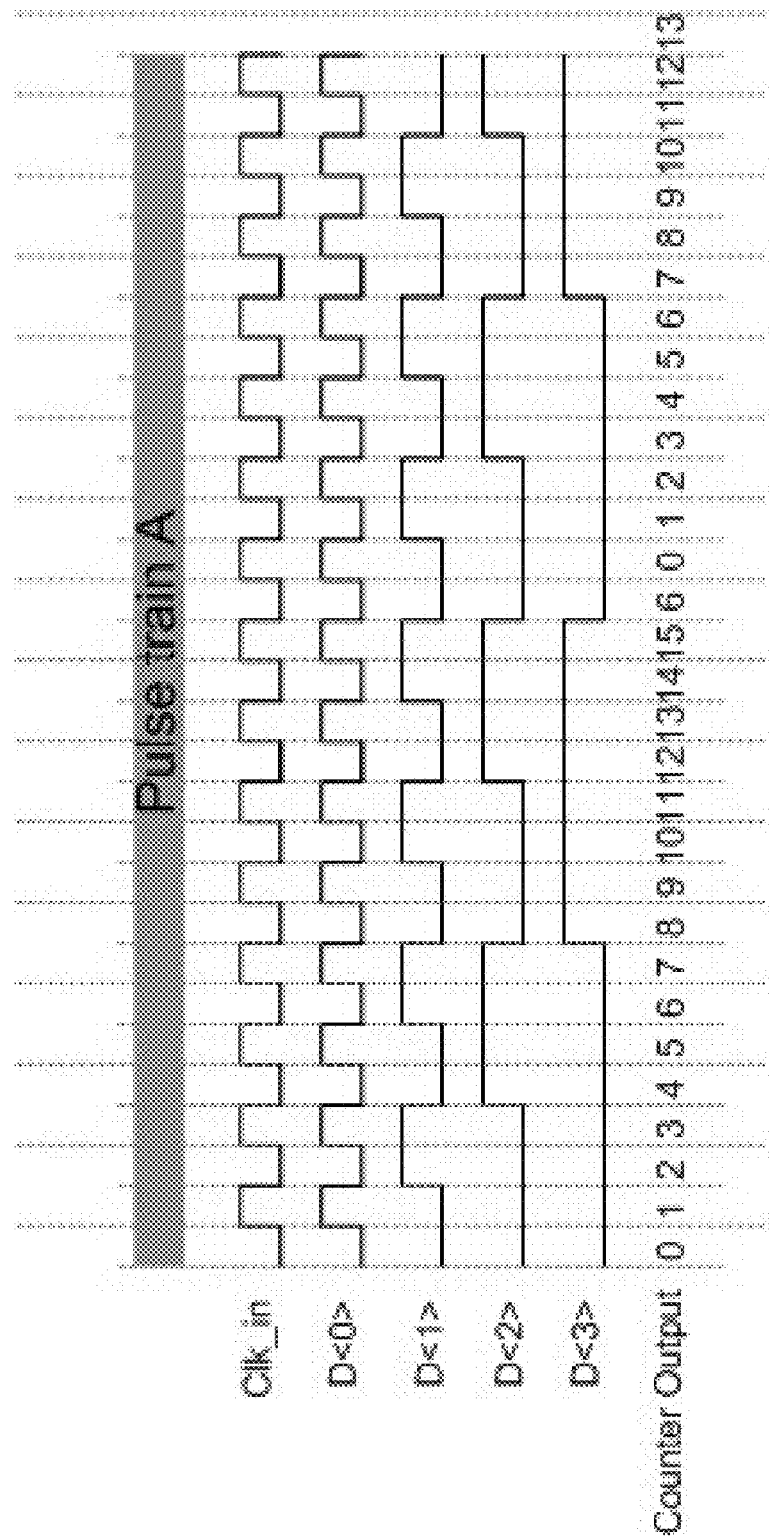
FIG. 39 illustrates a timing diagram for a counter with a latch type first stage according to one embodiment of the invention.

In the counter mode, count_clk signal is connected to the data input of the latch and comp_in is connected to the gate input of the latch to ensure the alignment of the counter clock to the comp_in signal. FIG. 39 illustrates a timing diagram for a counter with a latch type first stage according to one embodiment of the invention. As shown in FIG. 39, the data rate is increased by 2 times, which is the same frequency of the counter clock.

However, in the up-counting case, the count_clk is always "0" right at the starting point of counting the signal level which may cause one bit error depending on the previous counting result on the reset level. For example, if the LSB is "1" after counting the reset level, when stating the signal counting, the counter process will see one (in this case, negative) edge more than the case with LSB equal "0" after the reset level, which generates one LSB error at the output. In order to avoid that, the first stage latch may be modified as illustrated in FIG. 40.

Figure 40:
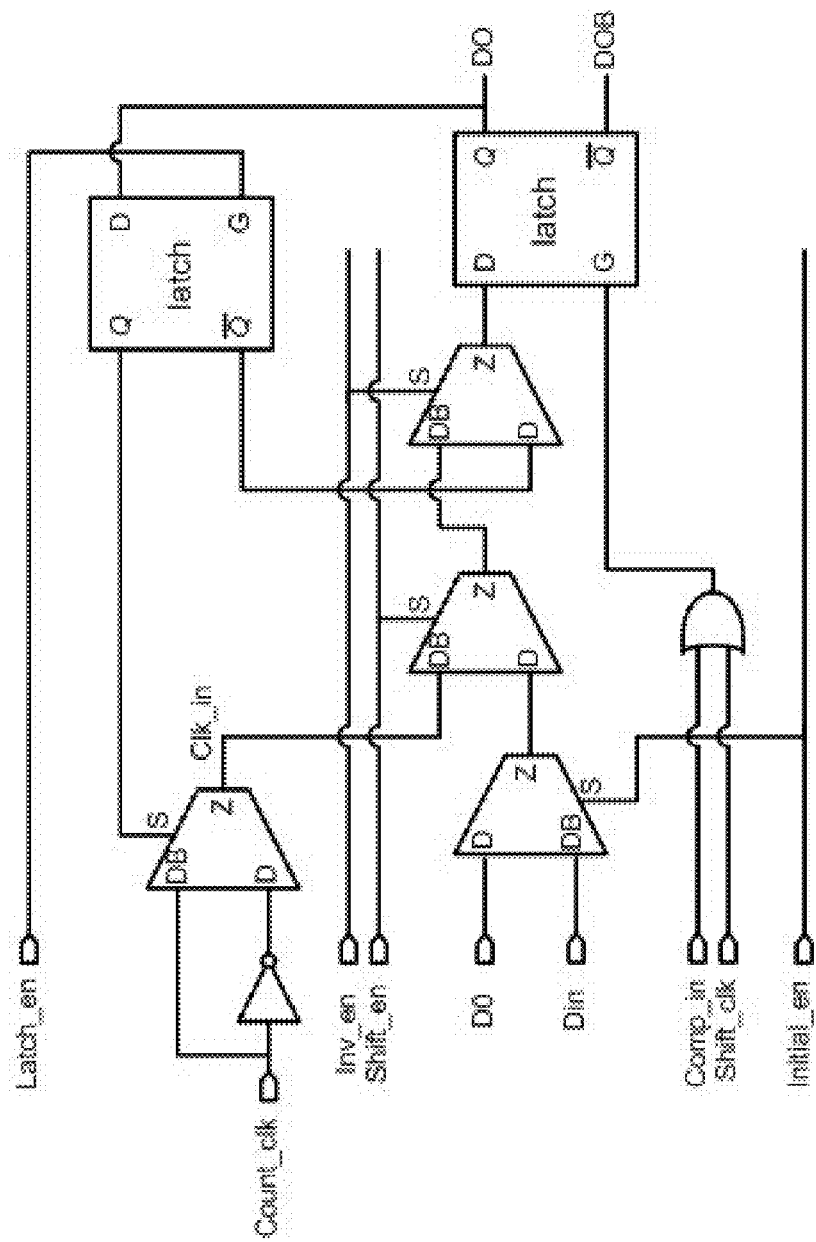
FIG. 40 illustrates a diagram for a modified latch type first stage with LSB compensation according to one embodiment of the invention.

FIG. 40 illustrates a diagram for a modified latch type first stage with LSB compensation according to one embodiment of the invention. In this modification, the same latch is used as in the previous configuration of FIG. 39 to remember the LSB from the previous counting result. Depending on the "1" or "0" state, the input count_clk will be inverted or will not be inverted, respectively, to compensate for the one LSB error, discussed above. For example, if the LSB is "1" after counting the reset level, the counter clk will be inverted, such that when the signal level counting starts, the counter process will see one less negative edge.

Figure 41:
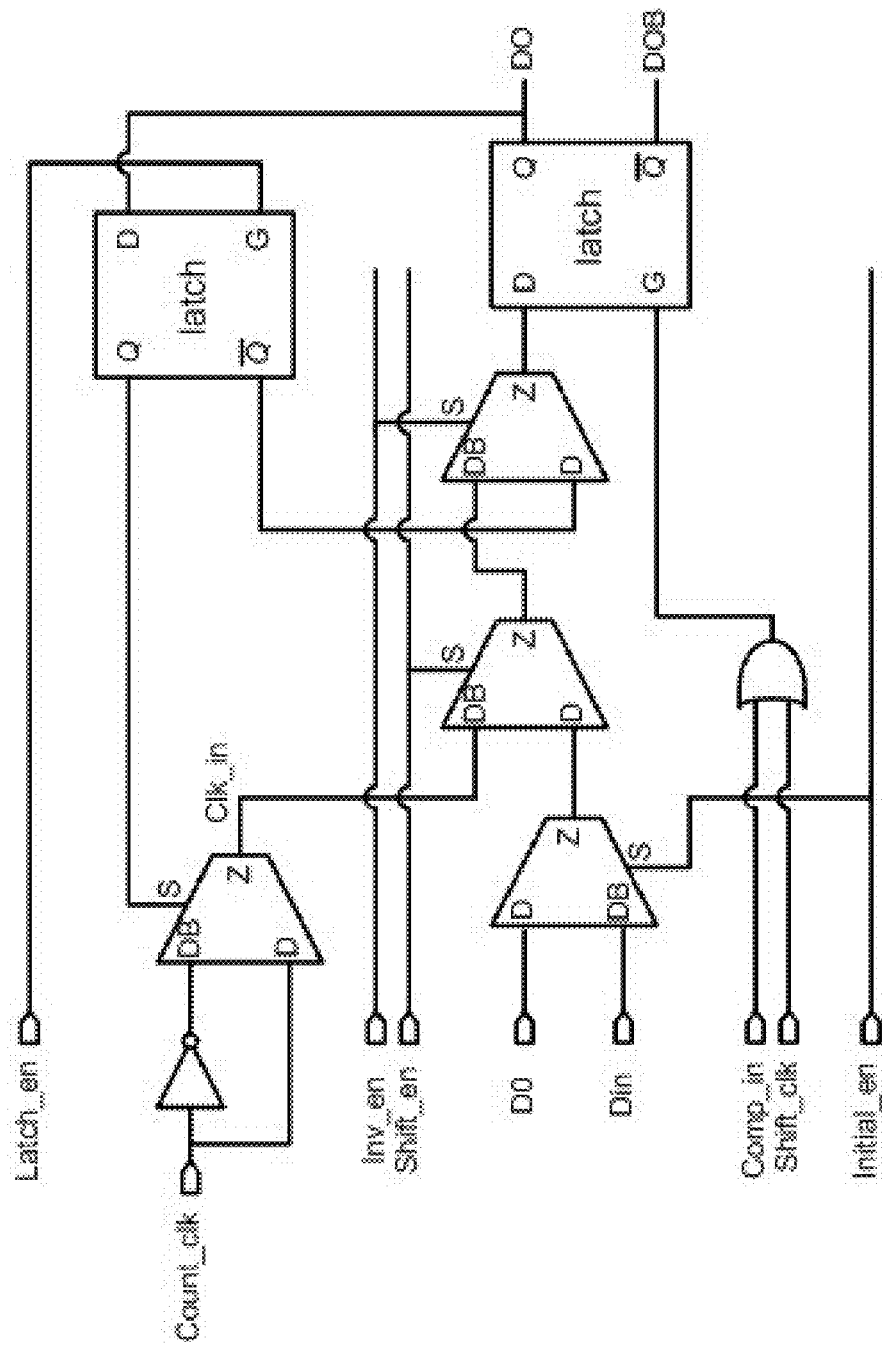
FIG. 41 illustrates a diagram for a modified latch type first stage with true complementary coding according to one embodiment of the invention.

FIG. 41 illustrates a diagram for a modified latch type first stage with true complementary coding according to one embodiment of the invention. The inverse operation on the code may have some limitations when used in a more complex operation. The term $2^n-1$ added after the inverse operation may cause trouble with multiplication operations. Accordingly, a true complementary coding instead of inverse coding may be required.

In order to achieve a complementary coding, a modification added to the first stage the embodiment in FIG. 40 is needed. This modification is shown in FIG. 41. Specifically, in this embodiment, the input connection of MUX (circled in FIG. 41) is reversed. As a result, the next counting process will see one more negative edge for both "0" or "1" cases. Thus, the minus 1 terms (i.e., −1) in the $2^n-1$ equations are compensated which leads to a true complementary coding.

Figure 42:
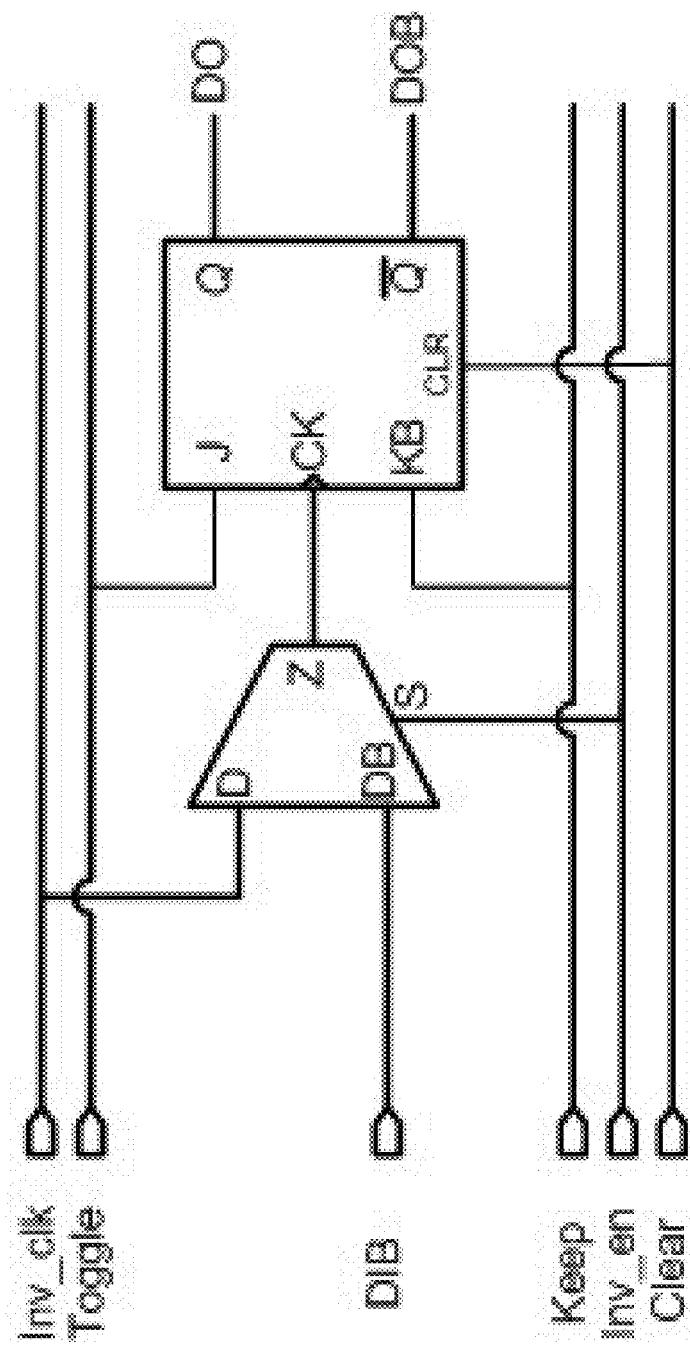
FIG. 42 illustrates a diagram for simplified counter stage according to one embodiment of the invention.

In some embodiments, if only addition and subtraction operations are required in the design, the arithmetic counter stage may be simplified to reduce the silicon area required. FIG. 42 illustrates a diagram for simplified counter stage according to one embodiment of the invention. In the simplified version of one counter stage shown in FIG. 42, the shift and initialization function are removed. Furthermore, the reset or set function of J-K flip-flops can be achieved by setting Toggle and Keep signal to a specific value as shown in the truth table above (Table 1). Accordingly, the reset/set circuit inside the J-K flip-flops may be reduced as well. However, it is noted that this embodiment of the simplified counter stage may lose the programmability of the counter initial value.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. A method implementing a high dynamic range (HDR) bin algorithm in an image sensor having a pixel array, the pixel array having rows and columns of pixels, the pixel array including a first and a second super row, the first super row having a first integration time and the second super row having a second integration time, the method comprising:
   reading out image data from the first super row into a counter, the first super row being a first set of multiple rows of the pixel array;
   multiplying the image data from the first super row by a factor to obtain a multiplied data, the factor being a ratio between the first integration time and the second integration time;
   comparing the multiplied data with a predetermined data;
   reading out image data from the second super row into the counter, the second super row being a second set of multiple rows of the pixel array; and
   if the multiplied data is larger than the predetermined data, storing the multiplied data from the first super row in the counter and if the multiplied data is smaller than the predetermined data, storing the image data from the second super row in the counter.

2. The method of claim 1, wherein the counter is an arithmetic counter.

3. The method of claim 2, wherein multiplying the image data is performed by the arithmetic counter by using a shift function.

4. The method of claim 1, wherein the factor is a multiple of 2.

5. The method of claim 1, wherein comparing the multiplied data with the predetermined data comprises:
   if the multiplied data is larger than the predetermined data, setting the counter in a keep state, and
   if the multiplied data is smaller than the predetermined data, clearing the counter and setting the counter in a read state.

6. The method of claim 5, wherein in the keep state, the arithmetic counter discards an image data obtained in the next read operation.

7. The method of claim 5, wherein in the read state, the arithmetic counter is set to store the image data obtained in the next read operation.

8. The method of claim 1, wherein the first super row being two rows of the pixel array and the second super row being two subsequent rows of the pixel array.

9. The method of claim 8, wherein the memory cell is an SRAM.

10. The method of claim 1, further comprising outputting the data stored in the counter to a memory cell.

11. The method of claim 1, wherein the predetermined data is a masked data that is set as ¾ of a saturation level.

12. A method implementing a high dynamic range (HDR) bin algorithm in an image sensor having a pixel array, the pixel array having rows and columns of pixels, the pixel array including a first super pixel having a first integration time, a second super pixel having a second integration time, a third super pixel having a third integration time and a fourth super pixel having a fourth integration time, the method comprising:
   concurrently reading out image data from the first super pixel into a first counter and reading out image data from the third super pixel into a second counter;
   concurrently multiplying the image data from the first super pixel by a factor to obtain the first multiplied image data and multiplying the image data from the third super pixel by the factor to obtain the third multiplied image data;

comparing the first and third multiplied data with a first predetermined data;

concurrently reading out image data from the second super pixel into the first counter and reading out image data from the fourth super pixel into the second counter;

if the first multiplied data is larger than the first predetermined data, storing the image data from the first super pixel in the first counter, and if the first multiplied data is smaller than the first predetermined data, storing the image data from the second super pixel in the first counter, and if the third multiplied data is larger than the first predetermined data, storing the image data from the third super pixel in the second counter and if the third multiplied data is smaller than the first predetermined data, storing the image data from the fourth super pixel in the second counter;

multiplying data stored in the first counter by the factor to the power of 2 to obtain an output data; and if the output data is larger than the second predetermined data, outputting the output data and if the output data is smaller than the second predetermined data, outputting the data stored in the second counter.

13. The method of claim 12, wherein the first and second counters are arithmetic counters.

14. The method of claim 12, wherein the factor is a multiple of 2.

15. The method of claim 12, wherein comparing the first and third multiplied data with the masked data comprises:
if the first multiplied data is larger than the masked data, setting the first counter in a keep state, and if the third multiplied data is larger than the masked data, setting the second counter in a keep state, and
if the first multiplied data is smaller than the masked data, clearing the first counter and setting the first counter in a read state, and if the third multiplied data is smaller than the masked data, clearing the second counter and setting the second counter in a read state.

16. The method of claim 15, wherein in the keep state, the first and second counters discard an image data obtained in the next read operation.

17. The method of claim 15, wherein in the read state, the first and second counters are set to store the image data obtained in the next read operation.

18. The method of claim 12, wherein
the first super pixel includes pixels in the columns of the pixel array that are adjacent to pixels in the third super pixel, and
the second super pixel includes pixels in the columns of the pixel array that are adjacent to the pixels in the fourth super pixel.

19. The method of claim 12, wherein the first, second, third, and fourth super pixels each include four pixels.

20. The method of claim 12, wherein the factor is a ratio between the first and the second integration times.

21. The method of claim 12, further comprising outputting one of the output data and the data stored in the second counter to a digital interface.

22. The method of claim 12, wherein the first predetermined data is a masked data that is set as ¾ of a saturation level.

23. The method of claim 12, wherein the second predetermined data is a masked data that is set as ¾ of saturation multiplied by the factor.

24. A column parallel Analog-to-Digital Converter (ADC) coupled to a pixel array having rows and columns of pixels, the pixel array including a first super row having a first integration time and second super row having a second integration time, the column parallel ADC comprising:
amplification circuitry coupled to receive an output from a pixel array, the amplification circuitry including a column amplifier having a reset switch for offset cancellation, the output from the pixel array being at least one of an image data from the first super row and an image data from the second super row;
a comparator coupled to receive a ramp signal from a ramp generator and the output of the column amplifier; and
a counter coupled to receive the output of the comparator and having a reset switch for offset cancellation, the counter, the counter coupled to
multiply the image data from the first super row by a factor to obtain a multiplied data, the factor being a ratio between the first integration time and the second integration time,
store the multiplied data from the first super row if the multiplied data is larger than a predetermined data, and
store the image data from the second super row if the multiplied data is smaller than the predetermined data.

25. The column parallel ADC of claim 24, wherein the first super row is a first set of multiple rows of the pixel array, and wherein the second super row is a second set of multiple rows of the pixel array.

26. The column parallel ADC of claim 24, wherein the counter is an arithmetic counter.

27. The column parallel ADC of claim 24, further comprising:
a memory cell coupled to store an output of the counter.

28. The column parallel ADC of claim 27, wherein the memory cell is a SRAM.

* * * * *